(12) United States Patent
Uriegas et al.

(10) Patent No.: US 11,279,388 B2
(45) Date of Patent: Mar. 22, 2022

(54) CART SYSTEM FOR SECURING AND TRANSPORTING ON A CART ANY ONE OF MULTIPLE PORTABLE TOOLS

(71) Applicants: SAINT-GOBAIN ABRASIVES, INC., Worcester, MA (US); SAINT-GOBAIN ABRASIFS, Conflans-Sainte-Honorine (FR)

(72) Inventors: Gabriel A. Uriegas, Flowery Branch, GA (US); Paul S. Edwards, Flowery Branch, GA (US); Selim Ariturk, Mecleuves (FR)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 64 days.

(21) Appl. No.: 16/743,461

(22) Filed: Jan. 15, 2020

(65) Prior Publication Data
US 2020/0231198 A1 Jul. 23, 2020

Related U.S. Application Data

(60) Provisional application No. 62/793,555, filed on Jan. 17, 2019.

(51) Int. Cl.
*B62B 3/02* (2006.01)
*B62B 3/04* (2006.01)
*B62B 3/12* (2006.01)

(52) U.S. Cl.
CPC ............... *B62B 3/02* (2013.01); *B62B 3/04* (2013.01); *B62B 3/12* (2013.01); *B62B 2202/48* (2013.01)

(58) Field of Classification Search
CPC ..... B62B 3/02; B62B 3/04; B62B 3/12; B62B 2202/48
See application file for complete search history.

(56) References Cited

U.S. PATENT DOCUMENTS 2,673,725 A * 3/1954 Coates ................... B28D 1/045
299/39.3
2,765,822 A * 10/1956 Johnw ................. B27B 17/0091
30/379
(Continued)

FOREIGN PATENT DOCUMENTS

CN 101269527 A 9/2008
CN 101269527 B 9/2012
(Continued)

OTHER PUBLICATIONS

International Search Report and Written Opinion for PCT Application No. PCT/US2020/013657, dated May 13, 2020, 11 pgs.
(Continued)

*Primary Examiner* — Erez Gurari
(74) *Attorney, Agent, or Firm* — Abel Schillinger, LLP; Joseph P. Sullivan

(57) ABSTRACT

A system that can include a cart and multiple mounting assemblies, with each one of the multiple mounting assemblies configured to be interchangeably attached to the cart, and with each one of the multiple mounting assemblies configured to receive one of multiple portable tools and secure the one of the multiple portable tools to the cart. The one of the multiple portable tools is different than a second one of the multiple portable tools.

20 Claims, 37 Drawing Sheets

(56) References Cited

U.S. PATENT DOCUMENTS

| | | | | |
|---|---|---|---|---|
| 3,301,601 | A * | 1/1967 | Zuzelo | E01C 23/0933 299/39.3 |
| 3,357,745 | A * | 12/1967 | Cooper | E01C 23/0933 299/39.3 |
| 3,663,060 | A * | 5/1972 | Shatwell | B28D 1/045 299/39.3 |
| 3,675,689 | A * | 7/1972 | Rice | B27B 17/0091 30/379 |
| 4,840,431 | A * | 6/1989 | Jedick | B27B 9/02 125/14 |
| 5,899,284 | A * | 5/1999 | Reimers | B62B 5/0026 180/11 |
| 6,019,433 | A * | 2/2000 | Allen | B23D 59/002 125/13.01 |
| 6,478,666 | B1 * | 11/2002 | Berger | B24B 19/02 125/13.01 |
| 6,595,840 | B1 * | 7/2003 | Jaensch | B23D 47/02 125/13.01 |
| 7,080,851 | B2 | 7/2006 | Schipper | |
| 7,311,100 | B1 * | 12/2007 | Siewers | B28D 7/02 125/11.22 |
| 7,469,694 | B2 | 12/2008 | Howard et al. | |
| 7,703,211 | B1 | 4/2010 | Kirchhoff | |
| 7,905,223 | B2 | 3/2011 | Von Siegroth et al. | |
| 8,186,762 | B2 | 5/2012 | Aronsson et al. | |
| 9,352,200 | B1 * | 5/2016 | Ho | B62B 5/0461 |
| 9,561,574 | B2 | 2/2017 | Wisenbaker | |
| 9,808,961 | B2 * | 11/2017 | Jenkins | B28D 1/045 |
| 11,001,287 | B2 * | 5/2021 | Ariturk | B62B 3/02 |
| 2004/0006961 | A1 | 1/2004 | Stahl | A01G 3/0417 56/233 |
| 2004/0159315 | A1 * | 8/2004 | Howard | B28D 1/045 125/13.01 |
| 2004/0183274 | A1 * | 9/2004 | Schipper | B28D 1/045 280/641 |
| 2006/0240753 | A1 * | 10/2006 | Ziegs | B24B 27/08 451/449 |
| 2008/0233847 | A1 * | 9/2008 | von Siegroth | B24B 23/005 451/344 |
| 2010/0059949 | A1 * | 3/2010 | Kennard | B25D 17/043 280/47.21 |
| 2010/0180453 | A1 * | 7/2010 | Aronsson | B27B 5/10 30/379 |
| 2014/0217861 | A1 * | 8/2014 | Cole | A47B 96/18 312/205 |
| 2015/0239088 | A1 * | 8/2015 | Wisenbaker | B24B 23/028 451/353 |
| 2017/0232605 | A1 * | 8/2017 | Morton | B23Q 9/0042 173/37 |
| 2018/0021819 | A1 * | 1/2018 | Schaller | B62B 3/04 134/184 |
| 2018/0354537 | A1 * | 12/2018 | Ho | B62B 3/10 |
| 2020/0023553 | A1 * | 1/2020 | Timmons | B28D 1/045 |
| 2020/0206885 | A1 * | 7/2020 | Pyron | B25H 1/0035 |
| 2020/0231198 | A1 * | 7/2020 | Uriegas | B62B 3/02 |
| 2020/0255045 | A1 * | 8/2020 | Ariturk | B62B 3/10 |
| 2020/0290660 | A1 * | 9/2020 | Wright | B62B 3/02 |
| 2021/0070337 | A1 * | 3/2021 | Bowen, III | B62B 1/26 |

FOREIGN PATENT DOCUMENTS

| | | |
|---|---|---|
| DE | 102007013705 A1 | 9/2008 |
| EP | 1971752 B2 | 6/2016 |
| EP | 2783563 B1 | 9/2016 |
| GB | 2447760 A | 9/2008 |
| GB | 2447760 B | 11/2009 |
| GB | 2447760 C | 4/2010 |
| KR | 200136215 Y1 | 3/1999 |
| KR | 200349319 Y1 | 5/2004 |
| KR | 100938760 B1 | 1/2010 |
| WO | 2020150312 A1 | 7/2020 |
| WO | 2020150334 A1 | 7/2020 |

OTHER PUBLICATIONS

International Search Report and Written Opinion from PCT App No. PCT/US2020/013624 dated May 13, 2020, 10 pgs.

* cited by examiner

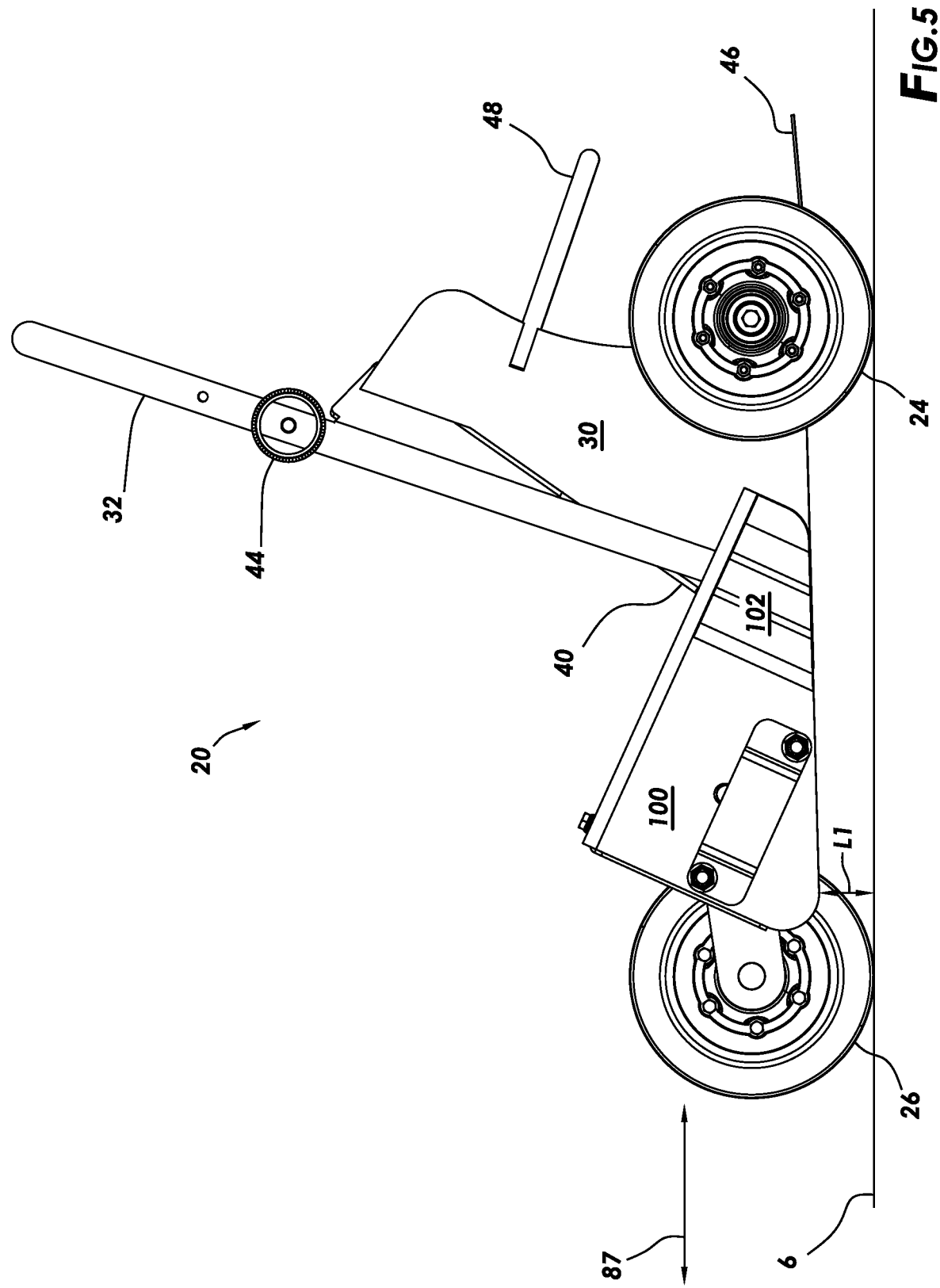

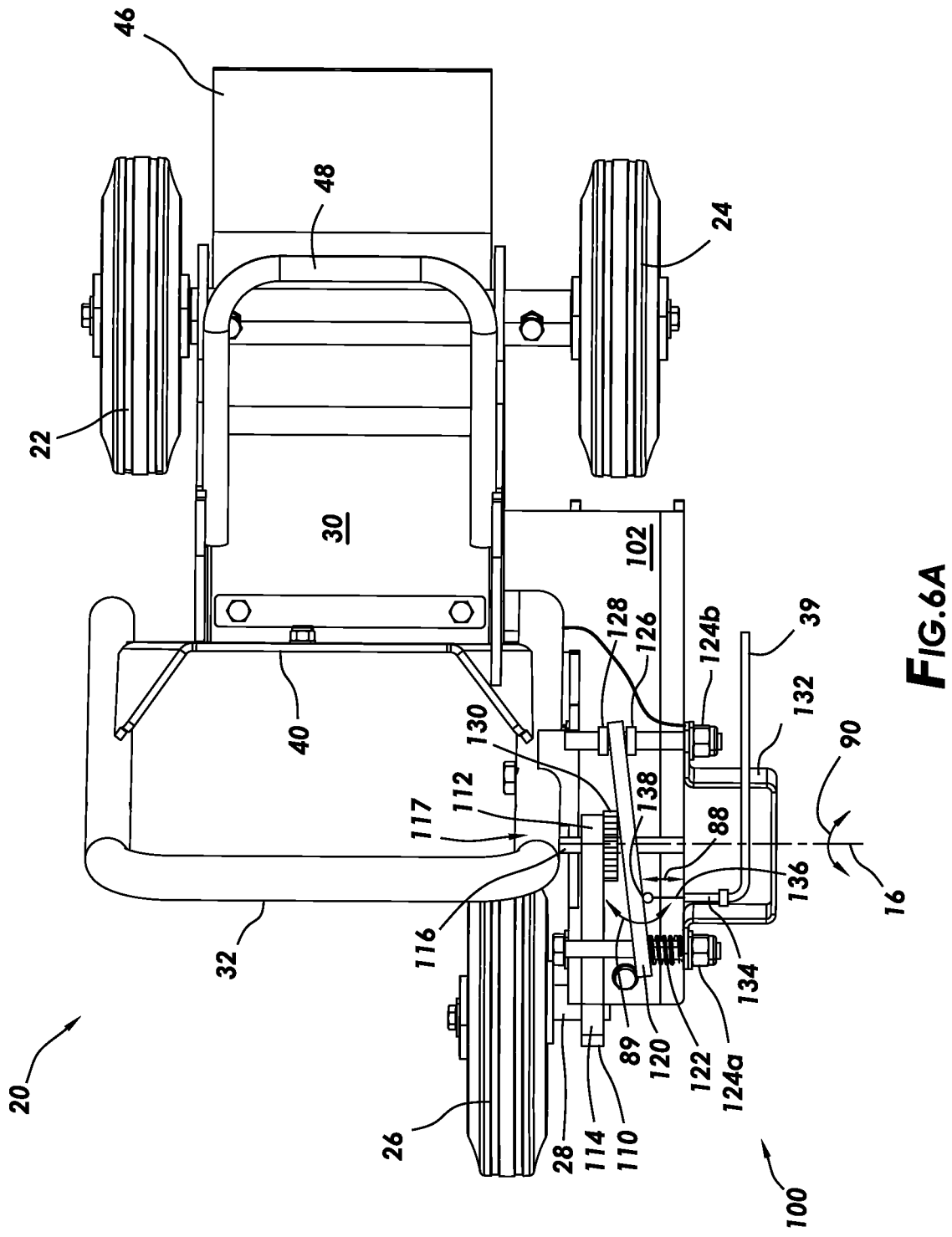

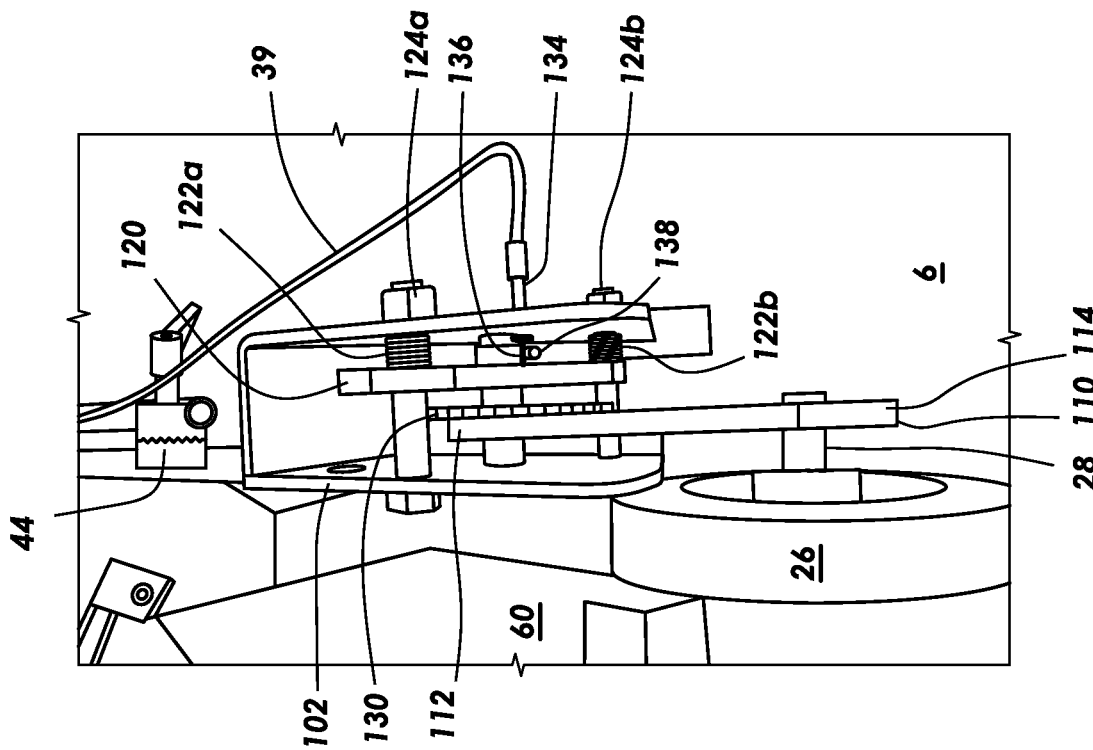
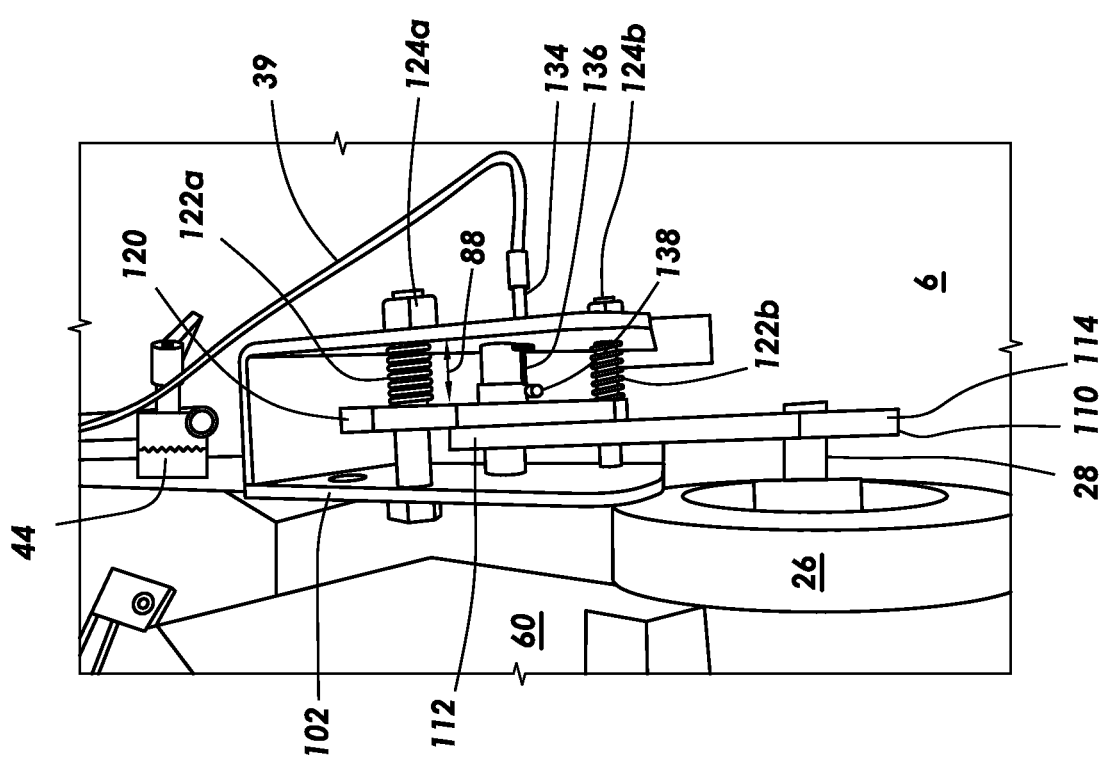

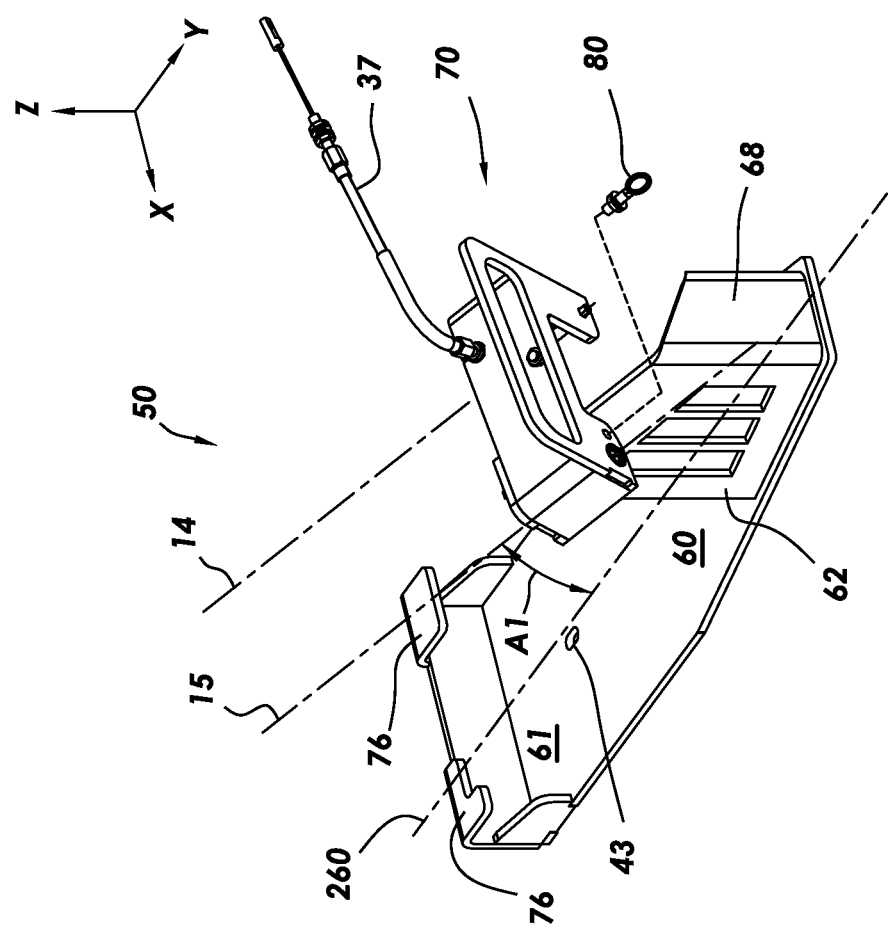
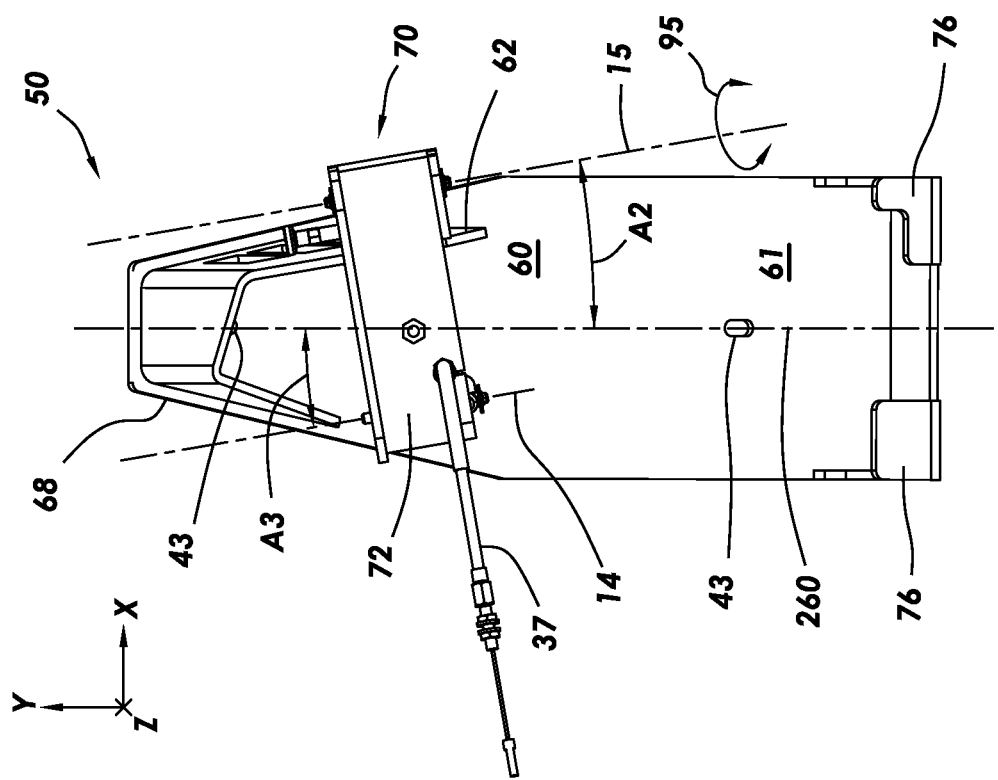

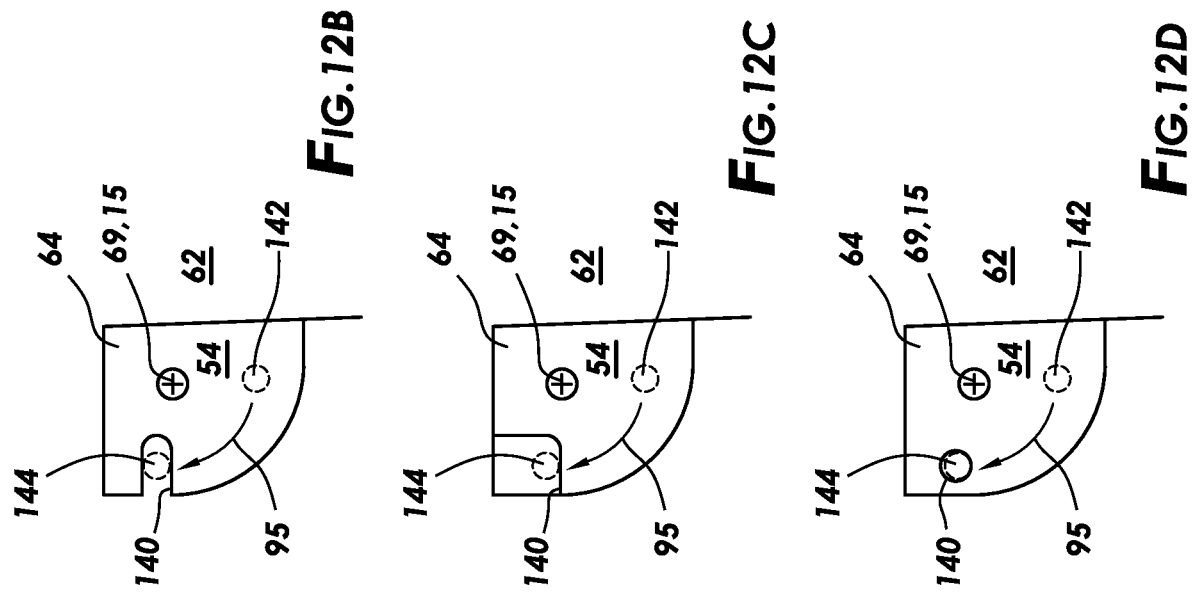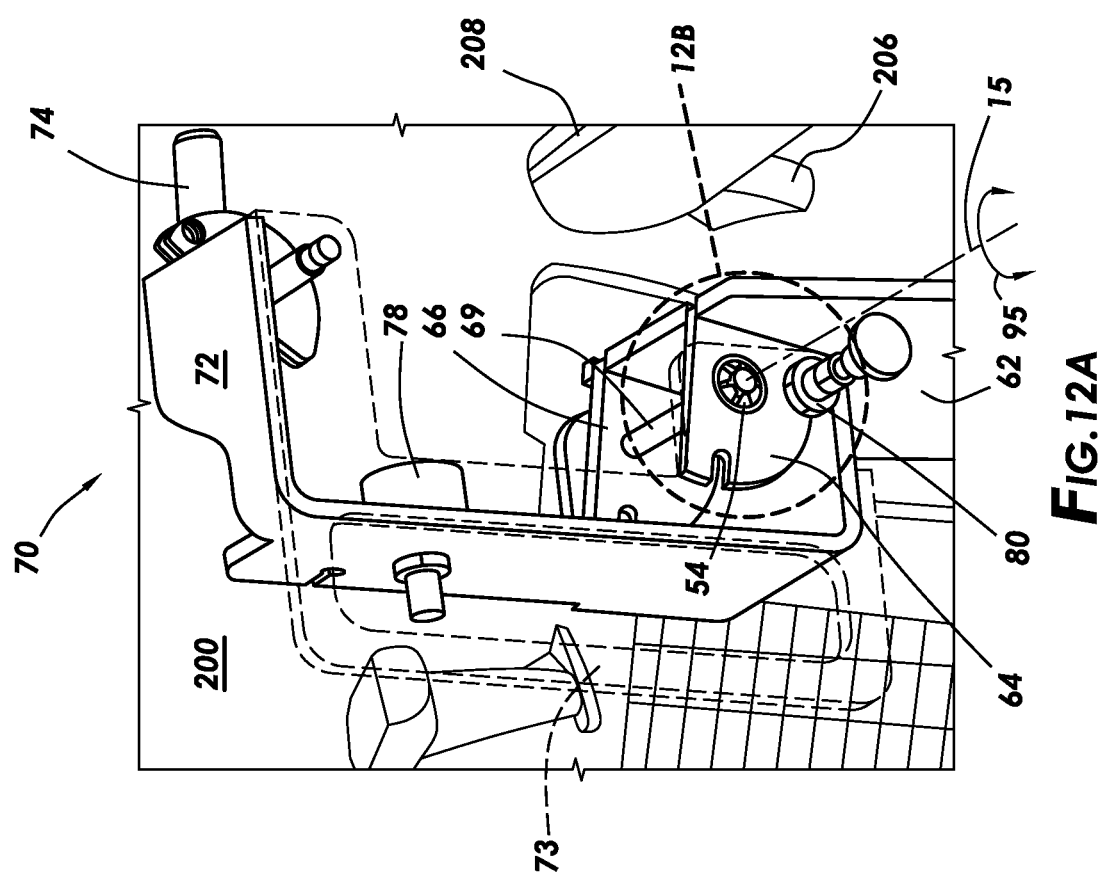

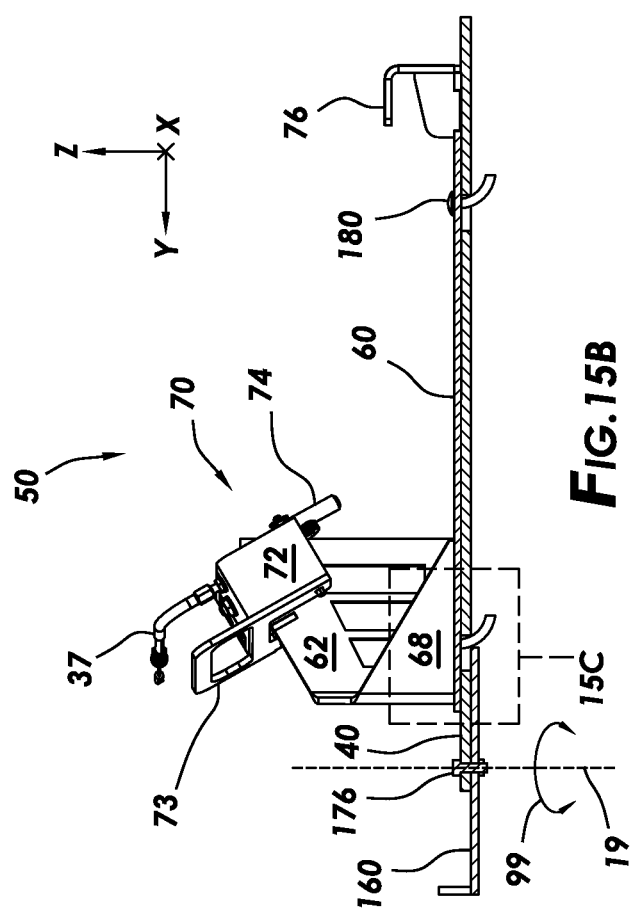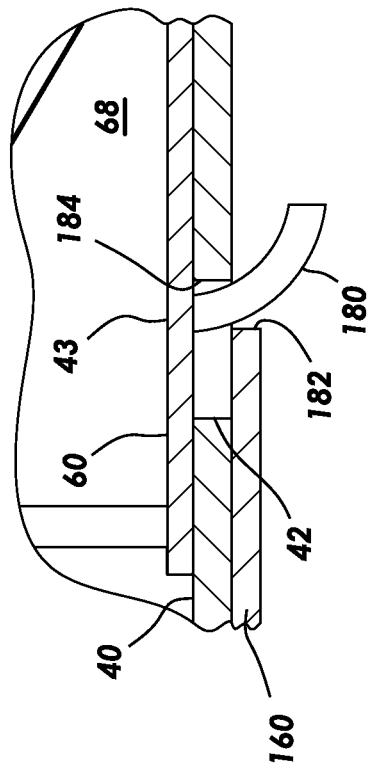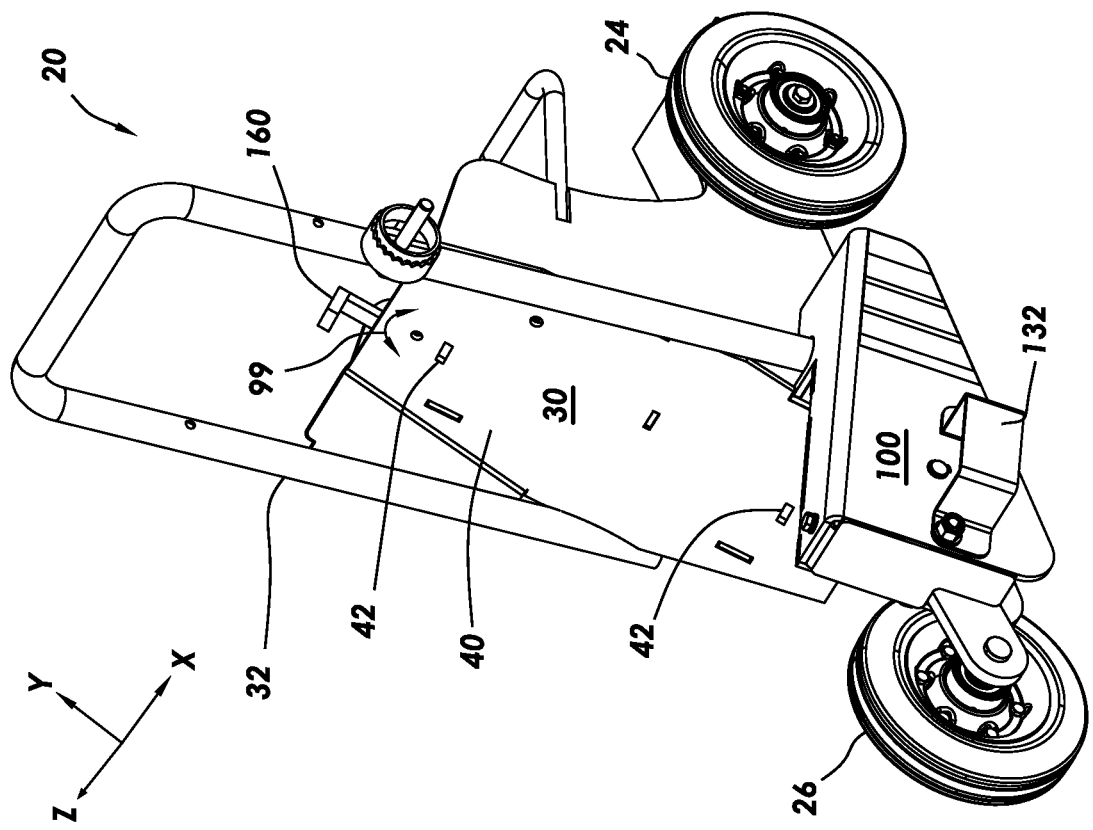

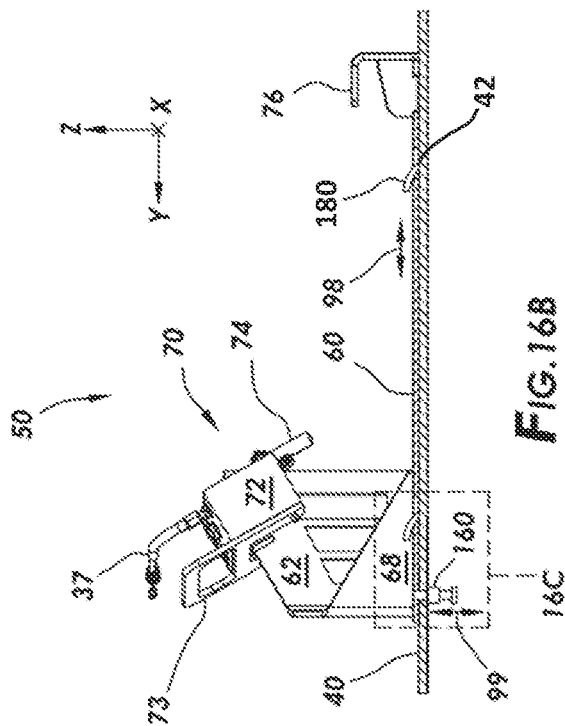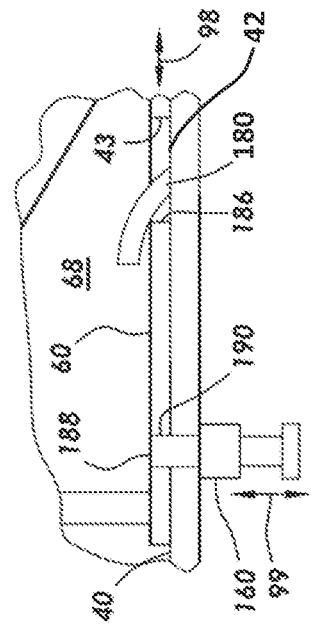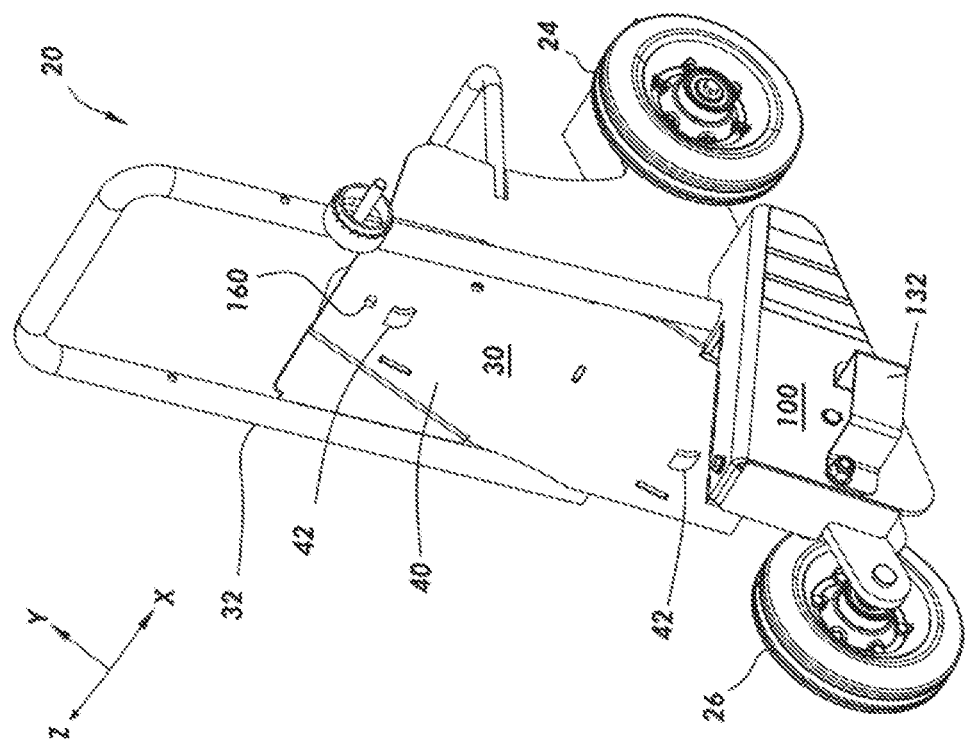

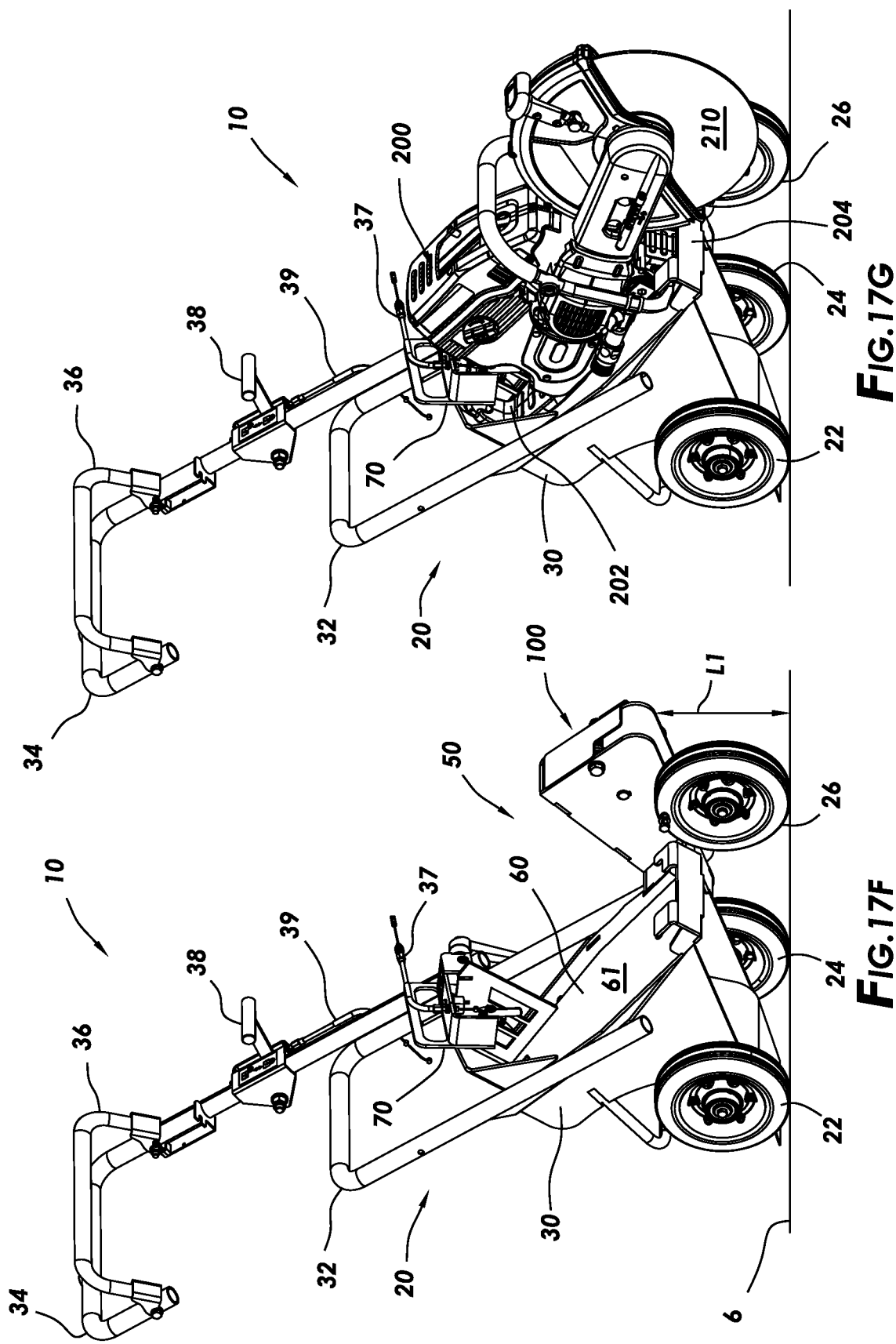

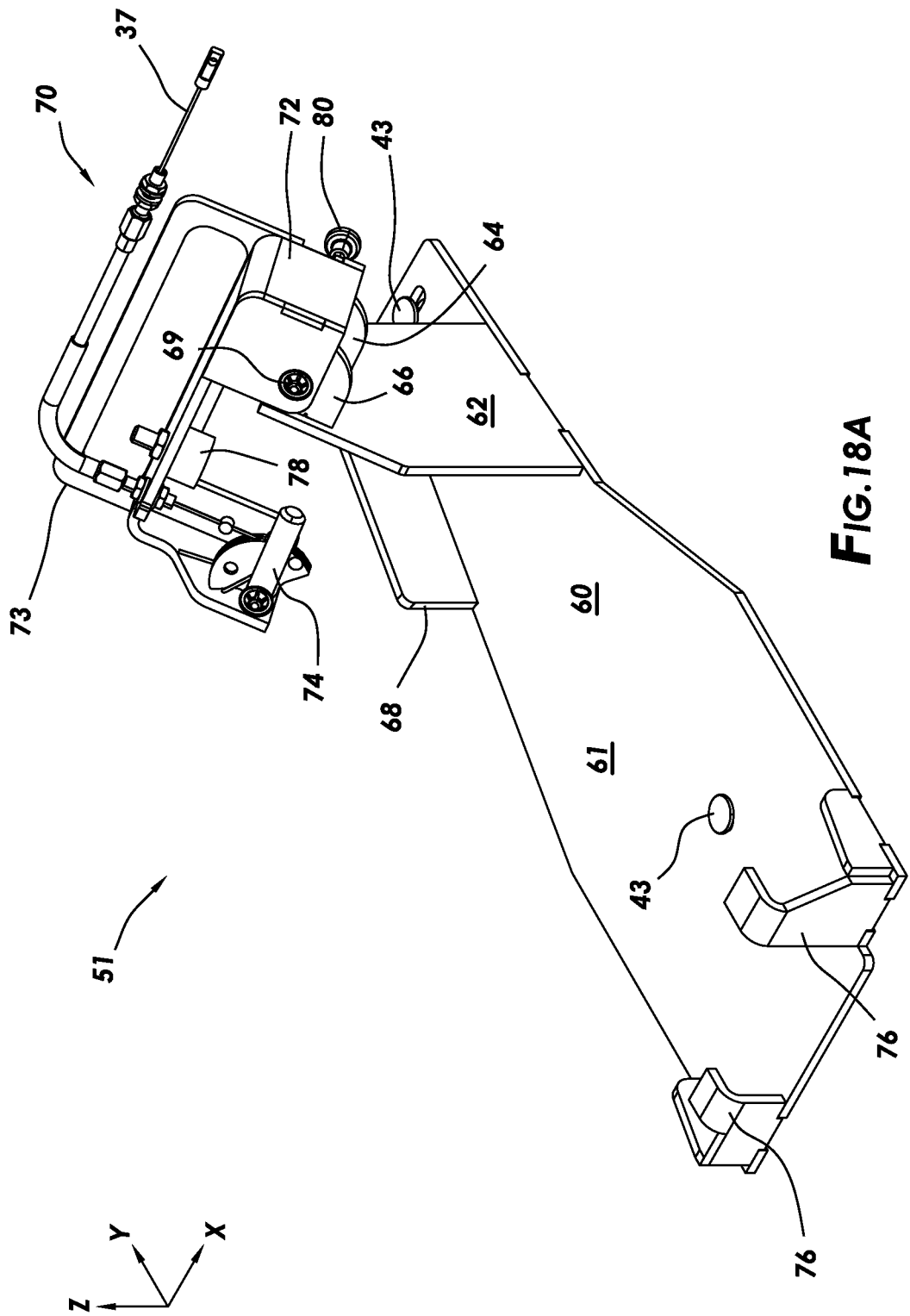

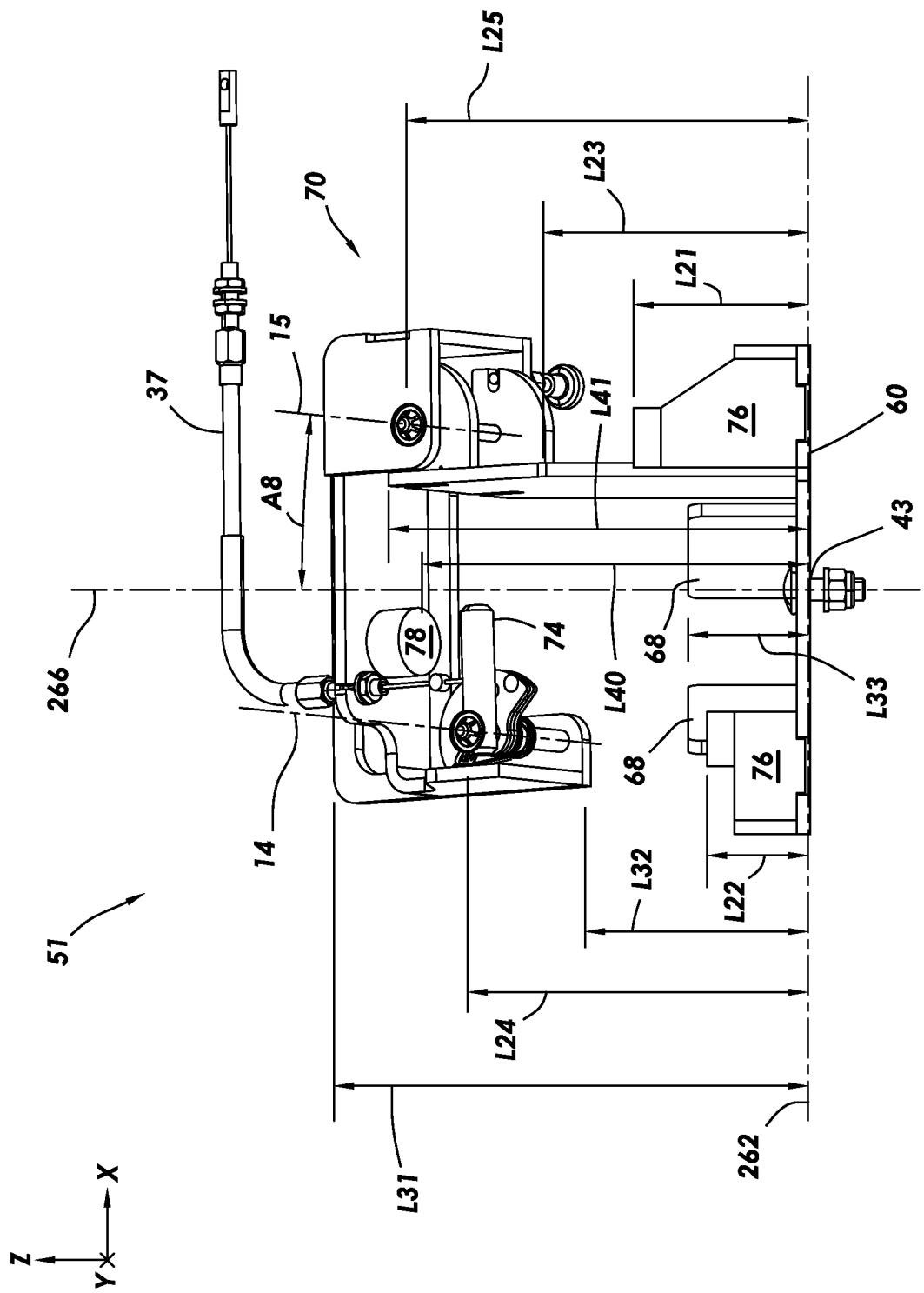

*Example dimensions for the Mounting assemblies (mm).*

| Mounting assembly | Mounting assembly | | | Height bracket 60 | Width Assy 70 |
|---|---|---|---|---|---|
| | Length | Width | Height | | |
| 50 | 473.7 | 166.58 | 203 | 167 | 158 |
| 51 | 477.65 | 180 | 176 | 155 | 167 |
| 52 | 430 | 211 | 332 | 293 | 204 |

TABLE 1

*Dimensions of assemblies 51, 52 compared to assembly 50.*

| Mounting assembly | Mounting assembly | | | Height bracket 60 | Width Assy 70 |
|---|---|---|---|---|---|
| | Length | Width | Height | | |
| 50 | 100.00% | 100.00% | 100.00% | 100.00% | 100.00% |
| 51 | 100.83% | 108.11% | 86.70% | 92.81% | 105.70% |
| 52 | 90.77% | 126.73% | 163.55% | 175.45% | 129.11% |

TABLE 2

*Dimensions of assemblies 50, 52 compared to assembly 51.*

| Mounting assembly | Mounting assembly | | | Height bracket 60 | Width Assy 70 |
|---|---|---|---|---|---|
| | Length | Width | Height | | |
| 50 | 99.17% | 92.50% | 115.34% | 107.74% | 94.61% |
| 51 | 100.00% | 100.00% | 100.00% | 100.00% | 100.00% |
| 52 | 90.02% | 117.22% | 188.64% | 189.03% | 122.16% |

TABLE 3

*Dimensions of assemblies 50, 51 compared to assembly 52.*

| Mounting assembly | Mounting assembly | | | Height bracket 60 | Width Assy 70 |
|---|---|---|---|---|---|
| | Length | Width | Height | | |
| 50 | 110.16% | 78.91% | 61.14% | 57.00% | 77.45% |
| 51 | 111.08% | 85.31% | 53.01% | 52.90% | 81.86% |
| 52 | 100.00% | 100.00% | 100.00% | 100.00% | 100.00% |

TABLE 4

FIG.20

CART SYSTEM FOR SECURING AND TRANSPORTING ON A CART ANY ONE OF MULTIPLE PORTABLE TOOLS

CROSS-REFERENCE TO RELATED APPLICATION(S)

This application claims priority under 35 U.S.C. § 119(e) to U.S. Patent Application No. 62/793,555, entitled "CART SYSTEM FOR SECURING AND TRANSPORTING ON A CART ANY ONE OF MULTIPLE PORTABLE TOOLS," by Gabriel A. URIEGAS et al., filed Jan. 17, 2019, which application is assigned to the current assignee hereof and incorporated herein by reference in its entirety.

TECHNICAL FIELD

The present disclosure generally relates to carts for tools and, in particular, carts for high-speed portable power tools, such as high-speed portable saws.

BACKGROUND

The portable tools, such as high-speed portable saws, can be hand held by an operator to cut material, such as wood, tile, masonry, concrete, metal, etc. The operator may normally grab a front handle of the tool with one hand and a rear handle of the tool with the other hand to manually manipulate the tool (gasoline, electric, pneumatic, hydraulic, or battery powered) to cut the material. However, it can be difficult for an operator to cut a material at a constant depth while holding a portable tool by hand. It will be readily appreciated that improvements in the arts of carts for portable tools are continually needed.

SUMMARY

This disclosure is drawn to mounting one of multiple portable tools to a wheeled cart and transporting the portable tool along a surface on the wheeled cart. The one of the multiple portable tools can be secured to the wheeled cart for transporting along the surface and adjusting a height of the cart from the surface. This allows the portable tools to be used both for hand-held operations and for walk-behind operations.

One general aspect is a system that can include a cart and multiple mounting assemblies, with each one of the multiple mounting assemblies configured to be interchangeably attached to the cart, and with each one of the multiple mounting assemblies being configured to receive one of multiple portable tools and secure the one of the multiple portable tools to the cart.

One general aspect is a system that can include a first mounting assembly configured to be removably attached to the cart, with the first mounting assembly configured to receive a first portable tool and secure the first portable tool to the cart, and a second mounting assembly configured to be removably attached to the cart, with the second mounting assembly configured to receive a second portable tool and secure the second portable tool to the cart, with the first mounting assembly being different compared to the second mounting assembly.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. Embodiments are described in detail hereinafter with reference to the accompanying figures, in which:

FIG. 5 is a representative side view of a cart for a portable tool, according to one or more example embodiments;

FIGS. 6A-6B are representative partial cross-sectional top views of a cart for a portable tool, each cart having a height adjustment mechanism, according to one or more example embodiments;

FIGS. 7A-7B are representative front views of a cart for a portable tool showing operation of the height adjustment mechanism of FIG. 6B, according to one or more example embodiments;

FIG. 10A is a representative top view of a mounting assembly of the cart system shown in FIGS. 2-3, according to one or more example embodiments;

FIG. 10B is a representative perspective view of the mounting assembly of FIG. 10A, according to one or more example embodiments;

FIG. 12A is a representative perspective partial translucent view of a clamping assembly in a disengaged position, according to one or more example embodiments;

FIGS. 12B-12D are representative front views of various retention features of the clamping device with reference to the detail 12B indicated in FIG. 12A, according to one or more example embodiments.

FIG. 15A is a representative perspective view of a cart of the cart system as shown in FIGS. 2-3 with a locking device for securing a mounting assembly to the cart, according to one or more example embodiments;

FIG. 15B is a representative partial cross-sectional view of a mounting assembly attached to a cart with a locking device securing the mounting assembly to the cart, according to one or more example embodiments;

FIG. 15C is a representative detailed partial cross-sectional view of a portion of a locking device securing the mounting assembly to the cart, according to one or more example embodiments;

FIG. 16A is a representative perspective view of a cart of the cart system as shown in FIGS. 2-3 with a locking device for securing a mounting assembly to the cart, according to one or more example embodiments;

FIG. 16B is a representative partial cross-sectional view of a mounting assembly attached to a cart with a locking device securing the mounting assembly to the cart, according to one or more example embodiments;

FIG. 16C is a representative detailed partial cross-sectional view of a portion of a locking device securing the mounting assembly to the cart, according to one or more example embodiments;

FIG. 17F is a representative perspective view of a cart system with the mounting assembly of FIG. 17A attached, according to one or more example embodiments;

FIG. 17G is a representative perspective view of a cart system with a representative portable tool installed in the mounting assembly of FIG. 17A, according to one or more example embodiments;

FIG. 18A is a representative perspective view of another mounting assembly, according to one or more example embodiments;

FIG. 18D is a representative front view of the mounting assembly of FIG. 18A with relative dimensions identified, according to one or more example embodiments;

FIG. 20 includes tables of that compare example dimensions of various mounting assemblies, according to one or more embodiments.

DETAILED DESCRIPTION OF THE DISCLOSURE

Generally, this disclosure provides a system and method for securely attaching a mounting assembly to a cart and mounting a portable tool to the mounting assembly. It should be understood that the portable tool can also be mounted to the mounting assembly before being attached to the cart. This cart system can allow a portable tool to be used as a walk-behind tool for cutting along a surface at a controlled depth.

Figure 1:
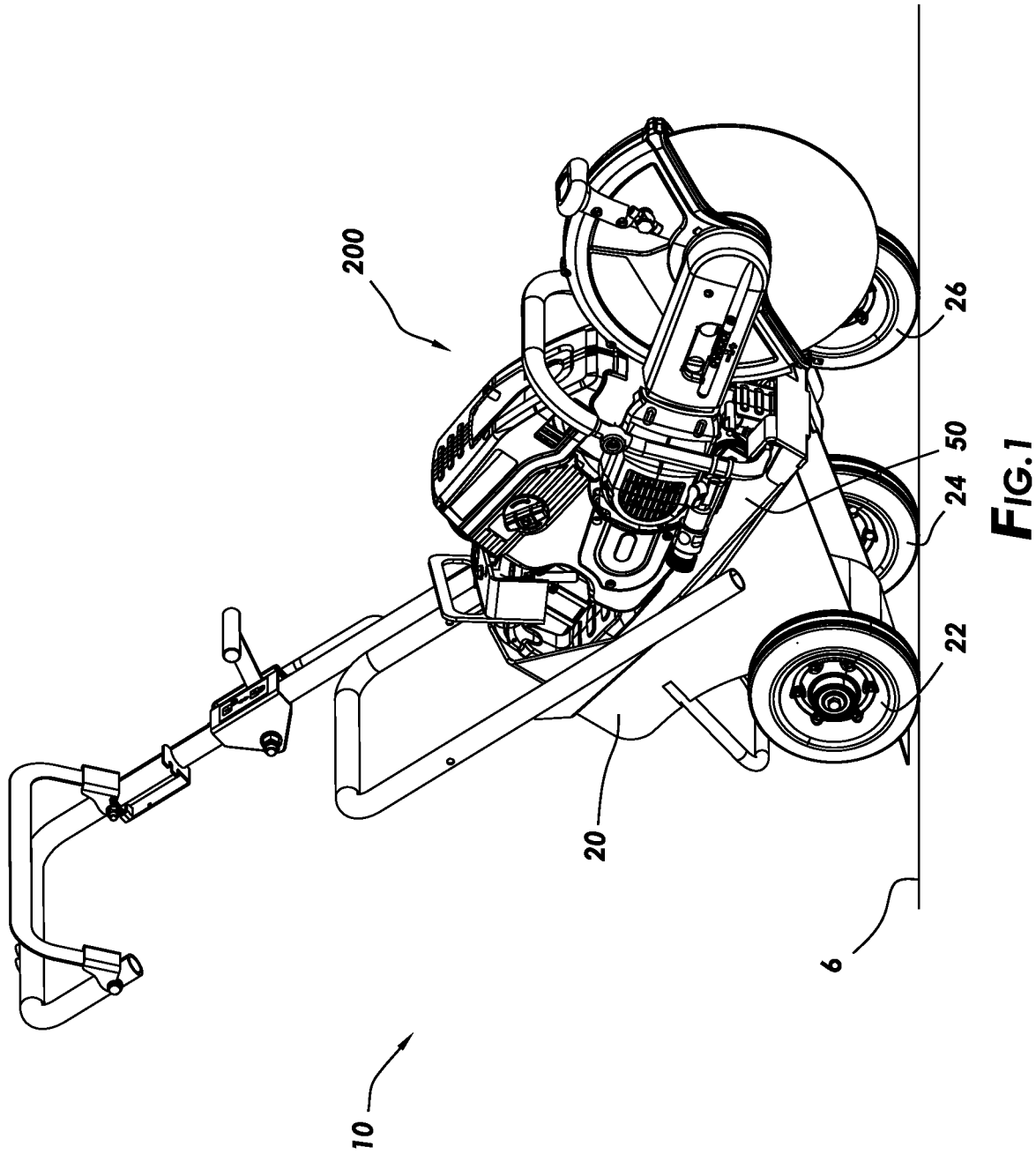
FIG. 1 is a representative perspective view of a cart system with a portable tool mounted to a cart, according to one or more example embodiments.

FIG. 1 is a representative perspective view of a cart system 10 with a portable tool 200 mounted to a cart 20, according to one or more example embodiments. The cart 20 can have multiple wheels 22, 24, 26 rotationally attached to the cart 20. The portable tool 200 is mounted to a mounting assembly 50 which has been attached to the cart 20. In a preferred embodiment, the cart has two rear wheels 22, 24 and one front wheel 26. However, it should be understood that more or fewer wheels can be used. For example, dual wheels can be rotationally attached to any one or more of the wheel positions for wheels 22, 24, 26. The wheels 22, 24, 26 allow an operator to maneuver the cart across the surface 6. If a portable tool 200 with a saw blade is attached, the user can cut a groove in the surface 6 at a desired depth as the operator maneuvers the cart 20.

Figure 2:
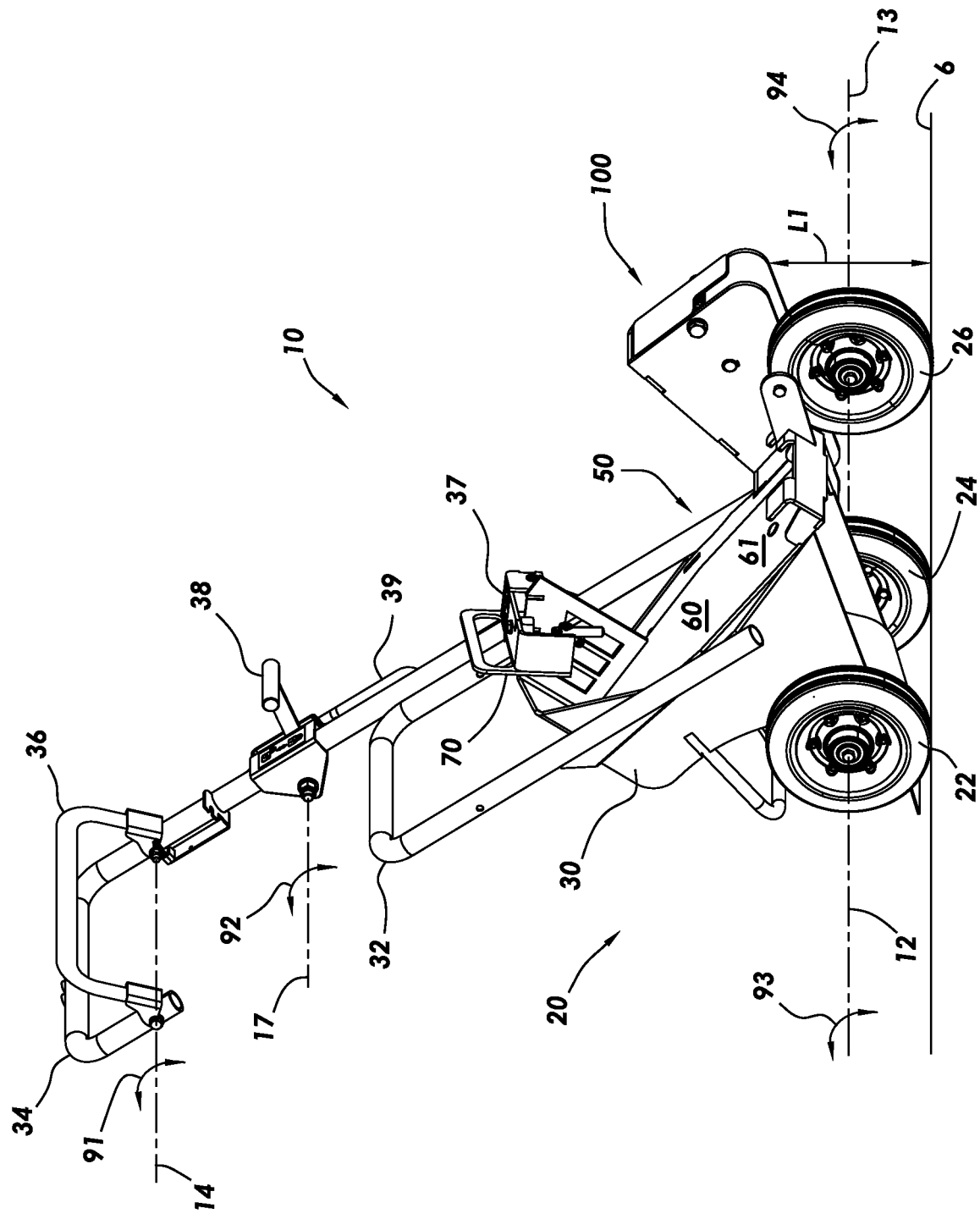
FIG. 2 is a representative perspective view of a cart system with a mounting assembly for mounting a portable tool to a cart, according to one or more example embodiments.

FIG. 2 is a representative perspective view of a cart system 10 that can be used to mount a portable tool 200 to a cart, according to one or more example embodiments. The cart system 10 can include a cart 20, a mounting assembly 50, an operator handle 34, remote manual controls 36, 38 mounted to the operator handle 34, and a height adjustment mechanism 100. The cart 20 can include a body 30, a support structure 32, wheels 22, 24, 26, and the height adjustment mechanism 100. The rear wheels 22, 24 are rotationally attached to the body 30 and configured to rotate 93 about the axis 12. In some embodiments, an axle (not shown) can be rotationally attached to the body 30 with the rear wheel 22 rotationally fixed to one end of the axle and the rear wheel 24 rotationally fixed to an opposite end of the axle, thereby positioning the rear wheels 22, 24 at left and right sides of the cart and positioning the wheels 22, 24 at a rear of the body 30. Alternatively, each rear wheel 22, 24 can be attached separately to the body 30 via individual rods attached to the body, with each wheel 22, 24 being rotationally mounted to a respective one of the individual rods. The rods can be fixedly attached to the body 30, such as by welding, or removably attached via threaded ends of the rods, or attached by other means that secures the rods to the body such that the rods are rotationally fixed with the body. Alternatively, the rods can be rotationally fixed or rotationally attached to respective ones of the wheels 22, 24 with the rods rotationally attached to the body, allowing rotation of the wheel and the rod relative to the body 30. The front wheel 26 can be rotationally attached to an adjustable arm in the height adjustment mechanism 100, with the front wheel configured to rotate 94 about the axis 13. As the front wheel 26 is manipulated by the height adjustment mechanism 100, the distance L1 of the cart body from the surface 6 can be changed to raise and lower the cart body 30 relative to the surface 6. A control 38, mounted on the operator handle 34, can be mechanically coupled to the height adjustment mechanism 100 via a cable assembly 39. The control 38 can be manipulated (e.g. rotated 92 about axis 17) by an operator to either allow a height adjustment (e.g. allow changes to distance L1) or prevent the height adjustment (e.g. prevent changes to distance L1).

The mounting assembly 50 can be removably attached to the cart body 30. The mounting assembly 50 can include a clamping assembly 70 and a mounting bracket 60 with a base plate 61. The mounting bracket 60 can include a base plate 61 with various structures connected to the base plate 61 to support a portable tool 200 when installed on the cart system 10. The clamping assembly 70 can be rotationally attached to the mounting bracket 60 via a support structure and used to clamp the portable tool 200 to the mounting assembly 50, thus securing the portable tool 200 to the cart 20. A control 36, mounted on the operator handle 34, can be mechanically coupled to the clamping assembly 70 via a cable assembly 37. The control 36 can be manipulated (e.g. rotated 91 about axis 14) by an operator to remotely operate a trigger on the portable tool 200.

Figure 3:
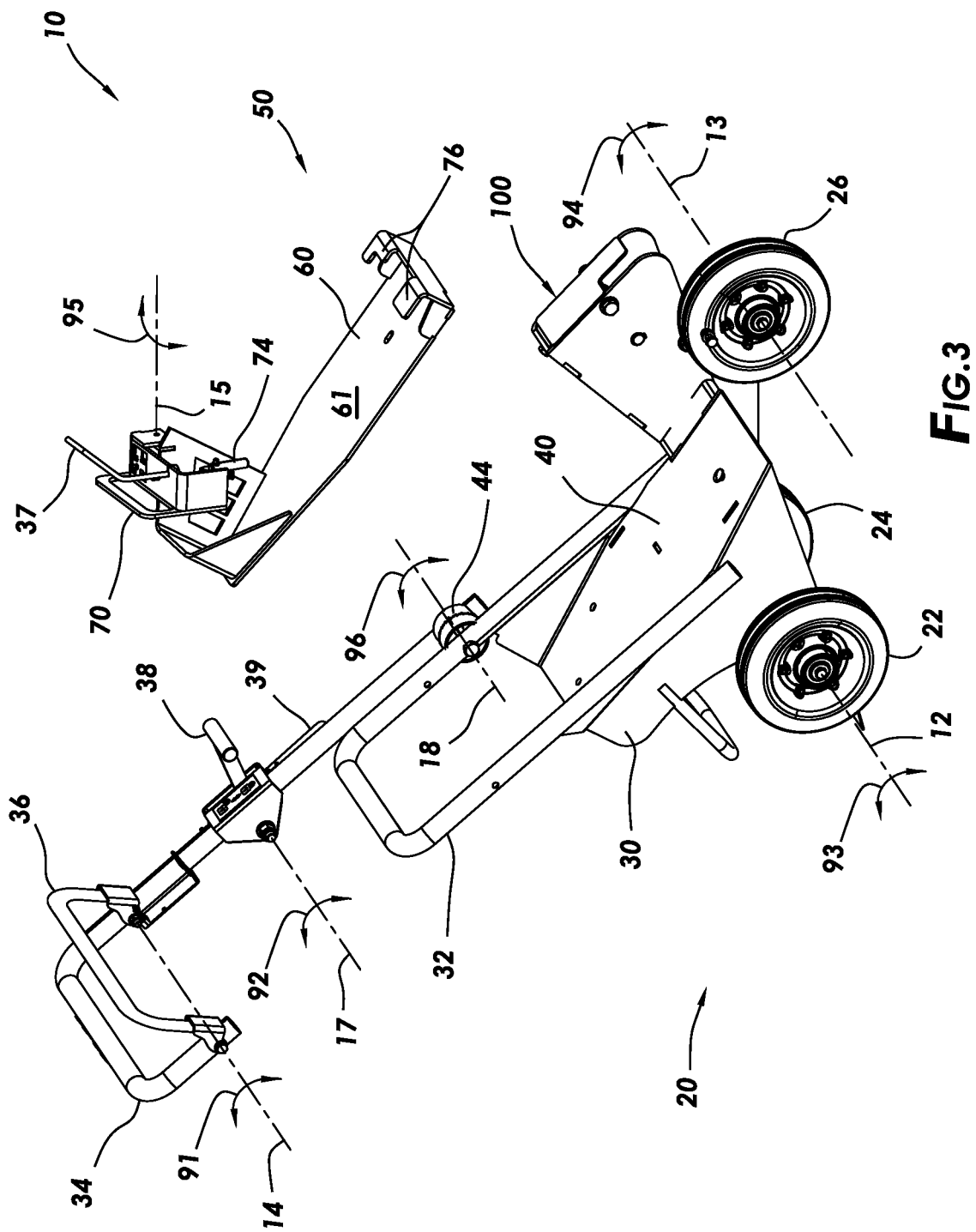
FIG. 3 is a representative perspective exploded view of a cart system with a cart and a mounting assembly for mounting a portable tool to the cart, according to one or more example embodiments.

FIG. 3 is a representative perspective exploded view of a cart system 10 with a cart 20 and a mounting assembly 50 for mounting a portable tool to the cart 20, according to one or more example embodiments. The mounting assembly 50 can be removably attached to the cart 20 by various means which will be described later. In this example, a base plate 61 of the mounting bracket 60 can be bolted to the surface 40 of the cart 20 through matching holes in each of the base plate 61 and the surface 40. An adjustable handle 34 can be attached to the cart 20 at the attachment point 44. The attachment point 44 can allow the handle 34 to be rotated 96 about the axis 18 when a fastener at the attachment point 44 is loosened, and rotation 96 about the axis 18 can be prevented when the fastener at the attachment point 44 is tightened. This allows for adjusting the handle 34 to different heights to accommodate different operators.

Figure 4:
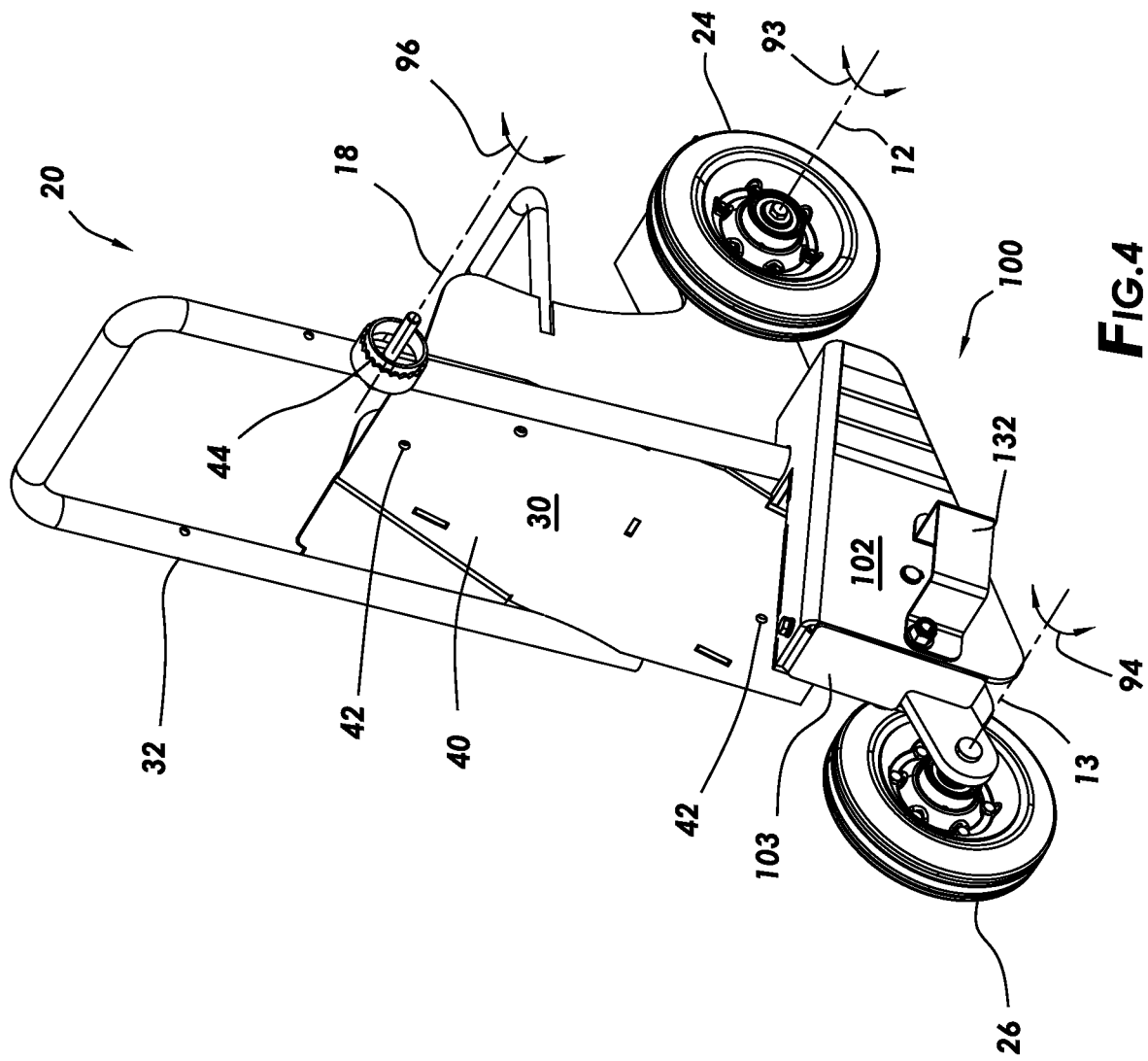
FIG. 4 is a representative perspective view of a cart for a portable tool, according to one or more example embodiments.

FIG. 4 is a representative right side perspective view of a cart for a portable tool, according to one or more example embodiments. The cart 20 is shown without a handle 34 and without a mounting assembly 50. Attachment positions 42 can be configured to receive fasteners 53 for attaching a mounting assembly 50 to the surface 40. The cart 20 includes the height adjustment mechanism 100 for adjusting a height L1 of the cart 20 relative to the surface 6 (see FIG. 5). A guard 132 can be attached to a portion of the height adjustment mechanism 100 to protect control cables that may be attached to the height adjustment mechanism 100. In this example embodiment, the height adjustment mechanism 100 is contained within a generally inverted U-shaped cover 102 that is inclined from the rear toward the front with the largest portion of the cover 102 at the front of the cover 102. The cover 102 is fixedly attached to the body and provides structural support for components of the height adjustment mechanism 100. A plate 103 can be removably attached to the cover 102 to shield the height adjustment mechanism 100 from debris and provide a more esthetically pleasing appearance. The plate 103 can also provide a gauge that limits the body 30 from being lowered past a desired point. The plate 103 can thereby limit a depth of cut of a portable saw (i.e. an example of a portable tool 200). The height adjustment mechanism 100 will be described in more detail below.

FIG. 5 is a representative side view of the cart 20 of FIG. 4 for a portable tool 200, according to one or more example embodiments. The front wheel 26 is attached to an arm of the height adjustment mechanism 100 that extends from the body 30. The arm is rotationally attached to the body 30. Rotation of the arm can vary the height L1 of the cart 20 from the surface 6. The cart may include a rear shelf 46 which can be used by an operator to carry items on the cart 20. A holder 48 can be used to loosely secure the items on the shelf 46. An operator can propel the cart 20 forward or backward across the surface as indicated by the arrows 87 (i.e. direction of travel). The operator can also use the handle 34 (not shown) to reorient the cart to travel in any direction across the surface 6.

FIG. 6A is a representative partial cross-sectional top view of a cart 20 for a portable tool 200, the cart 20 having a height adjustment mechanism 100, according to one or more example embodiments. FIG. 6A is from a perspective of the cart of FIG. 5 as indicated by the arrow in FIG. 5. The height adjustment mechanism 100 can include an adjustable arm 110 and a moveable plate 120 positioned within the inverted U-shaped cover 102. The U-shaped cover 102 is partially cut-away to reveal components of the height adjustment mechanism 100. The adjustable arm 110 can have a front axle 28 mounted at a front end 114 of the adjustable arm 110 with a rod 116 attached at an opposite rear end 112 of the adjustable arm 110. The front axle 28 and the rod 116 can be fixedly mounted at right angles to the body of the adjustable arm 110. The front wheel 26 can be rotationally mounted to the front axle 28. The rod 116 can be rotationally mounted to a forward position 117 of the cart 20 (e.g. a position within the U-shaped cover 102). The rod 116 extends from both sides of the arm 110 to be rotationally supported by both sides of the U-shaped cover 102, such that the adjustable arm 110 rotates 90 about the axis 16. A circular disk 130 is mounted to the adjustable arm 110 such that it rotates with the arm 110.

A pair of rods 124a, 124b can span across the U-shaped cover 102 and be positioned on opposite sides of the rod 116, with a moveable plate 120 slidably mounted to the rods. One side of the moveable plate 120 may be constrained by keepers 126, 128 to minimize movement of that side along the rod 124b. Another side of the moveable plate 120 may be allowed to slide along the rod 124a. When a cable 136 in a cable assembly 39 is pulled (arrows 88), the moveable plate 120 can rotate away from the adjustable arm 110 and store energy in a biasing device 122 (i.e. compress or elongate the biasing device). It should be understood that one side of the moveable plate 120 can be configured more like a hinge instead of using the keepers 126, 128 on the rod 124b.

The circular disk 130 can have a plurality of teeth around it's perimeter that form a pattern (e.g. a gear sprocket). The moveable plate 120 has a recess formed in a surface that faces the circular disk 130. The recess has a complimentarily shaped pattern that receives the circular disk 130. When the circular disk 130 is engaged in the recess, the adjustable arm 110 is not permitted to rotate about the axis 16 (arrows 90). This locks the front wheel 26 in position and sets the height L1 of the cart relative to the surface 6. When the circular disk 130 is disengaged from the recess, then the adjustable arm is permitted to rotate about the axis 16. This allows the position the front wheel 26 to be adjusted, thereby allowing the height L1 of the cart relative to the surface 6 to be adjusted.

Therefore, an operator may pull the cable 136 in the cable assembly 39 and rotate the moveable plate 120 (arrows 89), which can, in this configuration, compress the biasing device 122 and disengage the circular disk 130 from the recess in the moveable plate 120. The height L1 can then be adjusted by rotating the adjustable arm 110 about the axis 16. The operator may release the cable 136 allowing the biasing device 122 to urge the moveable plate 120 back toward the circular disk 130, thereby engaging the circular disk 130 with the recess and preventing further rotation of the adjustable arm 110 about the axis 16. The cable assembly 39 can be used by an operator to remotely control the rotation of the moveable plate 120. The cable assembly 39 can have a cable 136 slidably positioned within an outer jacket. A fitting 134 can be attached to the cover 102 securing an end of the outer jacket to the cover 102 while allowing the cable 136 to slide relative to the outer jacket. An end of the cable 136 can be connected to a feature 138 on the moveable plate 120, such that pulling on the cable 136 rotates 89 the plate 120 in one direction. When the cable 136 is released, the biasing device 122 rotates 89 the plate 120 in an opposite direction. The guard 132 can provide protection to the cable assembly 39 and the fitting 134 that is mounted to the cover 102.

Figure 6B:
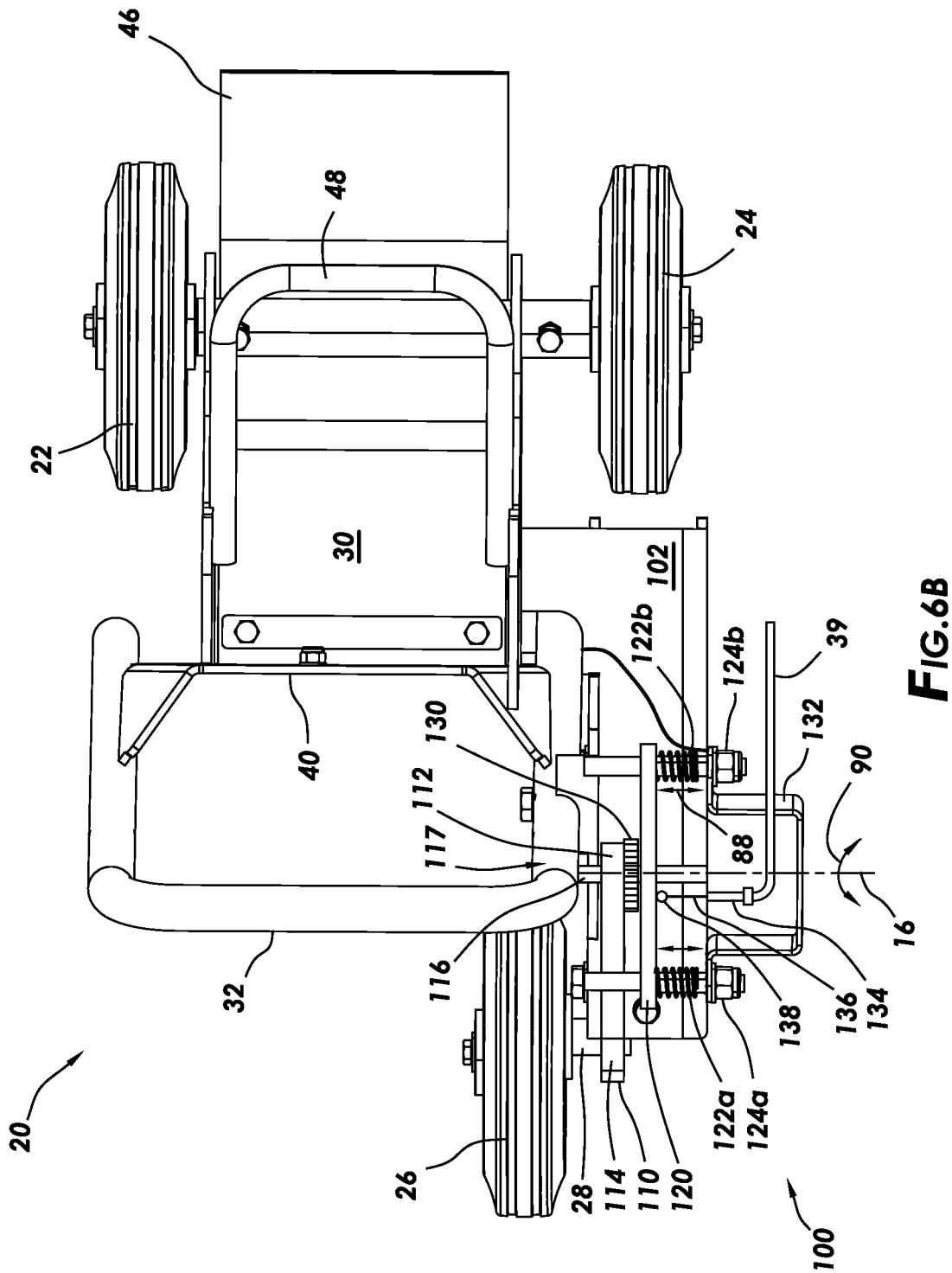

FIG. 6B is a representative partial cross-sectional top view of a cart for a portable tool, the cart having a height adjustment mechanism 100, according to one or more example embodiments. FIG. 6B is from a perspective of the cart as indicated by the arrow in FIG. 5. The height adjustment mechanism 100 can include an adjustable arm 110 and a moveable plate 120 positioned within the inverted U-shaped cover 102. The U-shaped cover 102 is partially cut-away to reveal components of the height adjustment mechanism 100. The adjustable arm 110 can have a front axle 28 mounted at a front end 114 of the adjustable arm 110 with a rod 116 attached at opposite rear end 112 of the adjustable arm 110. The front axle 28 and the rod 116 are fixedly mounted at right angles to a body of the adjustable arm 110. The front wheel 26 can be rotationally mounted to the front axle 28. The rod 116 can be rotationally mounted to a forward position 117 of the cart 20 (e.g. a position within the U-shaped cover 102). The rod 116 extends from both sides of the arm 110 to be rotationally supported by both sides of the U-shaped cover 102, such that the adjustable arm 110 rotates 90 about the axis 16. A circular disk 130 is mounted to the adjustable arm 110 such that it rotates with the arm 110.

A pair of rods 124a, 124b can span across the U-shaped cover 102 and be positioned on opposite sides of the rod 116, with a moveable plate 120 slidably mounted to the rods. When a cable 136 in a cable assembly 39 is pulled (arrows 88), the moveable plate 120 can move laterally away from the adjustable arm 110 and store energy in the biasing devices 122a, 122b (i.e. compress or elongate the biasing device). The circular disk 130 can have a plurality of teeth around it's perimeter that form a pattern (e.g. a gear sprocket). The moveable plate 120 has a recess formed in a surface that faces the circular disk 130. The recess has a complimentarily shaped pattern that receives the circular disk 130. When the circular disk 130 is engaged in the recess, the adjustable arm 110 is not permitted to rotate about the axis 16 (arrows 90). This locks the front wheel 26 in position and sets the height L1 of the cart relative to the surface 6. When the circular disk 130 is disengaged from the recess, then the adjustable arm is permitted to rotate about the axis 16. This allows the position the front wheel 26 to be adjusted, thereby allowing the height L1 of the cart relative to the surface 6 to be adjusted.

Therefore, an operator may pull the cable 136 in the cable assembly 39 and laterally move the plate 120 (arrows 88), which can compress (in this configuration) the biasing devices 122a, 122b and disengage the circular disk 130 from the recess in the moveable plate 120. The height L1 can then be adjusted by rotating the adjustable arm 110 about the axis 16. The operator may release the cable 136 allowing the biasing devices 122a, 122b to urge the moveable plate 120 back toward the circular disk 130, thereby engaging the circular disk 130 with the recess and preventing further rotation of the adjustable arm 110 about the axis 16. The cable assembly 39 can be used by an operator to remotely control the lateral position of the moveable plate 120. The cable assembly 39 can have a cable 136 slidably positioned within an outer jacket. A fitting 134 can be attached to the cover 102 securing an end of the outer jacket to the cover 102 while allowing the cable 136 to slide within the outer jacket. An end of the cable 136 can be connected to a feature 138 on the moveable plate 120, such that pulling on the cable 136 laterally moves (arrows 88) the plate 120 in one direction. When the cable 136 is released, the biasing devices 122a, 122b can laterally move (arrows 88) the plate 120 in an opposite direction. The guard 132 can provide protection to the cable assembly 39 and the fitting 134 that is mounted to the cover 102.

FIG. 7A is a front view of the height adjustment mechanism 100 in the U-shaped cover 102 without the plate 103 being installed for clarity. As can be seen, the moveable plate 120 has been moved into engagement with the circular disk 130, with the biasing devices 122a, 122b extended, and the cable 136 released. Since the moveable plate 120 is engaged with the adjustable arm 110, the front wheel is locked in position. However, FIG. 7B shows the cable 136 pulled, which caused the moveable plate to move laterally away from adjustable arm 110 and disengage the circular disk 130. Notice that the biasing devices 122a, 122b compressed to store energy. If the biasing devices 122a, 122b were mounted on the respective rods 124a, 124b and attached to the moveable plate 120 and the body 30, the biasing devices 122a, 122b could be elongated to store energy. When the position of the front wheel 26 is adjusted to a desired position, the cable can again be released causing the biasing devices 122a, 122b to urge the moveable plate 120 back into engagement with the circular disk 130 and locking the front wheel in its position, thus returning to the configuration shown in FIG. 7A.

Figure 8B:
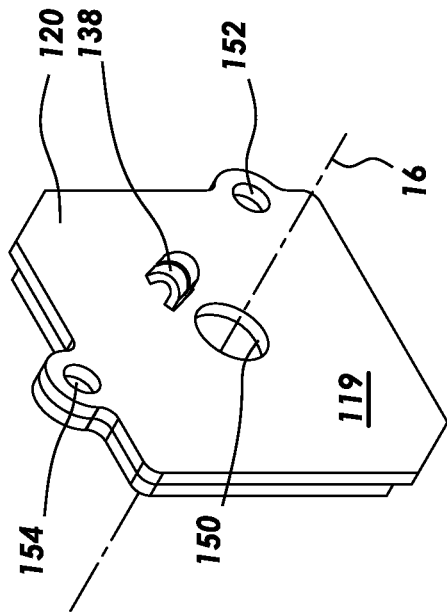
FIGS. 8B-8C are representative perspective views of a moveable plate of the adjustable height mechanism, such as in FIGS. 6A-6B, according to one or more example embodiments.
Figure 8C:
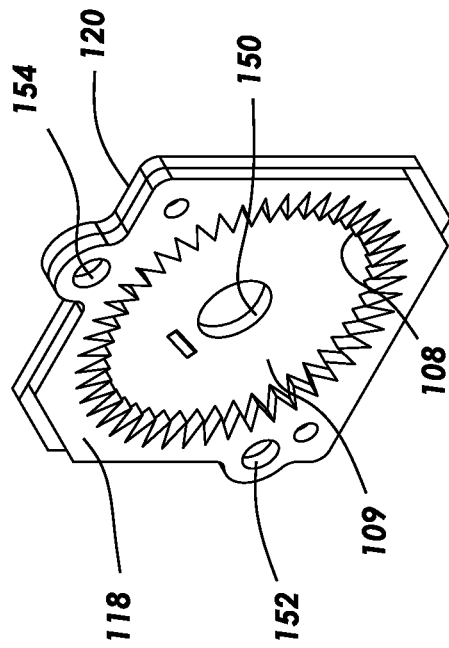
Figure 8A:
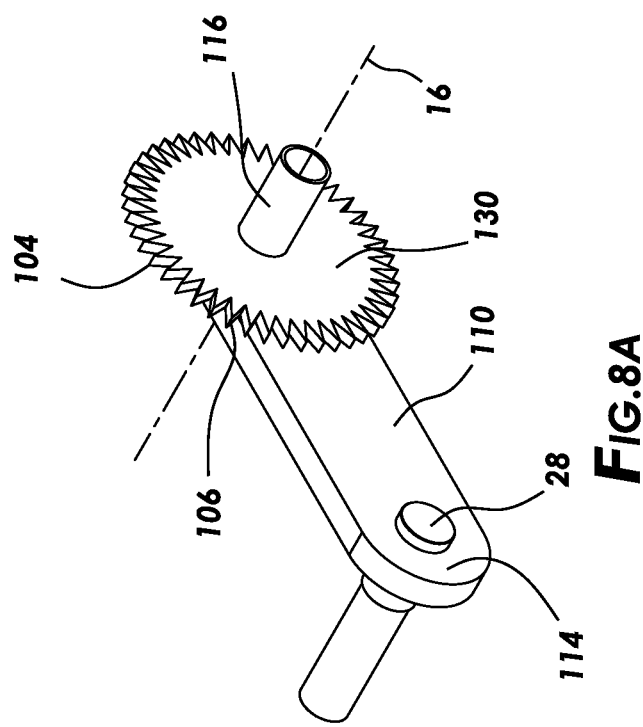
FIG. 8A is a representative perspective view of an adjustable arm of the adjustable height mechanisms, such as in FIGS. 6A-6B, according to one or more example embodiments.

FIG. 8A is a representative perspective view of an adjustable arm 110 of the adjustable height mechanism 100, such as the ones shown in FIGS. 6A-6B, according to one or more example embodiments. The front axle 28 is fixed at a front end 114 of the adjustable arm 110, with the circular disk 130 and the rod 116 fixed at opposite rear end 112. The circular disk 130 can have a plurality of teeth 104 which form a pattern 106 around a perimeter of the circular disk 130.

FIGS. 8B-8C are front and back perspective views of the moveable plate 120 of the adjustable height mechanism 100, such as the ones shown in FIGS. 6A-6B, according to one or more example embodiments. In the adjustable height mechanism 100, the moveable plate 120 receives the rod 124a through a hole 154, the rod 124b through a hole 152, and the rod 116 through the hole 150. These holes 150, 152, 154 can provide adequate clearance to allow the moveable plate 120 to slide along the rods 124a, 124b and the rod 116. A feature 138 with a central slot can be fixedly attached to a surface 119 of the moveable plate 120. The feature 138 can receive an end of the cable 136 and can apply a pulling force of the cable 136 to the moveable plate 120. A recess 109 can be formed in a surface 118 of the moveable plate 120. The perimeter of the recess 109 can form a pattern 108, which is a complimentary shape relative to the shape 106 of the circular disk 130. It can be seen, that with rods 124a, 124b inserted through respective holes 154, 152, the moveable plate is prevented from rotating about the rod 116 when the rod 116 is inserted through the hole 150. When the pattern 106 of the adjustable arm 110 is inserted into the pattern 108 of the recess 109, the patterns engage each other and prevent rotation of the adjustable arm 110 about the center axis 16 of the rod 116.

It should be understood that the patterns 106, 108 shown in FIGS. 8A, 8C are not required to have triangle shaped teeth as shown in FIGS. 8A, 8C. The patterns 106, 108 can be variously shaped patterns as long as the patterns 106 and 108 are complimentary shapes. The patterns 106, 108 can have any number of teeth as well. A fewer number of teeth than shown in FIGS. 8A, 8C can result in larger incremental steps in height adjustment for the cart 20. A larger number of teeth than shown in FIGS. 8A, 8C can result in smaller incremental steps in height adjustment for the cart 20.

Figure 9A:
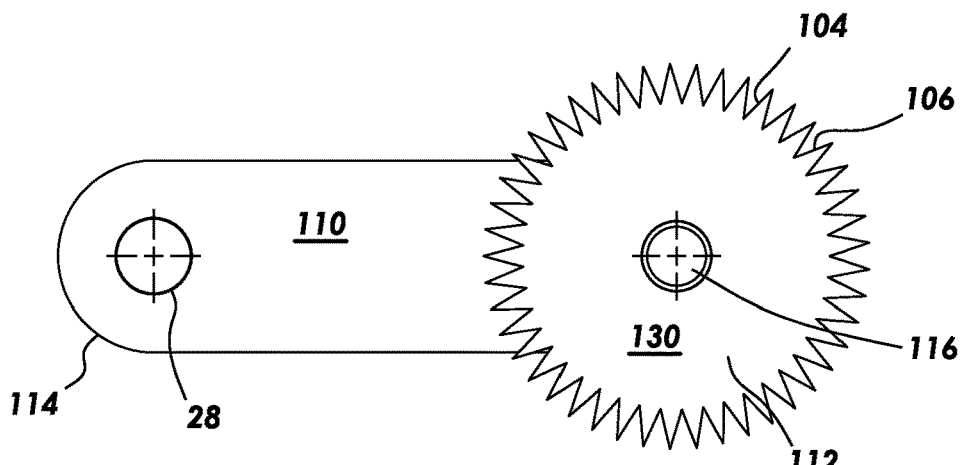
FIGS. 9A-9C are representative side views of an adjustable arm of the adjustable height mechanism, such as in FIGS. 6A-6B, according to one or more example embodiments.
Figure 9B:
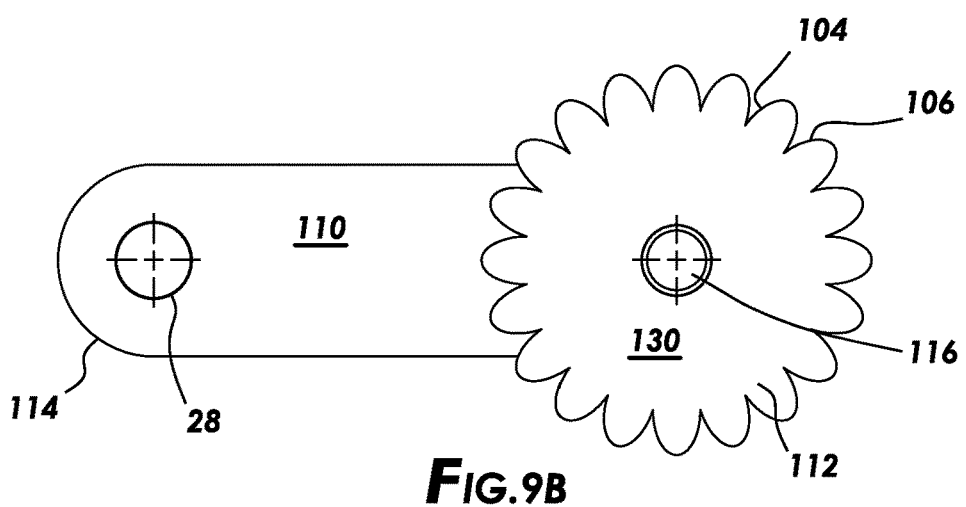
Figure 9C:
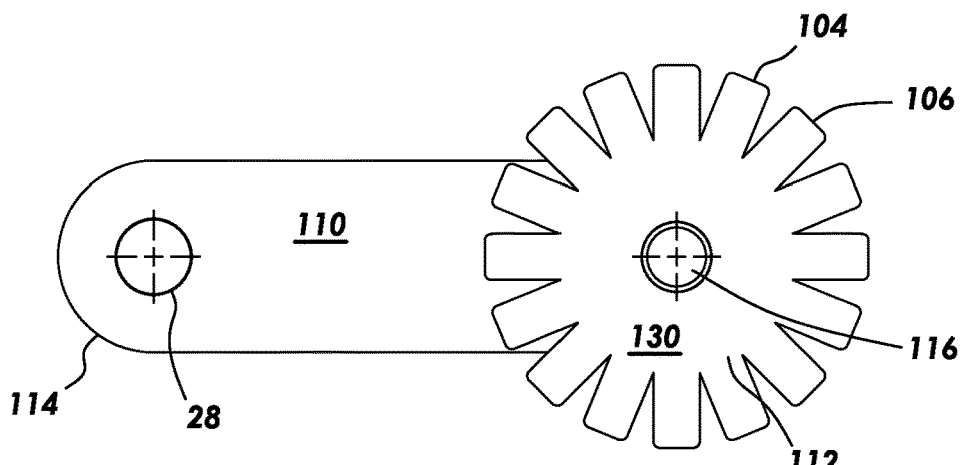

FIGS. 9A-9C show three example patterns 106 that can be used for the adjustable height mechanisms 100 but others are also feasible and anticipated by this disclosure. It should be understood that the patterns 106 shown in FIGS. 9A-9C correspond to complimentary shaped patterns 108 of the moveable plate's 120 recess 109, even though these patterns 108 are not explicitly shown. The pattern 106 in FIG. 9A is formed by a plurality of triangle shaped teeth. The pattern 106 in FIG. 9B is formed by a plurality of rounded end shaped teeth. The pattern 106 in FIG. 9C is formed by a plurality of rectangular shaped teeth. The mating patterns 108 for each one of these patterns 106 is complimentarily shaped so that the pattern 106 can be received in a recess with the respective pattern 108.

FIG. 10A is a representative top view of a mounting assembly 50 of the cart system 10, according to one or more example embodiments. The mounting assembly 50 can include mounting bracket 60 with base plate 61, supports 62, 68, retainers 76, attachment points 43, and a clamping assembly 70 that is rotationally mounted to the support 62. In this configuration, the supports 62, 68 are integral with each other and 62 can be seen as being a portion of the support 68 which is used to restrict left and right movement of the portable tool 200 when it is installed in the mounting assembly 50. A center line 260 is a line that is drawn through the center of each attachment point 43. The clamping assembly 70 is rotationally mounted to the support 62 of the mounting bracket 60 and rotates about an axis 15, which can be offset in an "X" direction (see coordinate key) from the center line 260 by an angle A2. The trigger actuator 74 can be rotationally mounted to the clamp arm 72 of the clamping assembly 70 and rotates about an axis 14, which can be offset in an "X" direction from the center line 260 by an angle A3. It is preferred that the axis 14 is substantially parallel with the axis 15, with angles A2 and A3 being substantially equal. As used herein, "substantially equal" means that a value, such as angle A2 or length L1, is within 10% of another value, such as A3 or L2, respectively. Therefore, if a first angle is within 10% of a second angle, then the first and second angles are substantially equal to each other. It should be understood that the angles A1, A2, or A3 can be "zero." It is not required that these angles be a non-zero value.

FIG. 10B is a representative perspective view of the mounting assembly 50 of FIG. 10A, according to one or more example embodiments. The axis 15 can be offset from the center line 260 in a "Z" direction by an angle A1. The angle of axis 14 can be parallel with the axis 15, with angle A1 being substantially equal to the angle of the axis 14 in the "Z" direction. The clamping assembly 70 can include a locking device 80 that can lock the clamping assembly in an engaged position that would engage the portable tool 200 when the tool 200 is installed in the mounting assembly 50.

Figure 10C:
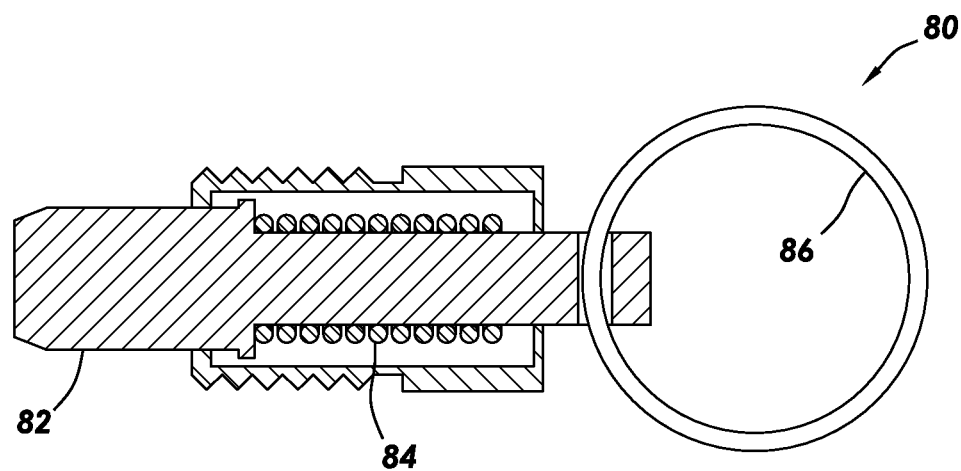
FIG. 10C is a representative partial cross-sectional view of a locking device, according to one or more example embodiments.

FIG. 10C is a representative partial cross-sectional view of the locking device 80, according to one or more example embodiments. The locking device 80 can include a threaded body that can be screwed into a threaded hole in the clamp arm 72. A pin 82 can be biased to an extended position as seen in FIG. 10C. The biasing device 84 can act on features of the pin 82 to urge the pin to the extended position. When the pin 82 is pushed into the body by an opposing force to the biasing device 84, the biasing device 84 is compressed. When the opposing force is removed the pin again extends to the extended position. The opposing force can be applied via the pull feature 86 and/or an object that blocks extension of the pin 82 from the body. It should also be understood that the locking device 80 can be a scaffolding pin, a quick release pin, a bolt, a thumb screw, or another fastener that can be manually extended (by sliding, screwing, twisting, etc.) into a hole in the clamp arm 70 to engage a retention feature on the mounting bracket when the clamp arm 72 is in an engaged position. Engagement of the retention feature by the locking device 80 can prevent rotation of the clamp assembly 70 to an unengaged position.

Figure 10D:
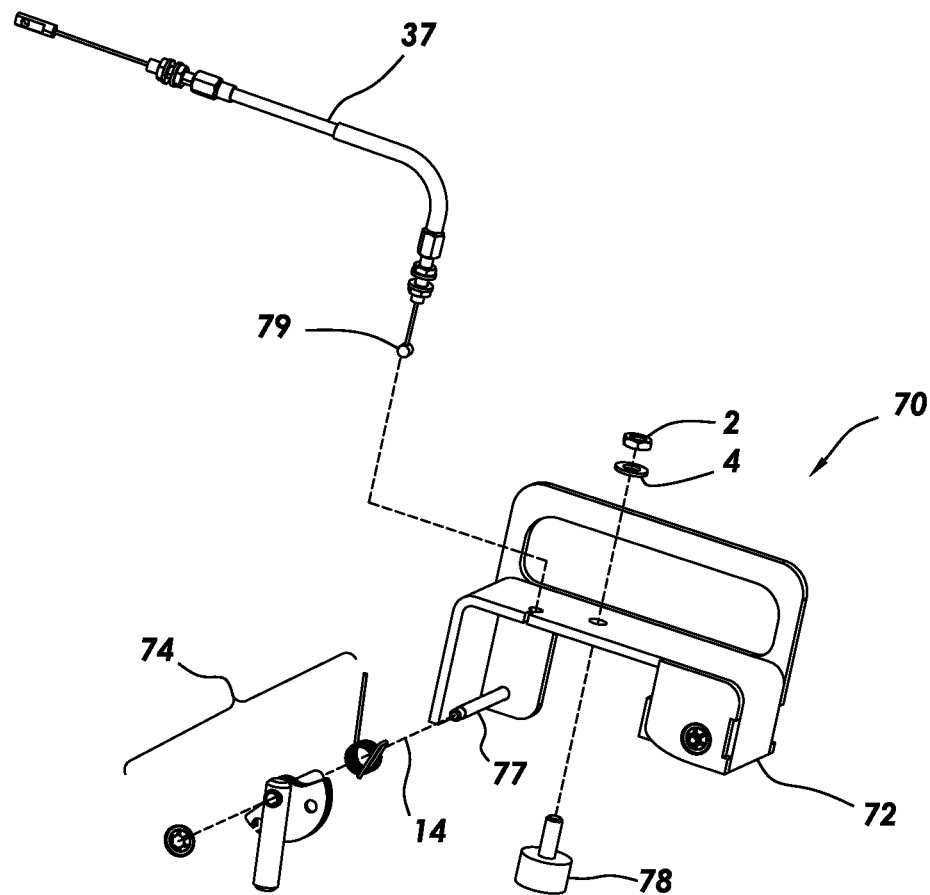
FIG. 10D is a representative exploded perspective view of a clamping assembly for securing a portable tool to the mounting assembly of FIGS. 10A-10B, according to one or more example embodiments.

FIG. 10D is a representative exploded perspective view of the clamping assembly 70 for securing a portable tool to the mounting assembly 50, according to one or more example embodiments. The clamping assembly 70 can include a trigger actuator 74, an interface to the cable assembly 37 which includes a connection of a trigger actuator that connects to the end of the cable assembly 79. The clamping assembly 70 includes a clamp arm 72 that is rotationally mounted to the support 62. The arm 72 provides structural support for the attachment of the cable assembly 37, the trigger actuator 74, and a bumper 78. The trigger actuator 74 can include a spring to bias the trigger actuator 74 to a disengaged position. The trigger actuator 74 can be rotationally mounted to the clamp arm 72 at a support post 77. Pulling the cable end 79 can rotate the trigger actuator 74 about the post 77 (i.e. about axis 14) to operate a trigger of the portable tool 200. When the cable end is released, the spring can rotate the trigger actuator to the disengaged position. The bumper 78 can be attached to the clamp arm 72 via the nut 2 and washer 4. The bumper 78 is configured to engage a rear portion 204 (e.g. a rear handle) of the portable tool 200 and apply a force to the rear portion 204 when the clamp arm 72 is locked in the engaged position.

Figure 11:
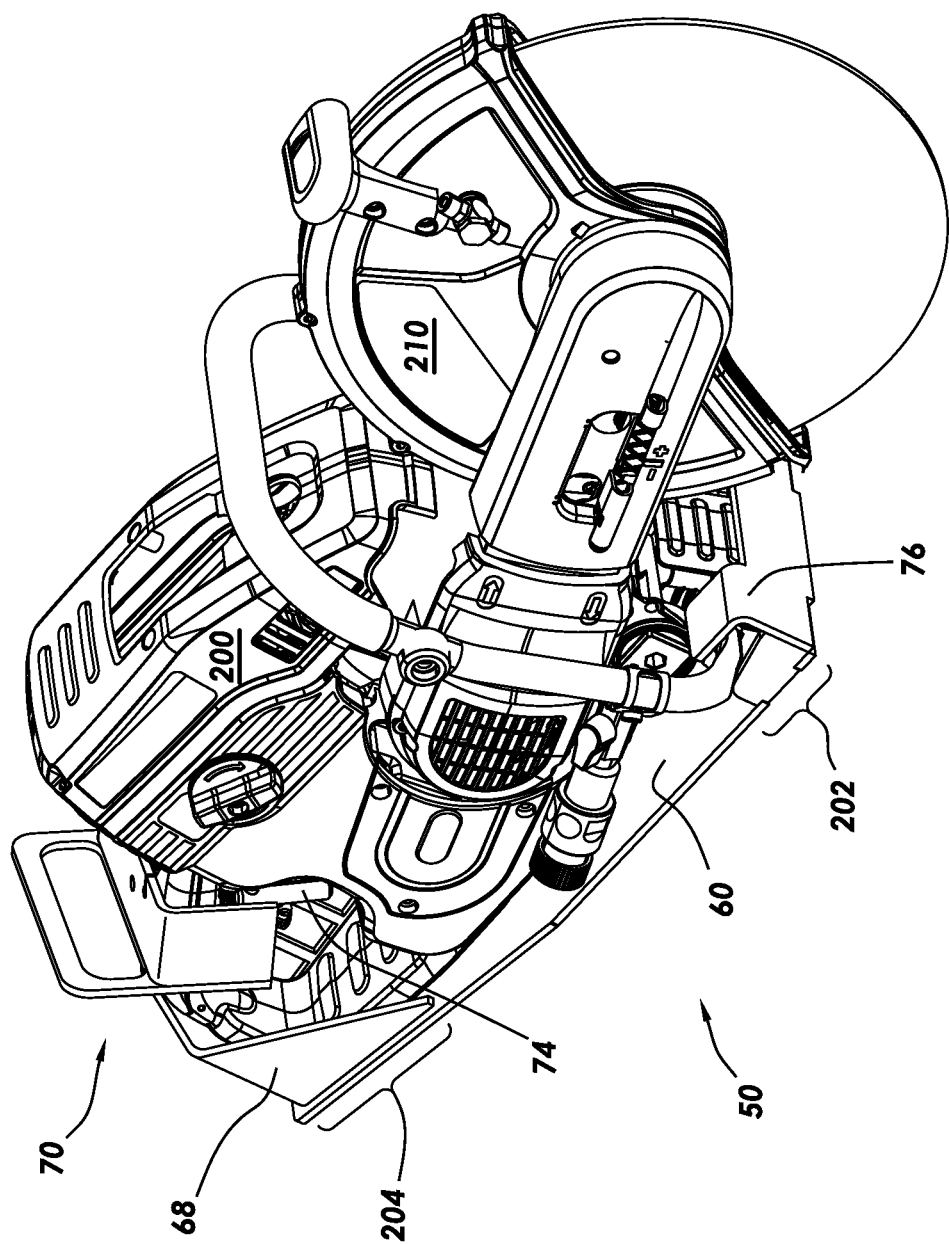
FIG. 11 is a representative perspective view of the mounting assembly of FIG. 10A with a representative portable tool installed in the mounting assembly, according to one or more example embodiments.

FIG. 11 is a representative perspective view of the mounting assembly 50 of FIG. 10A with a representative portable tool 200 installed in the mounting assembly 50, according to one or more example embodiments. A front portion 202 of the portable tool 200 is engaged with the retainers 76 at a front of the mounting assembly 50. A rear portion 204 can be engaged with the supports 68 and the clamping assembly 70. The clamping assembly 70 can engage the rear portion 204 to secure the portable tool 200 to the mounting assembly 50 within the supports 62, 68.

FIG. 12A is a representative perspective partial translucent view of the clamping assembly 70 rotationally mounted to the support 62 of the mounting bracket 60 and in an open or disengaged position, according to one or more example embodiments. A portion of the clamping assembly 70 forms a grip 73, and the grip 73 is shown as translucent to allow additional elements of the clamp assembly 70 to be seen, such as supports 64, 66 and rod 69. A portion of the clamp arm 72 can straddle the supports 64, 66 with the rod 69 extending through both sides of the clamp arm 72 and the supports 64, 66 as shown. A keeper 54 can be installed on both ends of the rod 69 to resist removal of the rod 69. The resilient bumper 78 can be attached to the clamp arm 72 such that the bumper faces the portable tool 200 when the clamping assembly 70 is rotated to an engaged (i.e. closed) position. The bumper 78 can be used to engage the rear portion 204 of the portable tool 200 and can actuate a safety switch 208 on a handle of the portable tool 200. The trigger actuator 74 can be rotationally attached to the clamp arm 72 as described above. The trigger actuator 74 is shown in an open (i.e. disengaged) position.

With the clamping assembly 70 in the disengaged position as shown in FIG. 12A, the pin 82 of the locking device 80 is held inside the locking device 80 the support 64 with the biasing device 84 urging the pin 82 against the support 64. Rotating the clamping assembly 70 in a clockwise direction can rotate the locking device 80 past a retention feature 140. When the locking device passes the retention feature 140, the pin 82 will extend from the locking device 80 thereby preventing a counter-clockwise rotation of the clamp assembly 70 by engaging the retention feature 140. Further clockwise rotation of the clamp assembly 70 may be allowed, but counter-clockwise rotation past the retention feature is prevented, until the locking device 80 is disengaged from the retention feature 140. The clamping assembly 70 is in a locked (or engaged) position with the locking device 80 is engaged with the retention feature 140.

The retention feature 140 can be anything that can abut (or engage) the locking device 80 when the pin 82 of the locking device is extended. FIGS. 12B-12D are representative illustrations of various possible retention features of the clamping assembly 70. The FIGS. 12B-12D are various configurations of the Detail 12B shown in FIG. 12A, according to one or more example embodiments. In these configurations, the rod 69 is positioned between the retention feature 140 and the support.

FIGS. 12B-12D show the support 64 attached to the support 62 and the rod 69 disposed between the retention feature 140 and the support 62. The clamp arm 72 rotates about the rod 69 (and axis 15). With the clamp assembly 70 in the disengaged position, as shown in FIG. 12A, the pin 82 of the locking device 80 can be at a position 142 on the surface 54 of the support 64. In position 142, the pin is forced to remain within the locking device 80, because the surface 54 impedes extension of the pin 82. The biasing device 84 can urge the pin 82 against the surface 54. When pin 82 is rotated clockwise with the clamping assembly 70 to a position 144, as indicated by the arrow 95, the pin 82 can extend past the surface 54 and engage the retention feature 140. The clamping assembly 70 will be prevented from rotating counter-clockwise (i.e. opposite the arrow 95) by the engagement of the pin 82 with the retention feature 140 until the pin 82 is retracted into the locking device 80. Therefore, if an operator desires to rotate the clamping assembly 70 from the engaged (or locked position) back to a disengaged (or unlocked position), then the operator can apply a pulling force to the pull feature 86, which retracts the pin 82 past the surface 54 and into the locking device 80. The locking device 80 is then disengaged from the retention feature 140 and allows the clamping assembly to be rotated counter-clockwise to the disengaged position as shown in FIG. 12A.

FIG. 12B shows a retention feature 140 that is a slot formed through an edge of the support 64. This slot (also seen in the detail 12B of FIG. 12A) is wider than a diameter of the pin 82, so the pin 82 has clearance to extend into the slot at position 144 and engage the retention feature 140.

FIG. 12C shows a retention feature 140 that is a reduced thickness portion of the support 64 at the corner as shown. The reduced thickness portion is recessed below the surface 54 such that there is a ridge that can engage the pin 82 at position 144. The reduced thickness portion can have a thickness of "zero" such that the corner of the support 64 is removed to form the retention feature 140. However, the reduced thickness portion can have a thickness that is greater than "zero" but less than a thickness of the portion of the support 64 that is outside the reduced thickness portion. When the pin 82 rotates to the position 144, the pin 82 can extend into the reduced thickness portion and engaged with the retention feature 140.

FIG. 12D shows a retention feature 140 that is a circular recess formed through the support 64 at the position 144. This circular recess can be a reduced thickness portion or a hole through the support 64. The circular recess has a larger diameter wider than a diameter of the pin 82, so the pin 82 has clearance to extend into the circular recess at position 144 and engage the retention feature 140.

Figure 13A:
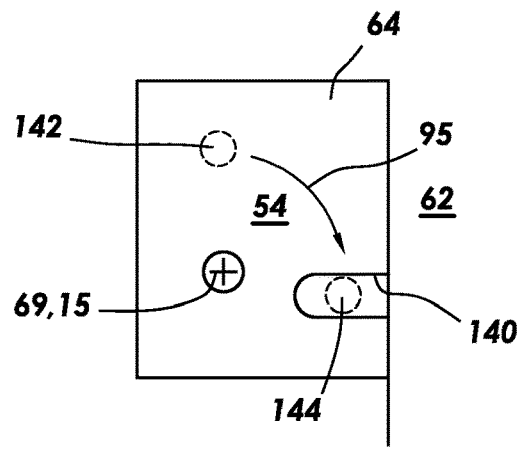
FIGS. 13A-13C are representative front views of various retention features of the clamping device with reference to the detail 12B indicated in FIG. 12A, according to one or more example embodiments.
Figure 13B:
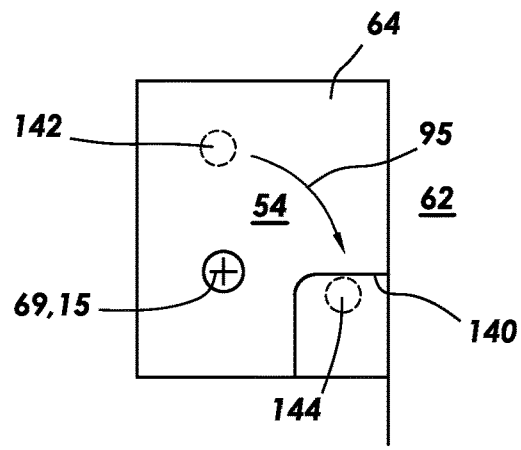
Figure 13C:
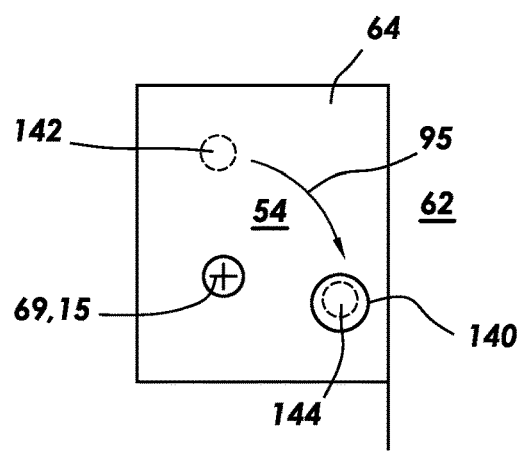

FIGS. 13A-13C are similar to FIGS. 12B-12D with the support 64 attached to the support 62. However, the rod 69 is disposed between the support 62 and the retention feature 140. The pin 82 can be at position 142 on the surface 54 and rotated clockwise (arrow 95) to a position 144 where the pin 82 can extend past the surface 54 and engage the retention feature 140. FIG. 13A shows the retention feature 140 as a slot which is as explained above with reference to FIG. 12B. FIG. 13B shows the retention feature 140 as a reduced thickness portion which is as explained above with reference to FIG. 12C. FIG. 13C shows the retention feature 140 as a circular recess with reduced thickness which is as explained above with reference to FIG. 12D.

Figure 14B:
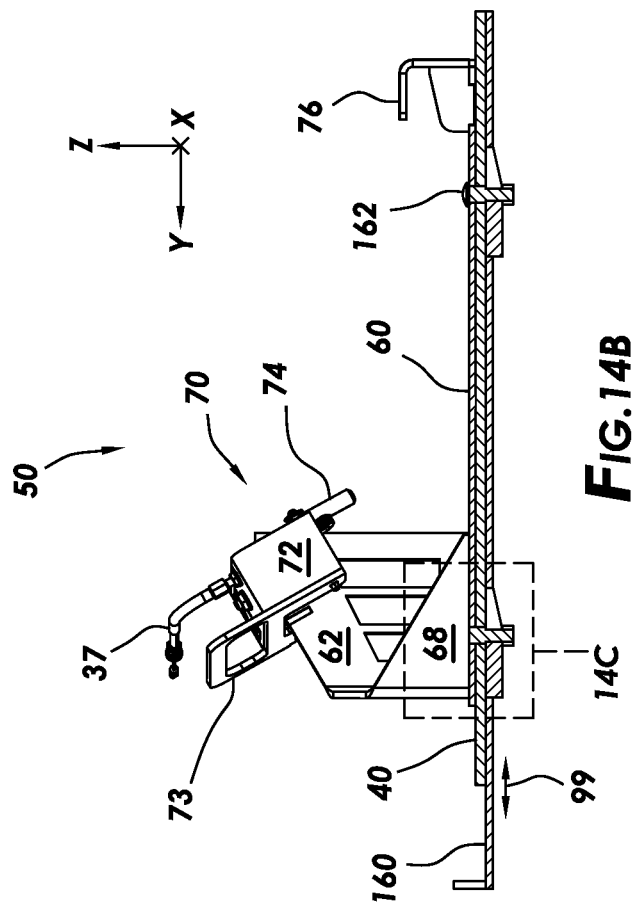
FIG. 14B is a representative partial cross-sectional view of a mounting assembly attached to a cart with a locking device securing the mounting assembly to the cart, according to one or more example embodiments.
Figure 14C:
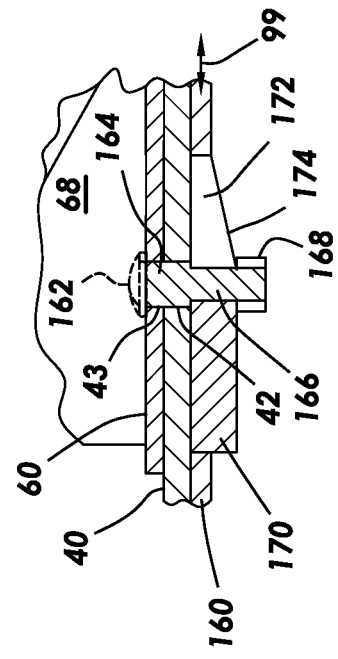
FIG. 14C is a representative detailed partial cross-sectional view of a portion of a locking device securing the mounting assembly to the cart, according to one or more example embodiments.
Figure 14A:
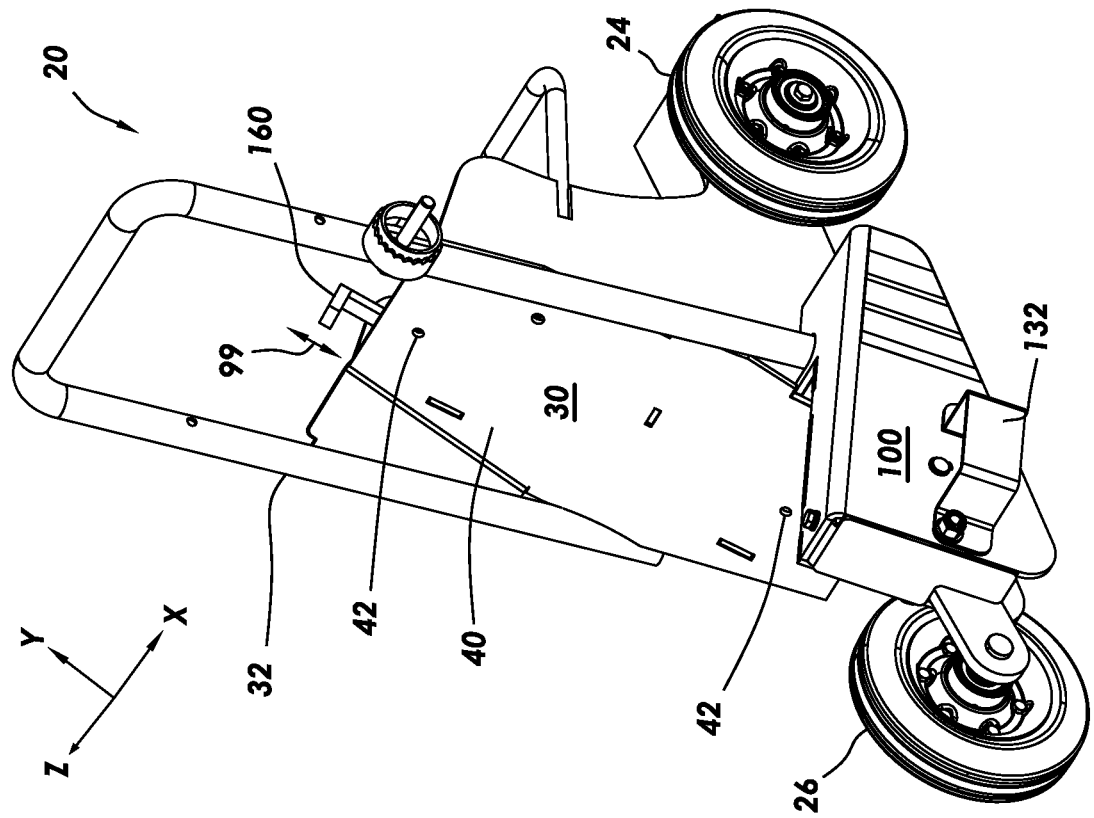
FIG. 14A is a representative perspective view of a cart of the cart system as shown in FIGS. 2-3 with a locking device for securing a mounting assembly to the cart, according to one or more example embodiments.

FIGS. 14A-14C are representative views of a cart system with an attachment means other than nuts and bolts for attaching the mounting assembly 50 to the cart 20. FIG. 14A shows a body of the cart 20 with attachment positions 42 for attaching the mounting assembly 50 to the surface 40. A locking device 160 is shown that can be moved up and down as indicated by arrows 99.

FIG. 14B shows a partial cross-sectional side view of the mounting assembly 50 attached to the surface 40 with the locking device 160 that can selectively permit or prevent removal of the mounting assembly 50 from the surface 40 depending upon its position relative to the surface 40.

FIG. 14C shows a detailed view of the Detail 14C indicated in FIG. 14B. The mounting assembly 50 includes a fastener 162 installed in the holes (or attachment points) 43. Each fastener 162 has two ends 164, 168 with a reduced diameter portion 166 positioned between the two ends 164, 168. The two ends can have different diameters. It is preferable, to have the diameter of the end 168 be smaller than the end 164, but this is not required. The end 164 is fixedly attached to the mounting assembly 50 in the hole 43. The end 168 is extended through the hole (or attachment position) 42 in the surface 40, with the hole 42 having a larger diameter than the diameter of the end 164. The locking device 160 can be an elongated structure with an enlarged thickness portion 170. To attach the mounting assembly 50 to the surface 40, the fasteners 162 are inserted through the respective holes 42 in the surface 40 and through an end of a slot 172 in the locking device 160. An end of the slot 172 has a larger diameter than the end 168 and receives the end 168. The locking device can then be pushed down such that an inclined surface 174 engages the end 168 and forces the mounting bracket 60 of the mounting assembly 50 against the surface 40. The end of the slot 172 near the enlarged thickness portion 170 is a width that is smaller than the end 168. To remove the mounting assembly from the surface 40, the locking device 160 can be pulled up such that the end 168 aligns with the enlarged diameter end of the slot 172 and allows the fastener 162 to be pulled free of the slot 172 and the hole 42.

FIGS. 15A-15C are representative views of a cart system with another attachment means other than nuts and bolts for attaching the mounting assembly 50 to the cart 20. FIG. 15A shows a body of the cart 20 with attachment positions 42 for attaching the mounting assembly 50 to the surface 40. A locking device 160 is shown that can be moved left and right as indicated by arrows 99. The attachment positions 42 are shown as slots formed in the surface 40 of the cart 20.

FIG. 15B shows a partial cross-sectional side view of the mounting assembly 50 attached to the surface 40 with the locking device 160 that can selectively permit or prevent removal of the mounting assembly 50 from the surface 40 depending upon its position relative to the top attachment position 42.

FIG. 15C shows a detailed view of the Detail 15C indicated in FIG. 15B. The mounting assembly 50 includes retainers 180 attached to a backside of the mounting bracket 60 installed at the attachment points 43. Each slot 42 is configured to receive a retainer 180, which can be an angled or curved flange. Each retainer 180 can be inserted through a respective slot 42 and "hook" under the surface 40 and engage an edge 184 of the slot 42. To lock the retainer in the slot 42, the locking device 160 can be rotated 99 into a position that engages the retainer 180 and prevents its removal from the slot 42. To remove the retainers 180 from the slots 42, the locking device 160 can be rotated away from engaging the top retainer 180 and thus allow the retainers 180 to be removed from the cart 20 along with the mounting assembly 50.

FIGS. 16A-16C are representative views of a cart system with another attachment means other than nuts and bolts for attaching the mounting assembly 50 to the cart 20. FIG. 16A shows a body of the cart 20 with attachment positions 42 for attaching the mounting assembly 50 to the surface 40. The attachment positions 42 are shown as flanges (or retainers 186) formed on the surface 40 of the cart 20. A pin of the locking device 160 can be moved in or out of a body of the locking device 160 as indicated by arrows 99 to unlock or lock the mounting assembly 50 to the cart 20.

FIG. 16B shows a partial cross-sectional side view of the mounting assembly 50 attached to the surface 40 with the locking device 160 that can selectively permit or prevent removal of the mounting assembly 50 from the surface 40 depending upon its engagement with the mounting bracket 60.

FIG. 16C shows a detailed view of the Detail 16C indicated in FIG. 16B. The mounting assembly 50 includes slots (or attachment points) 43 configured to receive the retainers 180 that are attached to a topside of the surface 40. Each slot 43 is configured to receive a retainer 180, which can be an angled or curved flange. Each retainer 180 can be inserted through a respective slot 43 and "hook" on to the mounting bracket 61 and engage an edge 186 of the slot 43. To lock the retainer in the slot 43, a pin of the locking device 160 can be extended into engagement with a retention feature 188, thereby preventing removal of the retainers 180 from the respective slots 43. To install the mounting assembly 50 onto the surface 40, the mounting assembly is placed on the surface 40 with the slots 43 receiving a respective retainer 180. This depresses the pin of the locking device 160 due to engagement of the mounting assembly with the pin. The mounting assembly 50 is then moved down such that the retainers 180 engage the the respective surfaces 186 and align the pin of the locking device 160 with the retention feature 188. When so aligned, the pin can extend into the retention feature thereby preventing movement of the mounting assembly 50 up and off of the retainers 180. To remove the mounting assembly 50 from the retainers 180, the pin of the locking device 160 can be manually retracted disengaging the locking device 160 from the retention feature and allowing the mounting assembly 50 be moved upward and lifted from the retainers 180, thereby removing the mounting assembly 50 from the cart 20.

FIGS. 17A-19G are representative views of three different configurations of mounting assemblies 50 that can each be installed on the cart 20 to support mounting at least one of multiple portable tools on the cart 20. The coordinate system established in the drawings are for reference purposes only to provide a relative spacial relationship between elements of the mounting assemblies. Other coordinate systems can be used, but the relative relationships would remain the same.

FIGS. 17A-17G are representative views of a mounting assembly 50. The description above regarding FIGS. 1-16C is applicable to the mounting assembly 50 shown in FIGS. 17A-17G.

FIGS. 18A-18G are representative views of a mounting assembly 51. The description above regarding FIGS. 1-16C is also applicable to the mounting assembly 51 shown in FIGS. 18A-18G, unless otherwise stated.

FIGS. 19A-19G are representative views of a mounting assembly 52. The description above regarding FIGS. 1-16C is also applicable to the mounting assembly 52 shown in FIGS. 18A-18G, unless otherwise stated.

It should be understood that additional mounting assemblies can be made to accommodate additional types of portable tools, when those additional types require adjustments to the sizes and shapes of the mounting assemblies described herein. If no adjustments needed, then the current mounting assemblies 50, 51, 52 can support the additional type(s). Each of the mounting assemblies are configured to be interchangeably attached to the cart 20, such that multiple portable tools can be attached to the same cart 20 without having a unique cart for each portable tool type, even if the portable tools are different from each other in size, shape, contour, etc.

Referring back to FIG. 17A, this is a representative perspective view of a mounting assembly 50 of the cart system 10. This mounting assembly 50 can receive any portable tools that are similar enough to allow the mounting assembly 50 to operate correctly by retaining the front portion 202 of the portable tool 200 to the mounting assembly 50, clamping the portable tool 200 in the mounting assembly 50, and operating the trigger of the portable tool 200. The mounting assembly 50 can accommodate multiple portable tools 200 which are in the same or very similar families of tools. For example, the mounting assembly 50 shown in FIGS. 17A-17G can support and secure to the cart 20 at least four portable saws made by Clipper®. The Clipper® saws that can be supported by the mounting assembly 50 are model number CP514-350 (14"), model number CP514-350i (14"), model number CP512-300 (12"), and model number CP512-300i (12").

Figure 17A:
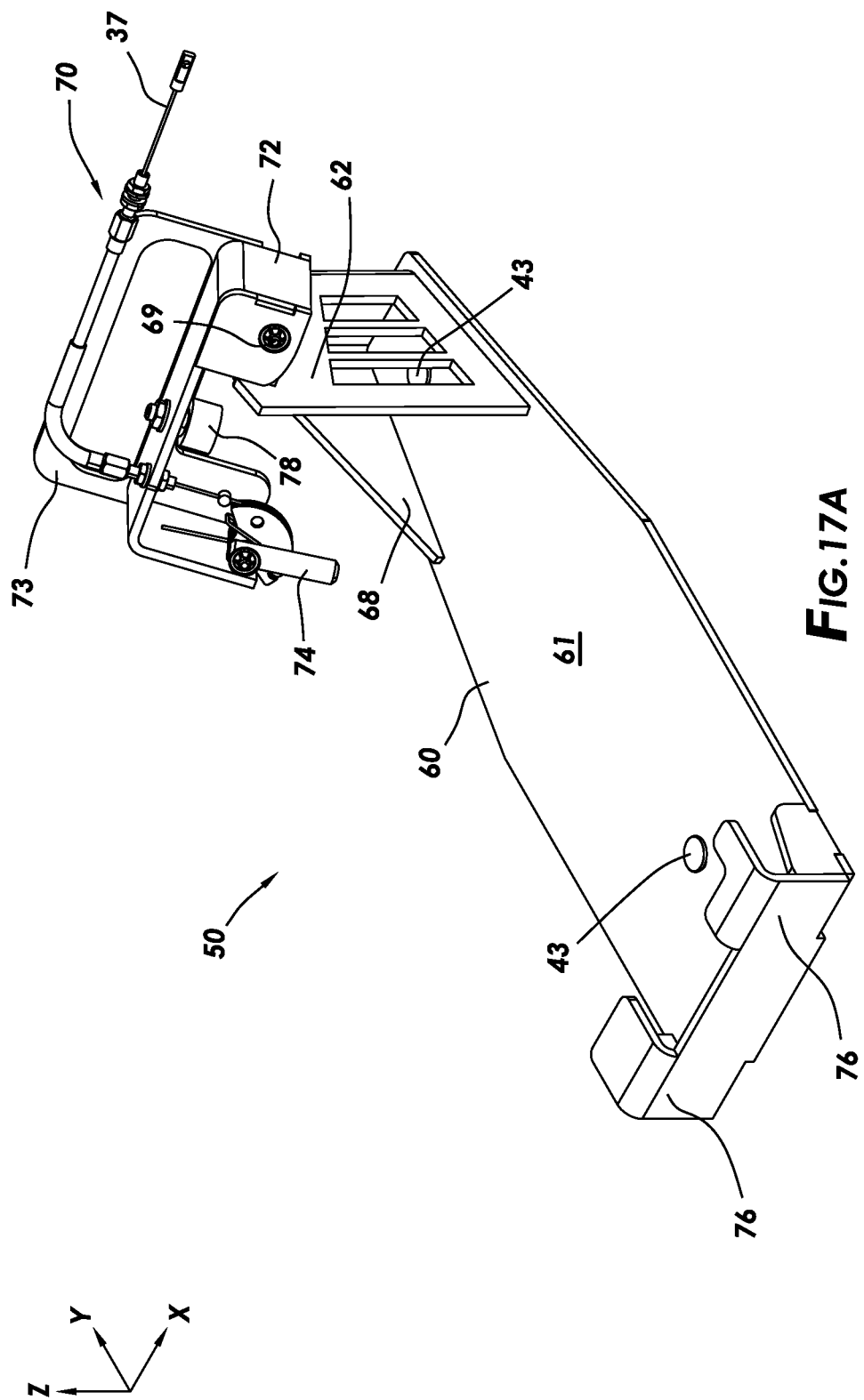
FIG. 17A is a representative perspective view of the mounting assembly of the cart system shown in FIGS. 2-3, according to one or more example embodiments.

FIG. 17A is a representative perspective view of the mounting assembly 50 for mounting a portable tool 200 to the cart 20. The mounting assembly 50 can include retainers 76 positioned at a front of the mounting bracket 60 and configured to engage a front portion 202 of the tool 200 when the tool 200 is installed in the mounting assembly 50. Attachment points 43 can be used to removably attach the mounting assembly 50 to the cart 20 by inserting fasteners 53 through the attachment points 43 (see FIG. 17C). Supports 62, 68 can be attached to the base plate 61 at a rear of the mounting bracket 60 so as to restrict movement of a rear portion 204 of the portable tool 200 when the tool 200 is installed in the mounting assembly 50. A clamping assembly 70 can be rotationally attached to the mounting bracket 60 by the rod 69. The clamping assembly 70 can include a clamp arm 72 which can include a hand grip 73. A bumper 78 can be attached to the clamp arm 72 and a trigger actuator 74 can be rotationally attached to the clamp arm 72. The trigger actuator 74 can be operated by a cable assembly 37 that can include an outer jacket and an inner cable. The outer jacket can be attached to the clamp arm 72 with an end of the cable attached to the trigger actuator 74. Operating the cable can cause the trigger actuator 74 to rotate.

Figure 17B:
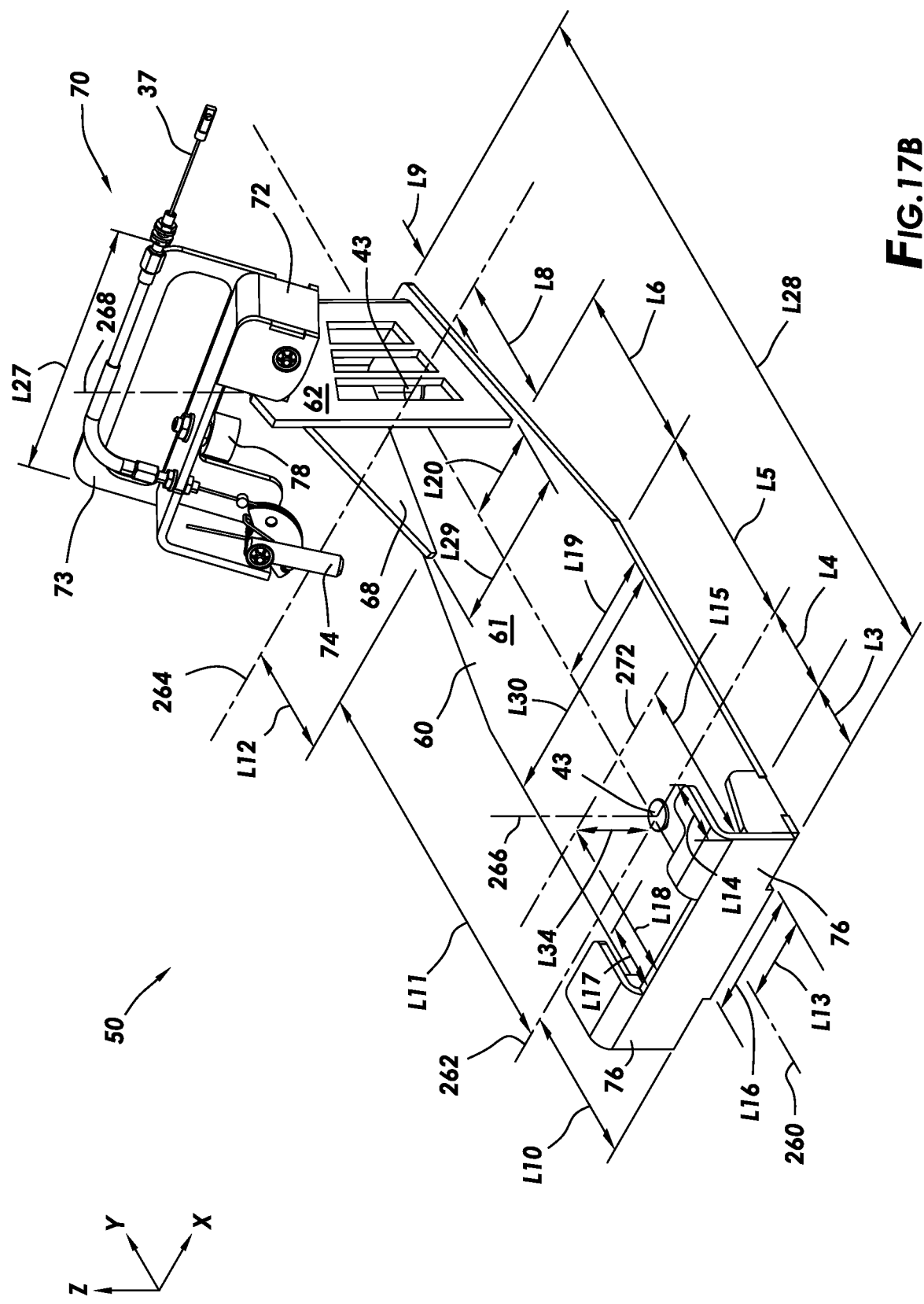
FIG. 17B is a representative perspective view of the mounting assembly of FIG. 17A with relative dimensions identified, according to one or more example embodiments.

FIG. 17B is a representative perspective view of the mounting assembly 50 for mounting a portable tool 200 to the cart 20 with relative dimensions identified. A center line 260 extends in a Y direction (see 3D coordinate key) and intersects the center of the attachment points 43 of the base plate 61. Two reference lines 262, 264 are perpendicular to the center line 260 and extend in an X direction. The reference line 262 intersects the center of the front attachment point 43 near the front of the base plate 61. The reference line 264 intersects the center of the rear attachment point 43 near the rear of the base plate 61. Two reference lines 266, 268 are perpendicular to the center line 260 and to the reference lines 262, 264, and extend in a Z direction. The reference line 266 intersects the center of the front attachment point 43 near the front of the base plate 61. The reference line 268 intersects the center of the rear attachment point 43 near the rear of the base plate 61.

L28 is an overall length in the Y-direction of the mounting assembly 50. L30 is an overall width of the base plate 61. L3 is the distance in the Y-direction between the front of the base plate 61 and an end of a support of the retainer 76 on the right side of the base plate 61. L4 is the distance in the Y-direction between the front attachment point 43 and the end of the support for the right side retainer 76. L5 is the distance in the Y-direction between the front attachment point 43 and the point at which the width of the base plate 61 begins to decrease. L6 is the distance in the Y-direction between the point at which the width of the base plate 61 begins to decrease and a front of the support 62. L7 is the distance in the Y-direction between the front of the support 62 to the rear of the support 62. L8 is the distance in the Y-direction between the front of the support 62 and the rear attachment point 43. L9 is the distance in the Y-direction between the rear attachment point 43 and a rear of the base plate 61.

L10 is the distance in the Y-direction between the front end of the base plate 61 and the front attachment point 43. L11 is the distance in the Y-direction between the front attachment point 43 and the front end of the support 68 on the left side of the base plate 61. L12 is the distance in the Y-direction between the front end of the support 68 on the left side of the base plate 61 to the rear attachment point 43. The reference line 272 is parallel with the reference line 262 and positioned a distance L34 in the Z-direction from the reference line 262. L14 is the distance in the Y-direction between the front of the base plate 61 and the rear of the upper flange of the right retainer 76. L15 is the distance in the Y-direction between the front of the base plate 61 and the front attachment point 43. L17 is the distance in the Y-direction between the front of the base plate 61 and the rear of the upper flange of the left retainer 76. L18 is the distance in the Y-direction between the front of the base plate 61 and the front attachment point 43.

L19 is the distance in the X-direction between the center line 260 and the right side of the base plate 61. L20 is the distance in the X-direction between the center line 260 and the front of the support 62. L29 is the distance in the X-direction between the front of the support 62 and front of the support 68. L13 is the distance in the X-direction between the center line 260 and the right retainer 76. L16 is the distance in the X-direction between the left and right retainers 76. L27 is the distance in the X-direction of the overall width of the clamp arm 72 and the hand grip 73.

Figure 17C:
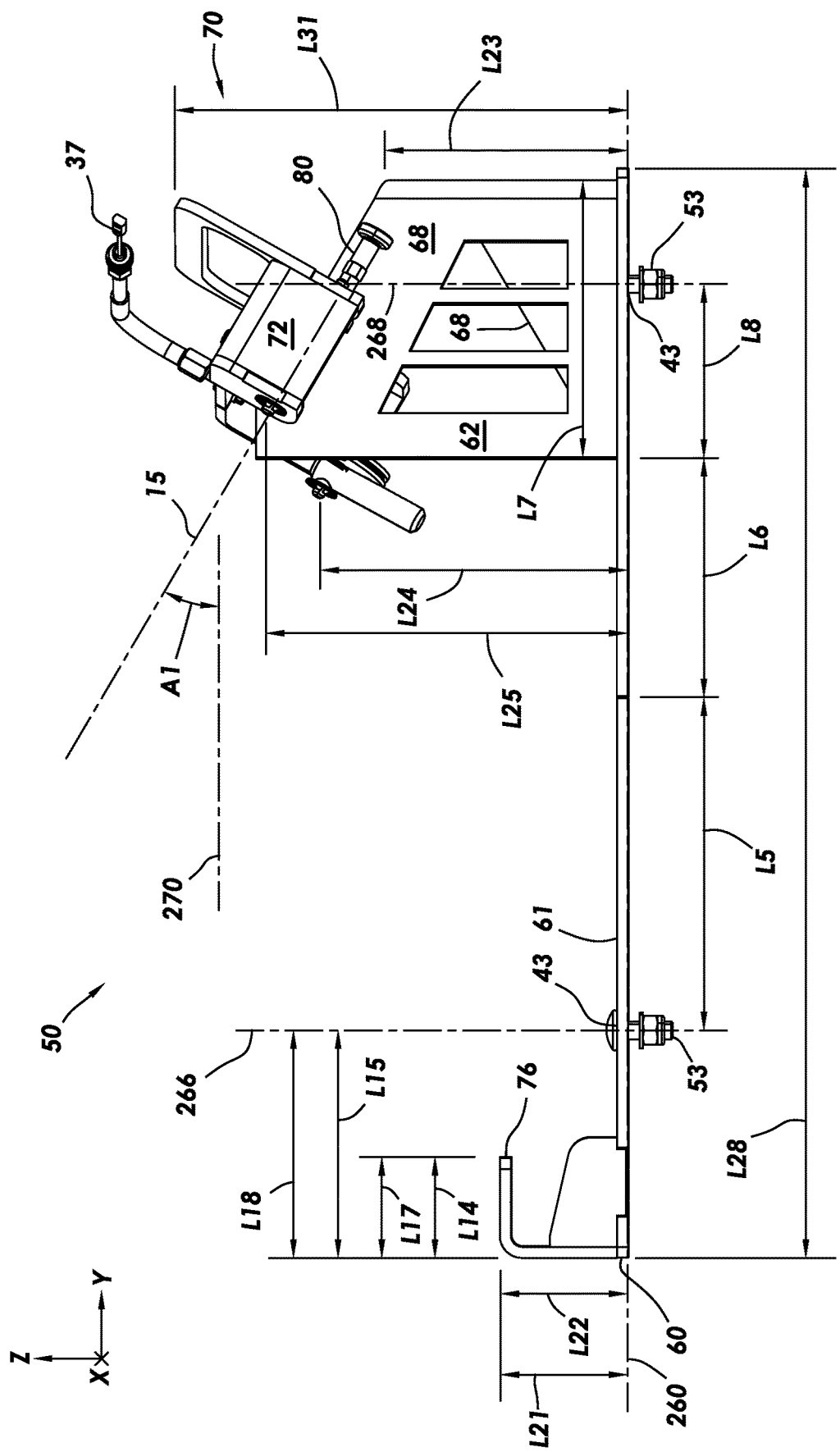
FIG. 17C is a representative side view of the mounting assembly of FIG. 17A with relative dimensions identified, according to one or more example embodiments.

FIG. 17C is a representative side view of the mounting assembly 50 for mounting a portable tool 200 to the cart 20 with relative dimensions identified. A center line 260 extends in a Y direction (see 3D coordinate key) and intersects the center of the attachment points 43 of the base plate 61. Two reference lines 266, 268 are perpendicular to the center line 260, and extend in a Z direction. The reference line 266 intersects the center of the front attachment point 43 near the front of the base plate 61. The reference line 268 intersects the center of the rear attachment point 43 near the rear of the base plate 61. Distances L5, L6, L8, L14, L15, L17, and L18 are described above regarding FIG. 17B.

L21 is the distance in the Z-direction between the center line 260 (positioned along the bottom surface of the base plate 61) and the top of the right retainer 76. L22 is the distance in the Z-direction between the center line 260 and the top of the left retainer 76. L23 is the distance in the Z-direction between the center line 260 and the top of the rear right edge of the support 68. L24 is the distance in the Z-direction between the center line 260 and the front end of the attachment of the trigger actuator 74. L25 is the distance in the Z-direction between the center line 260 and the front end of the rod 69 that rotationally attaches the clamping assembly 70 to the mounting bracket 60. L31 is the distance in the Z-direction between the center line 260 and the top of the hand grip 73 (or top of the clamp arm 72). L31 is the overall height of the mounting assembly 50. The reference line 270 is parallel to the center line 260 and is positioned above the center line 260 to provide a reference for the angle A1, which is the angular offset in an Y-Z plane between the center line 260 (or reference line 270) and the rotational axis 15 of the clamping assembly 70.

Figure 17D:
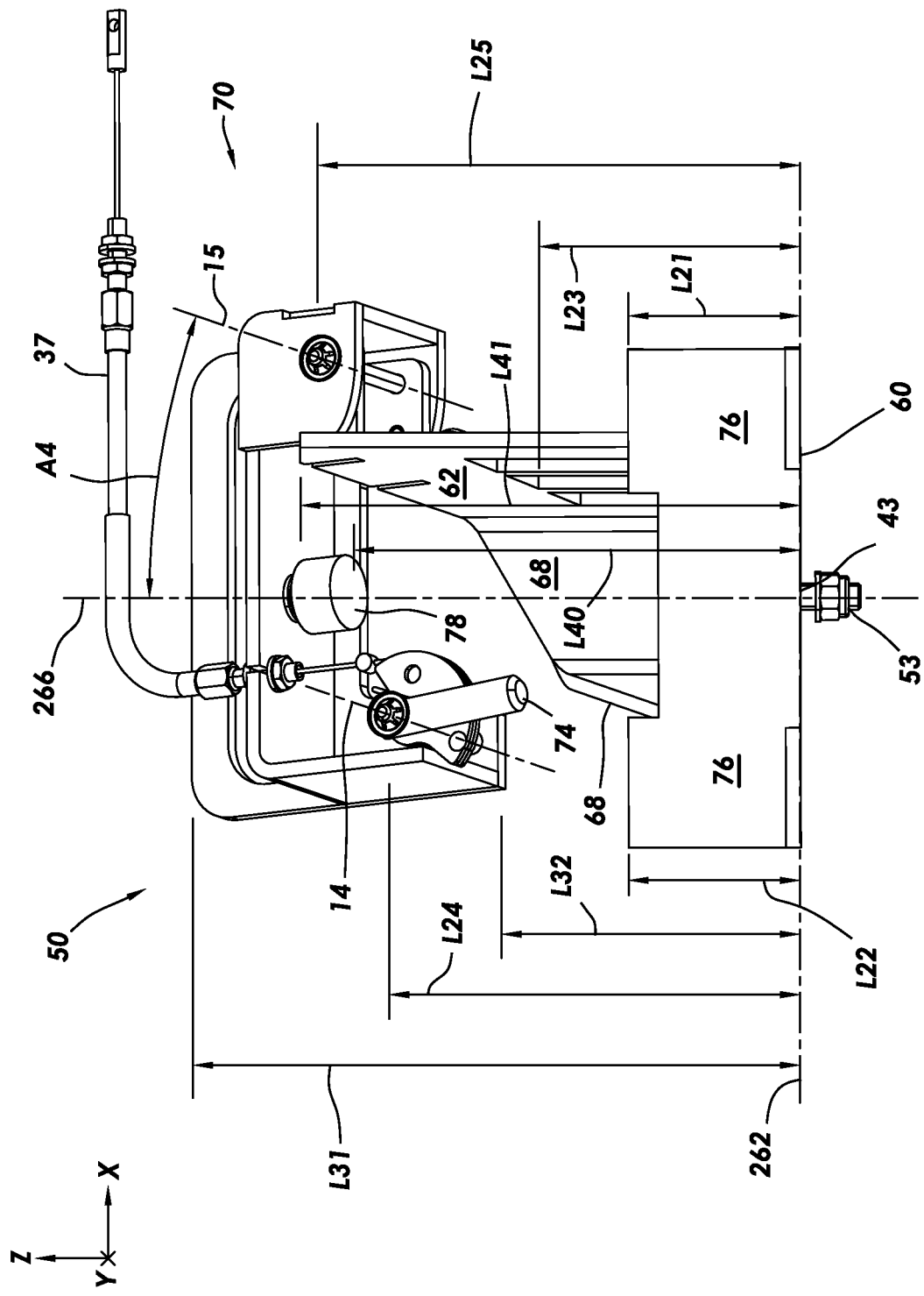
FIG. 17D is a representative front view of the mounting assembly of FIG. 17A with relative dimensions identified, according to one or more example embodiments.

FIG. 17D is a representative front view of the mounting assembly 50 for mounting a portable tool 200 to the cart 20 with relative dimensions identified. A reference line 262 extends in an X direction (see 3D coordinate key) and intersects the center of the front attachment point 43 of the base plate 61. Reference line 266 is perpendicular to the reference line 262, and extends in a Z direction. The reference line 266 intersects the center of the front attachment point 43 near the front of the base plate 61. Distances L21, L22, L23, L24, L25, and L31 are described above regarding FIG. 17C.

L32 is the distance in the Z-direction between the reference line 262 (positioned along the bottom surface of the base plate 61) and the bottom edge of the clamping assembly 70. L40 is the distance in the Z-direction between the reference line 262 and the bottom of the bumper 78. L41 is the distance in the Z-direction between the reference line 262 and the top of the support 62. L41 is the overall height of the mounting bracket 60. The angle A4 is the angular offset in an X-Z plane between the reference line 266 and the rotational axis 15 of the clamping assembly 70.

Figure 17E:
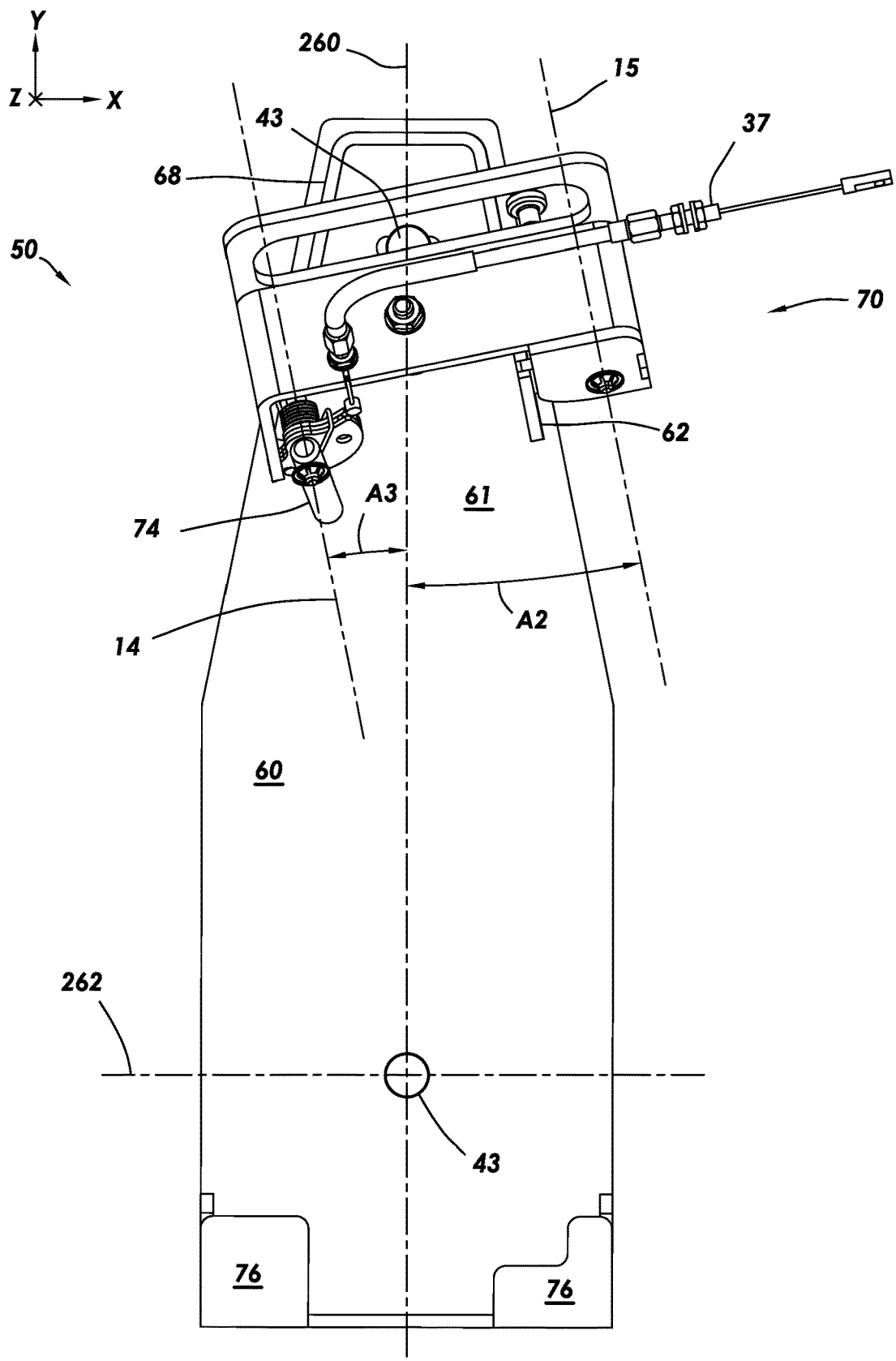
FIG. 17E is a representative top view of the mounting assembly of FIG. 17A, according to one or more example embodiments.

FIG. 17E is a representative top view of the mounting assembly 50 for mounting a portable tool 200 to the cart 20 with relative dimensions identified. A center line 260 extends in a Y direction (see 3D coordinate key) and intersects the center of the attachment points 43 of the base plate 61. A reference line 262 is perpendicular to the center line 260 and extends in an X direction. The reference line 262 intersects the center of the front attachment point 43 near the front of the base plate 61.

The angle A2 is an angular offset in the X-Y plane between the rotational axis 15 of the clamping assembly 70 and the center line 260. The angle A3 is an angular offset in the X-Y plane between the rotational axis 14 of the trigger actuator 74 and the center line 260. It is preferred that the axes 14, 15 are parallel and that the angle A2 is substantially equal to the angle A3. However, angle A2 can be different than the angle A3. It should also be understood that the angles A1, A2, A3, or A4 can be "zero." It is not required that these angles be a non-zero value.

The angle A1 can be 33 degrees, or 33 degrees+/−1 degree, +/−2 degrees, +/−3 degrees, +/−4 degrees, +/−5 degrees, +/−10 degrees, +/−15 degrees, +/−20 degrees, +/−25 degrees, +/−30 degrees, or +/−33 degrees offset from the surface 61 of the base plate 60 in the Y-Z plane.

The angle A2 can be 13 degrees, or 13 degrees +/−1 degree, +/−2 degrees, +/−3 degrees, +/−4 degrees, +/−5 degrees, +/−10 degrees, +/−13 degrees, +/−15 degrees, +/−20 degrees, +/−25 degrees, or +/−30 degrees offset from the center line 260 in the X-Y plane.

The angle A3 can be 13 degrees, or 13 degrees +/−1 degree, +/−2 degrees, +/−3 degrees, +/−4 degrees, +/−5 degrees, +/−10 degrees, +/−13 degrees, +/−15 degrees, +/−20 degrees, +/−25 degrees, or +/−30 degrees offset from the center line 260 in the X-Y plane.

The angle A4 can be 18 degrees, or 18 degrees+/−1 degree, +/−2 degrees, +/−3 degrees, +/−4 degrees, +/−5 degrees, +/−10 degrees, +/−15 degrees, +/−18 degrees, +/−20 degrees, +/−25 degrees, or +/−30 degrees offset from the reference line 266 in the X-Z plane.

L28 is an overall length in the Y-direction of a mounting assembly. L28 for the mounting assembly 50 can be 473.7 mm (18.64 inches), or L28 can be 473.7 mm (18.64 inches) +/−1%, +/−2%, +/−3%, +/−4%, +/−5%, +/−6%, +/−7%, +/−8%, +/−9%, +/−10%, or +/−15%.

L30 is an overall width of the base plate 61 in the X-direction of a mounting assembly. L30 for the mounting assembly 50 can be 166.5 mm (6.56 inches), or L30 can be 166.5 mm (6.56 inches)+/−1%, +/−2%, +/−3%, +/−4%, +/−5%, +/−6%, +/−7%, +/−8%, +/−9%, +/−10%, or +/−15%.

L31 is an overall height in the Z-direction of a mounting assembly. L31 for the mounting assembly 50 can be 203 mm (8 inches), or L31 can be 203 mm (8 inches)+/−1%, +/−2%, +/−3%, +/−4%, +/−5%, +/−6%, +/−7%, +/−8%, +/−9%, +/−10%, or +/−15%.

L41 is an overall height in the Z-direction of a mounting bracket 60 of a mounting assembly. L41 for the mounting bracket 60 of the mounting assembly 50 can be 167 mm (6.6 inches), or L41 can be 167 mm (6.6 inches)+/−1%, +/−2%, +/−3%, +/−4%, +/−5%, +/−6%, +/−7%, +/−8%, +/−9%, +/−10%, or +/−15%.

L27 is an overall width in the X-direction of a clamping assembly 70 of a mounting assembly. L27 for the clamping assembly 70 of the mounting assembly 50 can be 158 mm (6.2 inches), or L41 can be 158 mm (6.2 inches)+/−1%, +/−2%, +/−3%, +/−4%, +/−5%, +/−6%, +/−7%, +/−8%, +/−9%, +/−10%, or +/−15%.

FIG. 17F is a representative perspective view of a cart system 10 with the mounting assembly 50 installed on the cart 20. The height adjustment mechanism 100 is set at a distance of L1 from the surface 6. This can be a desired configuration of the cart to enable installation of the portable tool 200 in the mounting assembly 50, when the portable tool 200 is a portable saw (such as a high-speed concrete saw) and it can be installed without the surface 6 interfering with the installation.

FIG. 17G is a representative perspective view of a cart system 10 with a representative portable tool 200 installed in the mounting assembly 50 of the cart 20. The front portion 202 of the portable tool 200 is engaged with the retainers 76. The clamping assembly 70 is rotated into a locked position engaging the rear portion 204 of the portable tool 200.

Referring back to FIG. 18A, this is a representative perspective view of a mounting assembly 51 of the cart system 10. This mounting assembly 51 can receive any portable tools that are similar enough to allow the mounting assembly 51 to operate correctly by retaining the front portion 222 of the portable tool 220 to the mounting assembly 51, clamping the portable tool 220 in the mounting assembly 51, and operating the trigger of the portable tool 220. The mounting assembly 51 can accommodate multiple portable tools 220 which are in the same or very similar families of tools. For example, the mounting assembly 51 in FIGS. 18A-18G can support and secure to the cart 20 at least three portable saws 220 made by Husqvarna®. The Husqvarna® saws that can be supported by the mounting assembly 51 are model number K 760 (14"), model number K 760 (12"), and model number K 760 OG (14").

FIG. 18A is a representative perspective view of the mounting assembly 51 for mounting a portable tool 220 to the cart 20. The mounting assembly 51 can include retainers 76 positioned at a front of the mounting bracket 60 and configured to engage a front portion 222 of the tool 220 when the tool 220 is installed in the mounting assembly 51. Attachment points 43 can be used to removably attach the mounting assembly 51 to the cart 20 by inserting fasteners 53 through the attachment points 43 (see FIG. 18C). Supports 62, 68 can be attached to the base plate 61 at a rear of the mounting bracket 60 so as to restrict movement of a rear portion 224 of the portable tool 220 when the tool 220 is installed in the mounting assembly 51. However, only supports 68 are used to restrict the tool 220 in the mounting assembly 51. The support 62 is used to support the clamping assembly 70. A clamping assembly 70 can be rotationally attached to the mounting bracket 60 by the rod 69. The clamping assembly 70 can include a clamp arm 72 which can include a hand grip 73. A bumper 78 can be attached to the clamp arm 72 and a trigger actuator 74 can be rotationally attached to the clamp arm 72. The trigger actuator 74 can be operated by a cable assembly 37 that can include an outer jacket and an inner cable. The outer jacket can be attached to the clamp arm 72 with an end of the cable attached to the trigger actuator 74. Operating the cable can cause the trigger actuator 74 to rotate.

Figure 18B:
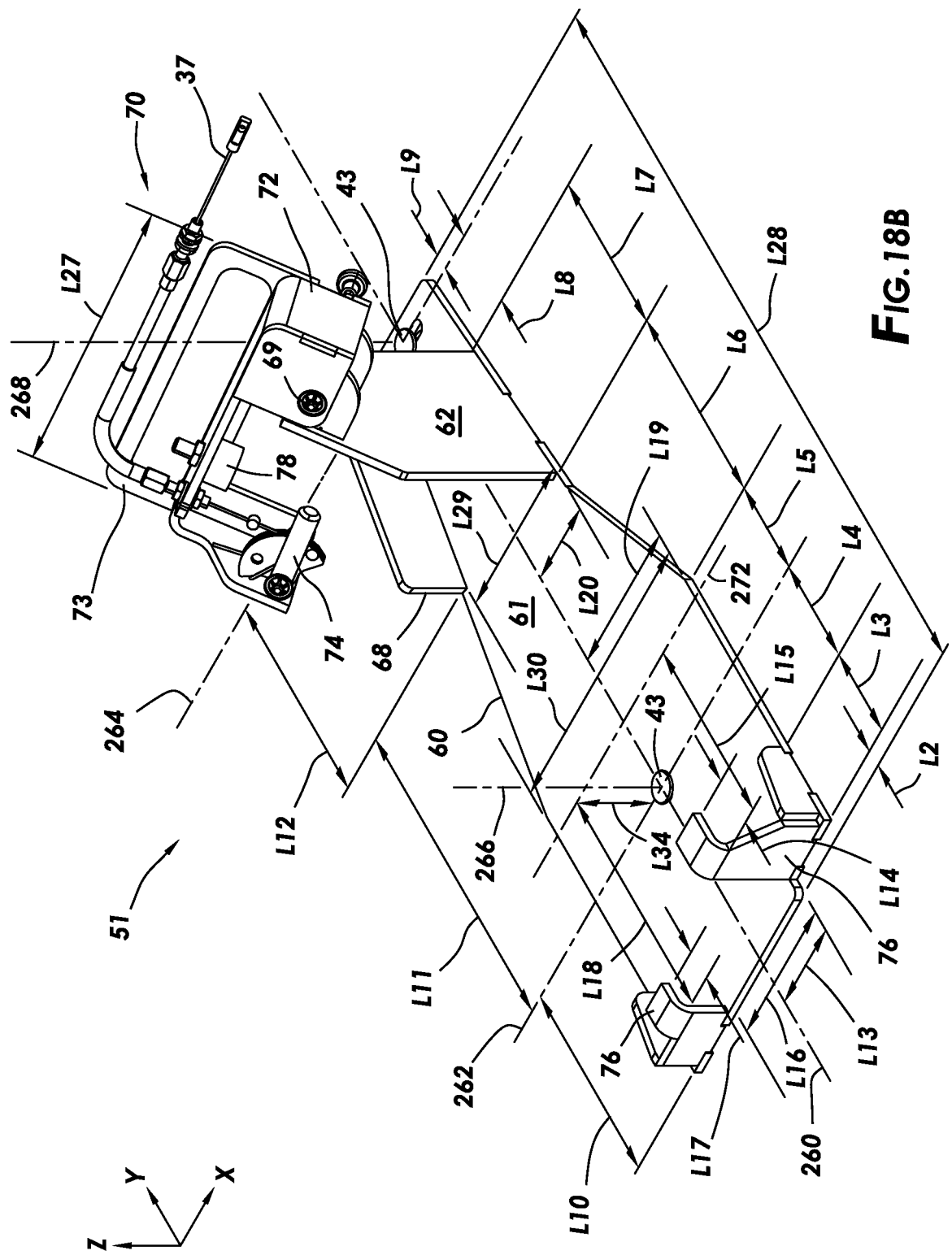
FIG. 18B is a representative perspective view of the mounting assembly of FIG. 18A with relative dimensions identified, according to one or more example embodiments.

FIG. 18B is a representative perspective view of the mounting assembly 51 for mounting a portable tool 220 to the cart 20 with relative dimensions identified. A center line 260 extends in a Y direction (see 3D coordinate key) and intersects the center of the attachment points 43 of the base plate 61. Two reference lines 262, 264 are perpendicular to the center line 260 and extend in an X direction. The reference line 262 intersects the center of the front attachment point 43 near the front of the base plate 61. The reference line 264 intersects the center of the rear attachment point 43 near the rear of the base plate 61. Two reference lines 266, 268 are perpendicular to the center line 260 and to the reference lines 262, 264, and extend in a Z direction. The reference line 266 intersects the center of the front attachment point 43 near the front of the base plate 61. The reference line 268 intersects the center of the rear attachment point 43 near the rear of the base plate 61.

L28 is an overall length in the Y-direction of the mounting assembly 51. L30 is an overall width of the base plate 61. L2 is the distance in the Y-direction between the front of the base plate 61 and a front of the retainer 76 on the right side of the base plate 61. L3 is the distance in the Y-direction between the front of the retainer 76 on the right side of the base plate 61 and a rear end of a support of the retainer 76 on the right side of the base plate 61. L4 is the distance in the Y-direction between the front attachment point 43 and the end of the support for the right side retainer 76. L5 is the distance in the Y-direction between the front attachment point 43 and the point at which the width of the base plate 61 begins to decrease. L6 is the distance in the Y-direction between the point at which the width of the base plate 61 begins to decrease and a front of the support 62. L7 is the distance in the Y-direction between the front of the support 62 to the rear of the support 62. L8 is the distance in the Y-direction between the front of the support 62 and the rear attachment point 43. L9 is the distance in the Y-direction between the rear attachment point 43 and a rear of the base plate 61.

L10 is the distance in the Y-direction between the front end of the base plate 61 and the front attachment point 43. L11 is the distance in the Y-direction between the front attachment point 43 and the front end of the support 68 on the left side of the base plate 61. L12 is the distance in the Y-direction between the front end of the support 68 on the left side of the base plate 61 to the rear attachment point 43. The reference line 272 is parallel with the reference line 262 and positioned a distance L34 in the Z-direction from the reference line 262. L14 is the distance in the Y-direction between the front of the right retainer 76 and the rear of the upper flange of the right retainer 76. L15 is the distance in the Y-direction between the front of the right retainer 76 and the front attachment point 43. L17 is the distance in the Y-direction between the front of the base plate 61 and the rear of the upper flange of the left retainer 76. L18 is the distance in the Y-direction between the front of the base plate 61 and the front attachment point 43.

L19 is the distance in the X-direction between the center line 260 and the right side of the base plate 61. L20 is the distance in the X-direction between the center line 260 and the front of the support 62. L29 is the distance in the X-direction between the front of the support 62 and front of the support 68. L13 is the distance in the X-direction between the center line 260 and the right retainer 76. L16 is the distance in the X-direction between the left and right retainers 76. L27 is the distance in the X-direction of the overall width of the clamp arm 72.

Figure 18C:
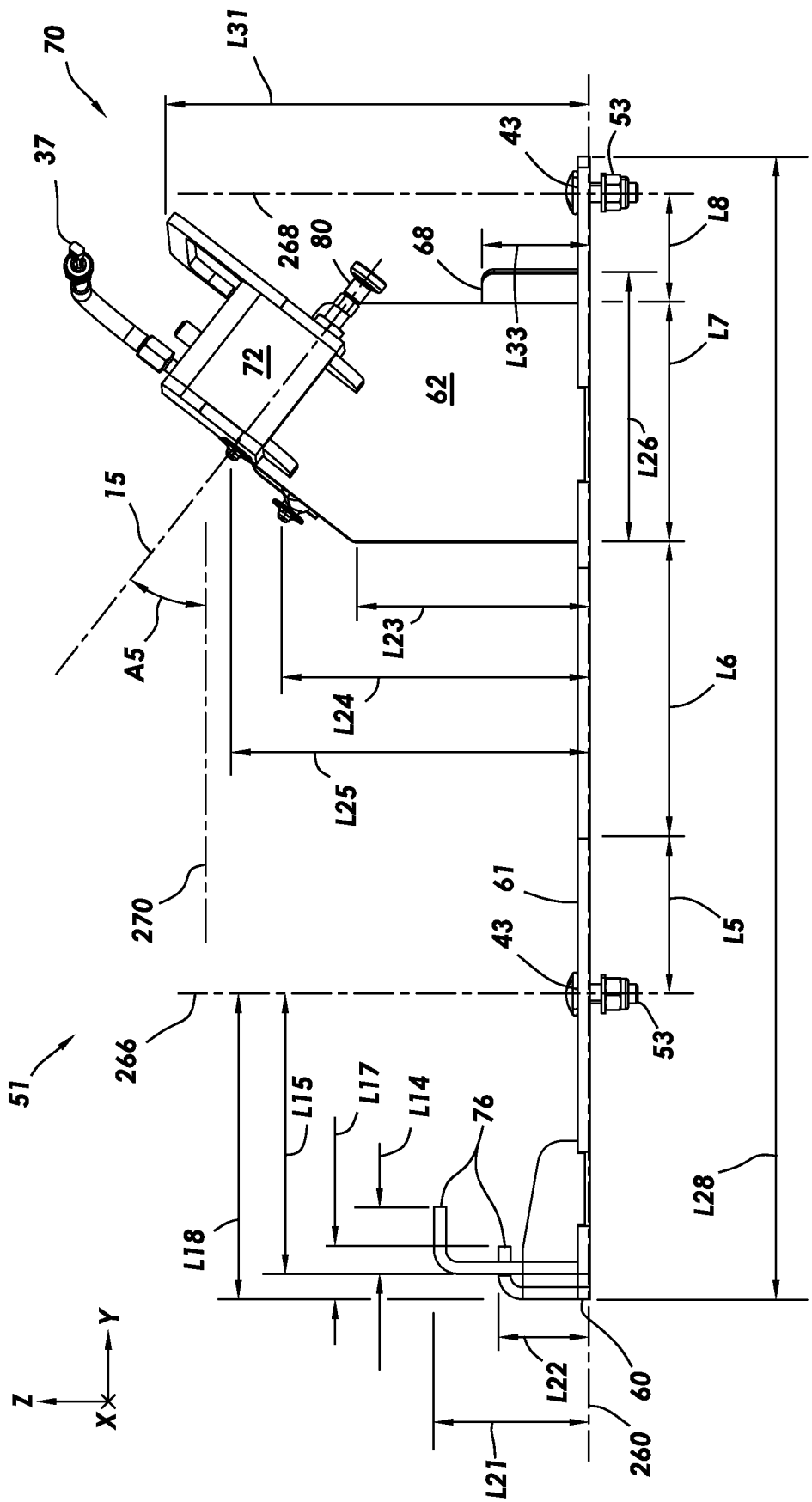
FIG. 18C is a representative side view of the mounting assembly of FIG. 18A with relative dimensions identified, according to one or more example embodiments.

FIG. 18C is a representative side view of the mounting assembly 51 for mounting a portable tool 220 to the cart 20 with relative dimensions identified. A center line 260 extends in a Y direction (see 3D coordinate key) and intersects the center of the attachment points 43 of the base plate 61. Two reference lines 266, 268 are perpendicular to the center line 260, and extend in a Z direction. The reference line 266 intersects the center of the front attachment point 43 near the front of the base plate 61. The reference line 268 intersects the center of the rear attachment point 43 near the rear of the base plate 61. Distances L5, L6, L7, L8, L14, L15, L17, and L18 are described above regarding FIG. 18B.

L21 is the distance in the Z-direction between the center line 260 (positioned along the bottom surface of the base plate 61) and the top of the right retainer 76. L22 is the distance in the Z-direction between the center line 260 and the top of the left retainer 76. L23 is the distance in the Z-direction between the center line 260 and the point that the support 62 begins angling back toward the rear of the mounting bracket 60. L24 is the distance in the Z-direction between the center line 260 and the front end of the attachment of the trigger actuator 74. L25 is the distance in the Z-direction between the center line 260 and the front end of the rod 69 that rotationally attaches the clamping assembly 70 to the mounting bracket 60. L31 is the distance in the Z-direction between the center line 260 and the top of the hand grip 73 (or top of the clamp arm 72). L31 is the overall height of the mounting assembly 51. The reference line 270 is parallel to the center line 260 and is positioned above the center line 260 to provide a reference for the angle A5, which is the angular offset in an Y-Z plane between the center line 260 (or reference line 270) and the rotational axis 15 of the clamping assembly 70.

FIG. 18D is a representative front view of the mounting assembly 51 for mounting a portable tool 220 to the cart 20 with relative dimensions identified. A reference line 262 extends in an X direction (see 3D coordinate key) and intersects the center of the front attachment point 43 of the base plate 61. Reference line 266 is perpendicular to the reference line 262, and extends in a Z direction. The reference line 266 intersects the center of the front attachment point 43 near the front of the base plate 61. Distances L21, L22, L23, L24, L25, and L31 are described above regarding FIG. 18C.

L32 is the distance in the Z-direction between the reference line 262 (positioned along the bottom surface of the base plate 61) and the bottom edge of the clamping assembly 70. L33 is the distance in the Z-direction between the reference line 262 and the top of the supports 68. L40 is the distance in the Z-direction between the reference line 262 and the bottom of the bumper 78. L41 is the distance in the Z-direction between the reference line 262 and the top of the support 62. L41 is the overall height of the mounting bracket 60. The angle A8 is the angular offset in an X-Z plane between the reference line 266 and the rotational axis 15 of the clamping assembly 70.

Figure 18E:
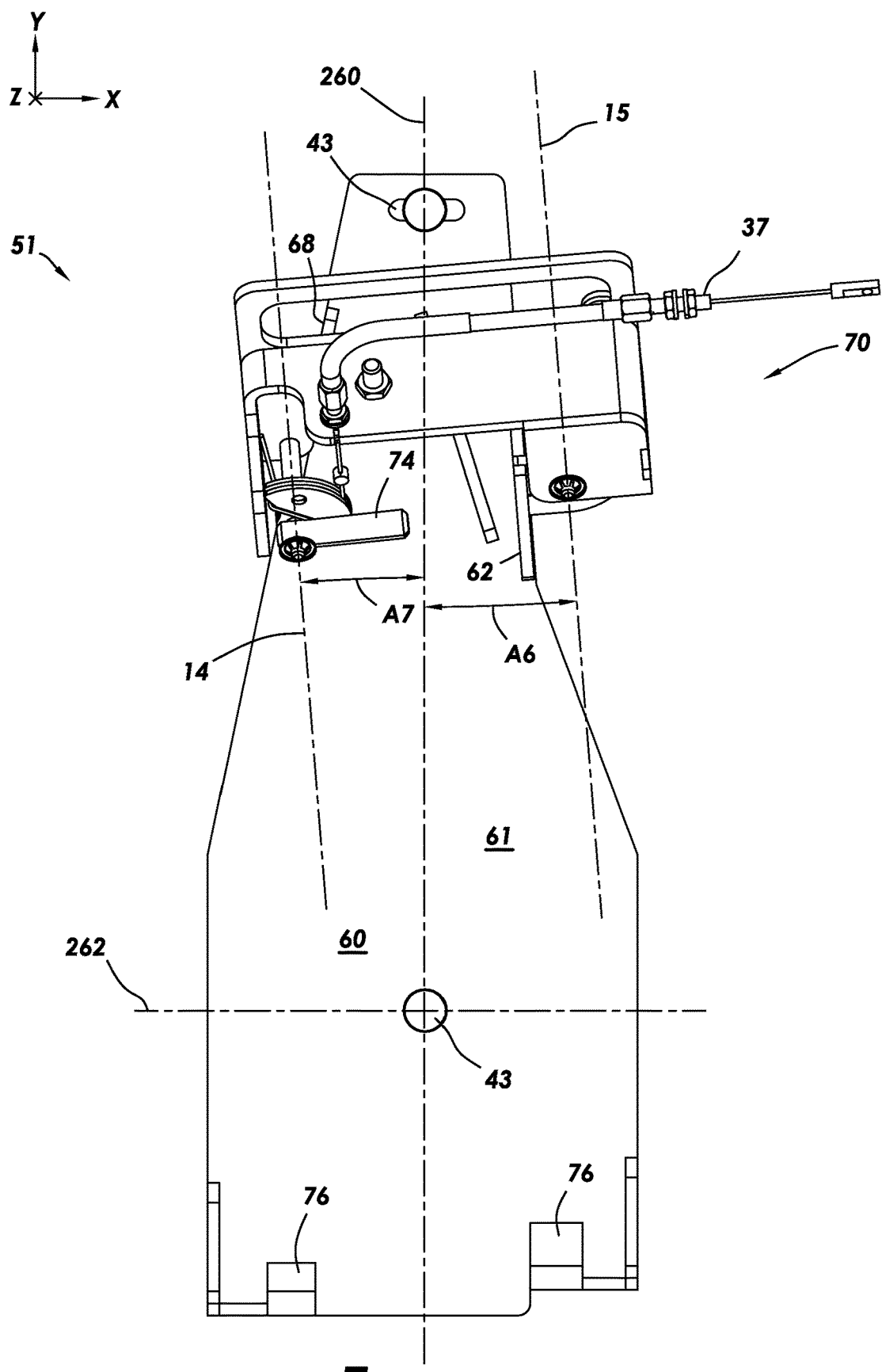
FIG. 18E is a representative top view of the mounting assembly of FIG. 18A, according to one or more example embodiments.

FIG. 18E is a representative top view of the mounting assembly 51 for mounting a portable tool 220 to the cart 20 with relative dimensions identified. A center line 260 extends in a Y direction (see 3D coordinate key) and intersects the center of the attachment points 43 of the base plate 61. A reference line 262 is perpendicular to the center line 260 and extends in an X direction. The reference line 262 intersects the center of the front attachment point 43 near the front of the base plate 61.

The angle A6 is an angular offset in the X-Y plane between the rotational axis 15 of the clamping assembly 70 and the center line 260. The angle A7 is an angular offset in the X-Y plane between the rotational axis 14 of the trigger actuator 74 and the center line 260. It is preferred that the axes 14, 15 are parallel and that the angle A6 is substantially equal to the angle A7. However, angle A6 can be different than the angle A7. It should also be understood that the angles A5, A6, A7, and A8 can be "zero." It is not required that these angles be a non-zero value.

The angle A5 can be 37 degrees, or 37 degrees+/−1 degree, +/−2 degrees, +/−3 degrees, +/−4 degrees, +/−5 degrees, +/−10 degrees, +/−15 degrees, +/−20 degrees, +/−25 degrees, +/−30 degrees, or +/−37 degrees offset from the surface 61 of the base plate 60 in the Y-Z plane.

The angle A6 can be 3 degrees, or 3 degrees+/−1 degree, +/−2 degrees, +/−3 degrees, +/−4 degrees, +/−5 degrees, +/−10 degrees, +/−15 degrees, +/−20 degrees, +/−25 degrees, or +/−30 degrees offset from the center line 260 in the X-Y plane.

The angle A7 can be 3 degrees, or 3 degrees+/−1 degree, +/−2 degrees, +/−3 degrees, +/−4 degrees, +/−5 degrees, +/−10 degrees, +/−15 degrees, +/−20 degrees, +/−25 degrees, or +/−30 degrees offset from the center line 260 in the X-Y plane.

The angle A8 can be 7 degrees, or 7 degrees+/−1 degree, +/−2 degrees, +/−3 degrees, +/−4 degrees, +/−5 degrees, +/−7 degrees, +/−10 degrees, +/−15 degrees, +/−20 degrees, +/−25 degrees, or +/−30 degrees offset from the reference line 266 in the X-Z plane.

L28 is an overall length in the Y-direction of a mounting assembly. L28 for the mounting assembly 51 can be 477.65 mm (18.81 inches), or L28 can be 477.65 mm (18.81 inches)+/−1%, +/−2%, +/−3%, +/−4%, +/−5%, +/−6%, +/−7%, +/−8%, +/−9%, +/−10%, or +/−15%.

L30 is an overall width of the base plate 61 in the X-direction of a mounting assembly. L30 for the mounting assembly 51 can be 180 mm (7.09 inches), or L30 can be 180 mm (7.09 inches)+/−1%, +/−2%, +/−3%, +/−4%, +/−5%, +/−6%, +/−7%, +/−8%, +/−9%, +/−10%, or +/−15%.

L31 is an overall height in the Z-direction of a mounting assembly. L31 for the mounting assembly 51 can be 176 mm (6.93 inches), or L31 can be 176 mm (6.93 inches)+/−1%, +/−2%, +/−3%, +/−4%, +/−5%, +/−6%, +/−7%, +/−8%, +/−9%, +/−10%, or +/−15%.

L41 is an overall height in the Z-direction of a mounting bracket 60 of a mounting assembly. L41 for the mounting bracket 60 of the mounting assembly 51 can be 155 mm (6.1 inches), or L41 can be 155 mm (6.1 inches)+/−1%, +/−2%, +/−3%, +/−4%, +/−5%, +/−6%, +/−7%, +/−8%, +/−9%, +/−10%, or +/−15%.

L27 is an overall width in the X-direction of a clamping assembly 70 of a mounting assembly. L27 for the clamping assembly 70 of the mounting assembly 51 can be 167 mm (6.6 inches), or L41 can be 167 mm (6.6 inches)+/−1%, +/−2%, +/−3%, +/−4%, +/−5%, +/−6%, +/−7%, +/−8%, +/−9%, +/−10%, or +/−15%.

Figure 18G:
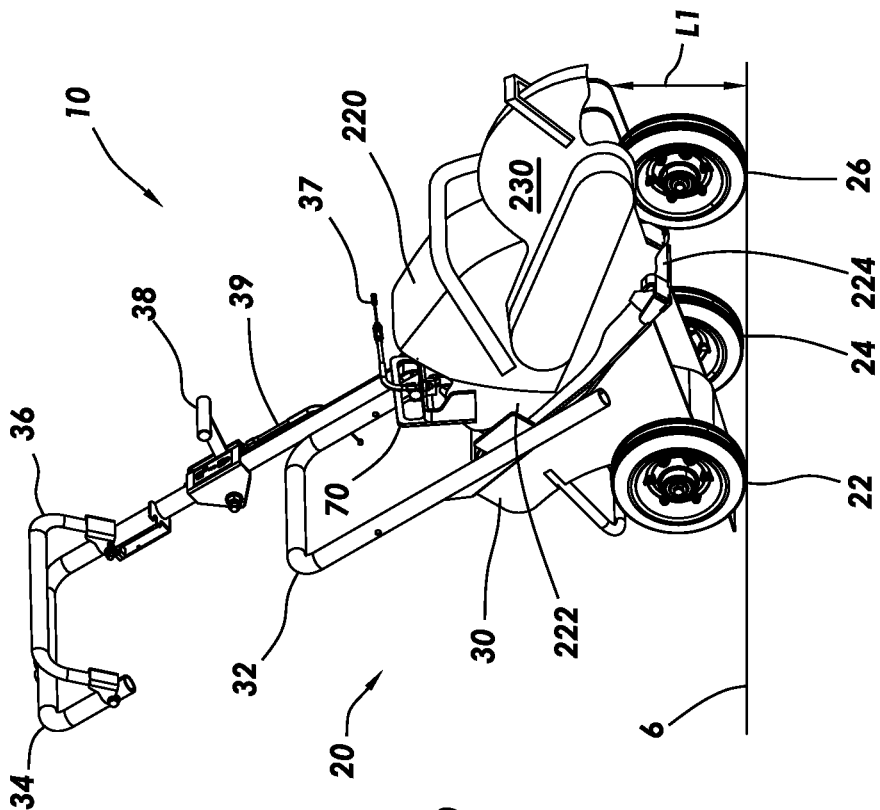
FIG. 18G is a representative perspective view of a cart system with another representative portable tool installed in the mounting assembly of FIG. 18A, according to one or more example embodiments.
Figure 18F:
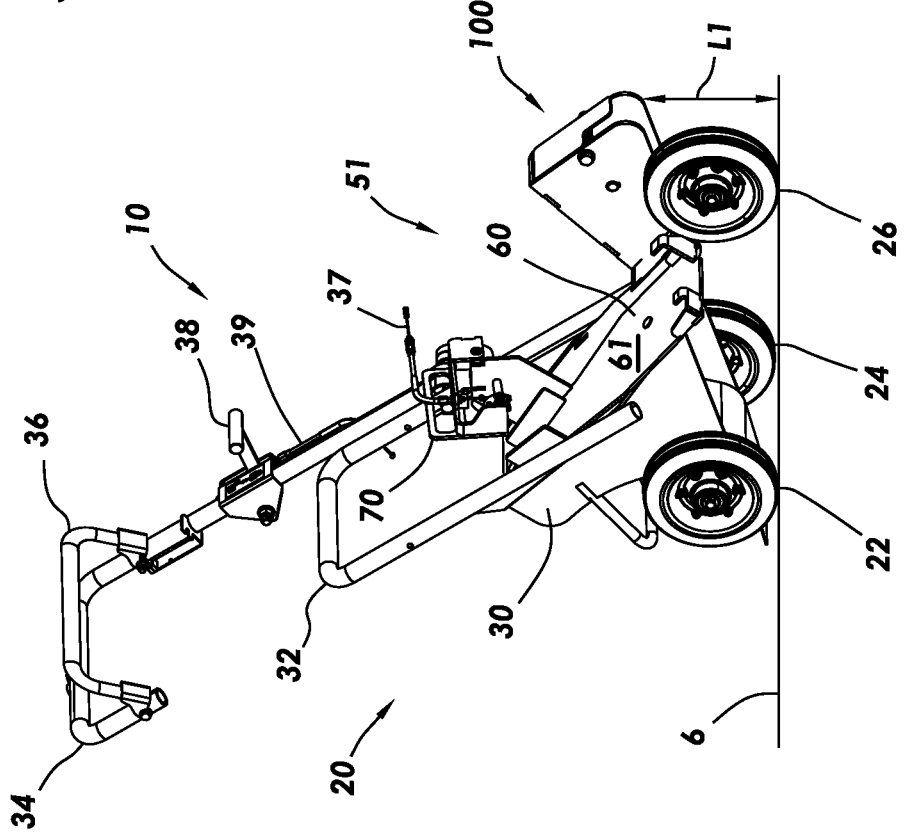
FIG. 18F is a representative perspective view of a cart system with the mounting assembly of FIG. 18A attached, according to one or more example embodiments.

FIG. 18F is a representative perspective view of a cart system 10 with the mounting assembly 51 installed on the cart 20. The height adjustment mechanism 100 is set at a distance of L1 from the surface 6. This can be a desired configuration of the cart to enable installation of the portable tool 220 in the mounting assembly 51, when the portable tool 220 is a portable saw (such as a high-speed concrete saw) and it can be installed without the surface 6 interfering with the installation.

FIG. 18G is a representative perspective view of a cart system 10 with a representative portable tool 220 installed in the mounting assembly 51 of the cart 20. The front portion 222 of the portable tool 220 is engaged with the retainers 76. The clamping assembly 70 is rotated into a locked position engaging the rear portion 224 of the portable tool 220.

Referring back to FIG. 19A, this is a representative perspective view of a mounting assembly 52 of the cart system 10. This mounting assembly 52 can receive any portable tools that are similar enough to allow the mounting assembly 52 to operate correctly by retaining the front portion 242 of the portable tool 240 to the mounting assembly 52, clamping the portable tool 240 in the mounting assembly 52, and operating the trigger of the portable tool 240. The mounting assembly 52 can accommodate multiple portable tools 240 which are in the same or very similar families of tools. For example, this configuration of the mounting assembly 52 in FIGS. 19A-19G can support and secure to the cart 20 at least four portable saws 240 made by Stihl®. The Stihl® saws that can be supported by this mounting assembly 52 are model number TS 420 (14"), model number TS 410 (12"), model number TS 500i (14"), and model number TS 440 (14").

Figure 19A:
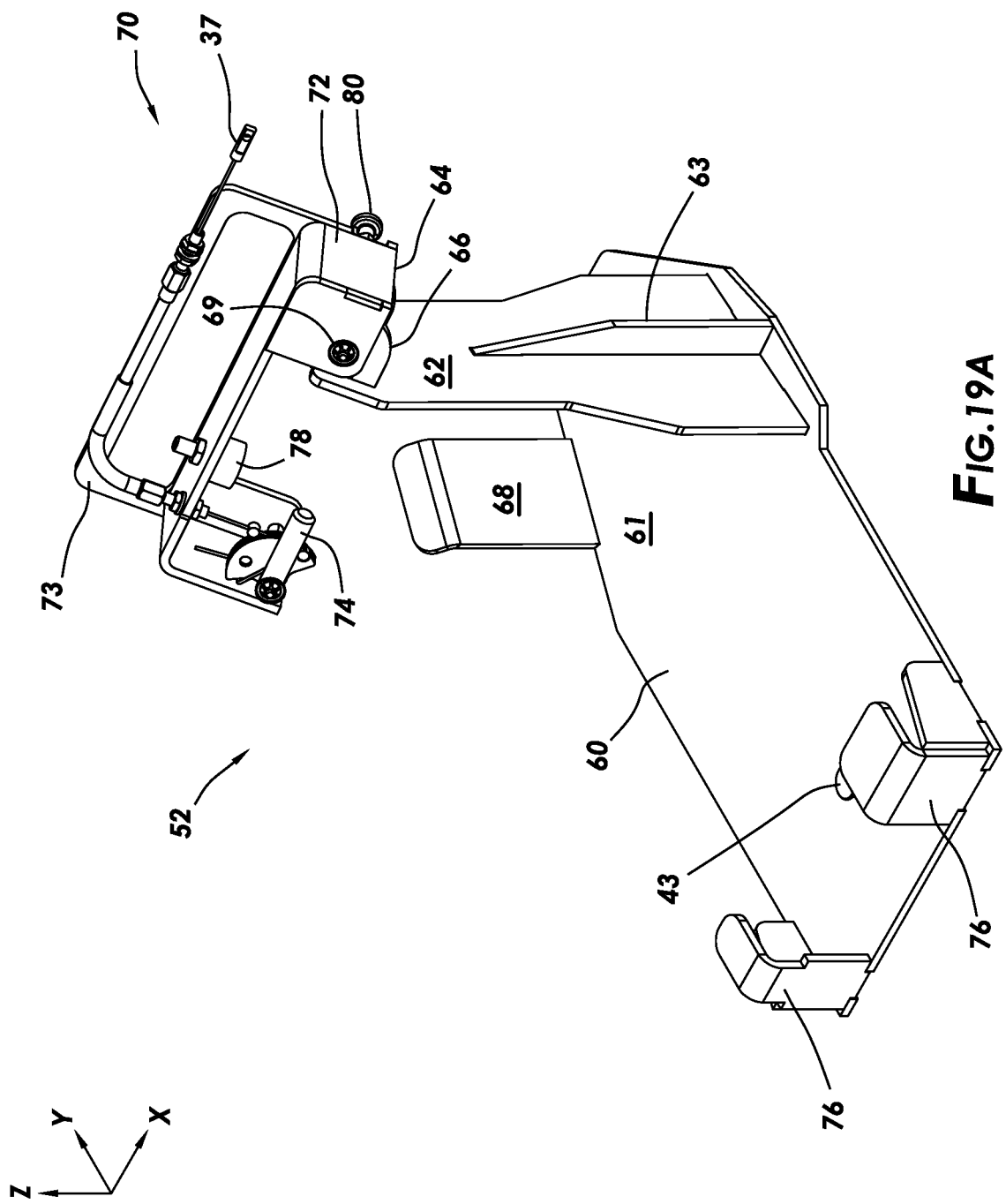
FIG. 19A is a representative perspective view of yet another mounting assembly, according to one or more example embodiments.

FIG. 19A is a representative perspective view of the mounting assembly 52 for mounting a portable tool 240 to the cart 20. The mounting assembly 52 can include retainers 76 positioned at a front of the mounting bracket 60 and configured to engage a front portion 242 of the tool 240 when the tool 240 is installed in the mounting assembly 52. Attachment points 43 can be used to removably attach the mounting assembly 52 to the cart 20 by inserting fasteners 53 through the attachment points 43 (see FIG. 19C). Supports 62, 68 can be attached to the base plate 61 at a rear of the mounting bracket 60 so as to restrict movement of a rear portion 244 of the portable tool 240 when the tool 240 is installed in the mounting assembly 52. A clamping assembly 70 can be rotationally attached to the mounting bracket 60 by the rod 69. The clamping assembly 70 can include a clamp arm 72 which can include a hand grip 73. A bumper 78 can be attached to the clamp arm 72 and a trigger actuator 74 can be rotationally attached to the clamp arm 72. The trigger actuator 74 can be operated by a cable assembly 37 that can include an outer jacket and an inner cable. The outer jacket can be attached to the clamp arm 72 with an end of the cable attached to the trigger actuator 74. Operating the cable can cause the trigger actuator 74 to rotate.

Figure 19B:
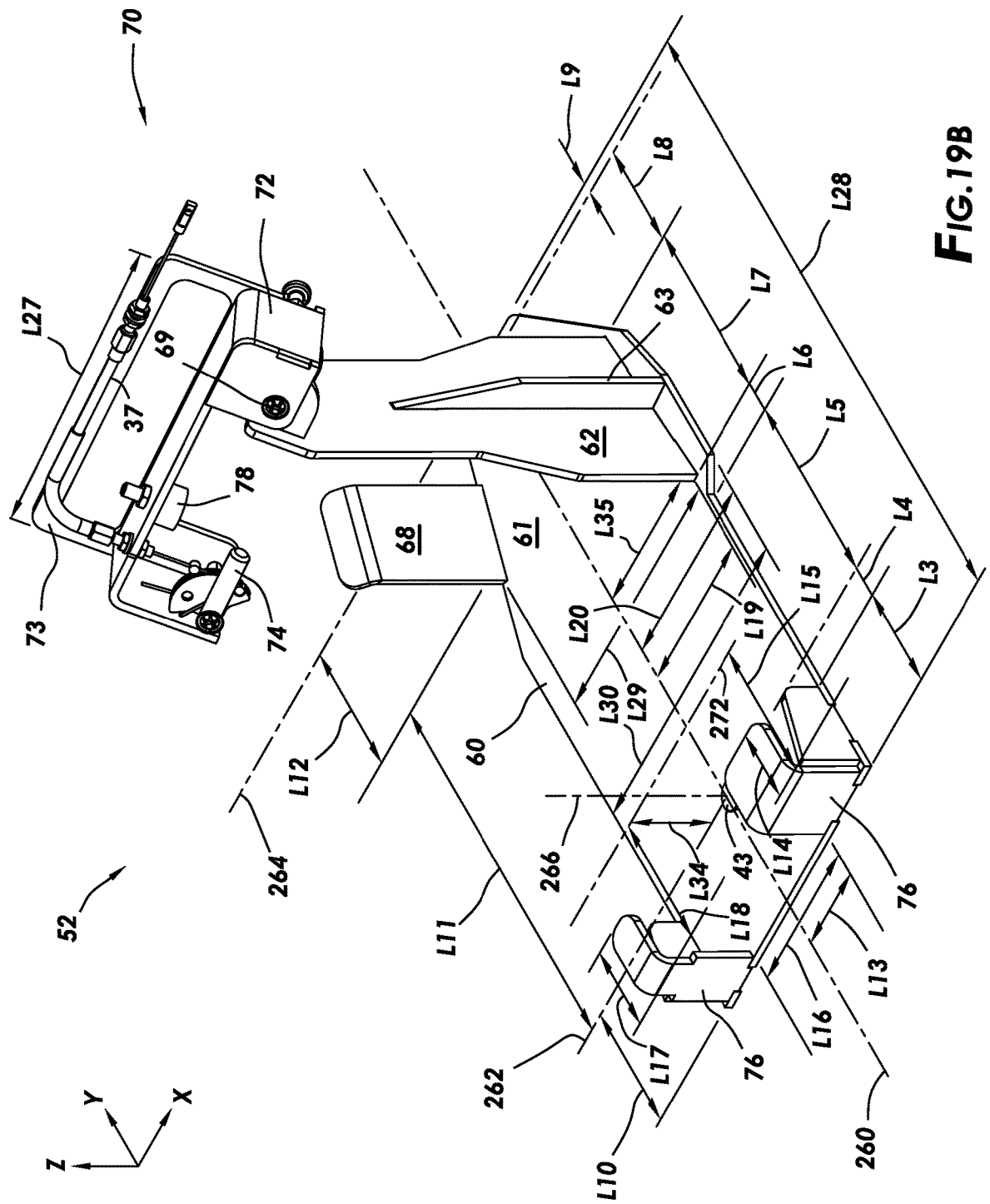
FIG. 19B is a representative perspective view of the mounting assembly of FIG. 19A with relative dimensions identified, according to one or more example embodiments.

FIG. 19B is a representative perspective view of the mounting assembly 52 for mounting a portable tool 240 to the cart 20 with relative dimensions identified. A center line 260 extends in a Y direction (see 3D coordinate key) and intersects the center of the attachment points 43 of the base plate 61. Two reference lines 262, 264 are perpendicular to the center line 260 and extend in an X direction. The reference line 262 intersects the center of the front attachment point 43 near the front of the base plate 61. The reference line 264 intersects the center of the rear attachment point 43 near the rear of the base plate 61. Two reference lines 266, 268 are perpendicular to the center line 260 and to the reference lines 262, 264, and extend in a Z direction. The reference line 266 intersects the center of the front attachment point 43 near the front of the base plate 61. The reference line 268 intersects the center of the rear attachment point 43 near the rear of the base plate 61.

L28 is an overall length in the Y-direction of the mounting assembly 52. L30 is an overall width of the base plate 61. L3 is the distance in the Y-direction between the front of the base plate 61 and an end of a support of the retainer 76 on the right side of the base plate 61. L4 is the distance in the Y-direction between the front attachment point 43 and the end of the support for the right side retainer 76. L5 is the distance in the Y-direction between the front attachment point 43 and the point at which the width of the base plate 61 begins to increase. L6 is the distance in the Y-direction between the point at which the width of the base plate 61 begins to increase and a front of the support 62. L7 is the distance in the Y-direction between the front of the support 62 to the rear of the support 62. L8 is the distance in the Y-direction between the front of the support 62 and the rear attachment point 43. L9 is the distance in the Y-direction between the rear attachment point 43 and a rear of the base plate 61.

L10 is the distance in the Y-direction between the front end of the base plate 61 and the front attachment point 43. L11 is the distance in the Y-direction between the front attachment point 43 and the front end of the support 68 on the left side of the base plate 61. L12 is the distance in the Y-direction between the front end of the support 68 on the left side of the base plate 61 to the rear attachment point 43. The reference line 272 is parallel with the reference line 262 and positioned a distance L34 in the Z-direction from the reference line 262. L14 is the distance in the Y-direction between the front of the base plate 61 and the rear of the upper flange of the right retainer 76. L15 is the distance in the Y-direction between the front of the base plate 61 and the front attachment point 43. L17 is the distance in the Y-direction between the front of the base plate 61 and the rear of the upper flange of the left retainer 76. L18 is the distance in the Y-direction between the front of the base plate 61 and the front attachment point 43. L15 and L18 are substantially equal in the mounting assembly 52. L14 and L17 substantially equal in the mounting assembly 52.

L19 is the distance in the X-direction between the center line 260 and the right side of the base plate 61 near the front end of the base plate 61. L20 is the distance in the X-direction between the center line 260 and an outside edge of the base plate 61 proximate the front of the support 62. L29 is the distance in the X-direction between the front of the support 62 and front of the support 68. L35 is the distance in the X-direction between the center line 260 and the front of the support 62. L13 is the distance in the X-direction between the center line 260 and the right retainer 76. L16 is the distance in the X-direction between the left and right retainers 76. L27 is the distance in the X-direction of the overall width of the clamp arm 72.

Figure 19C:
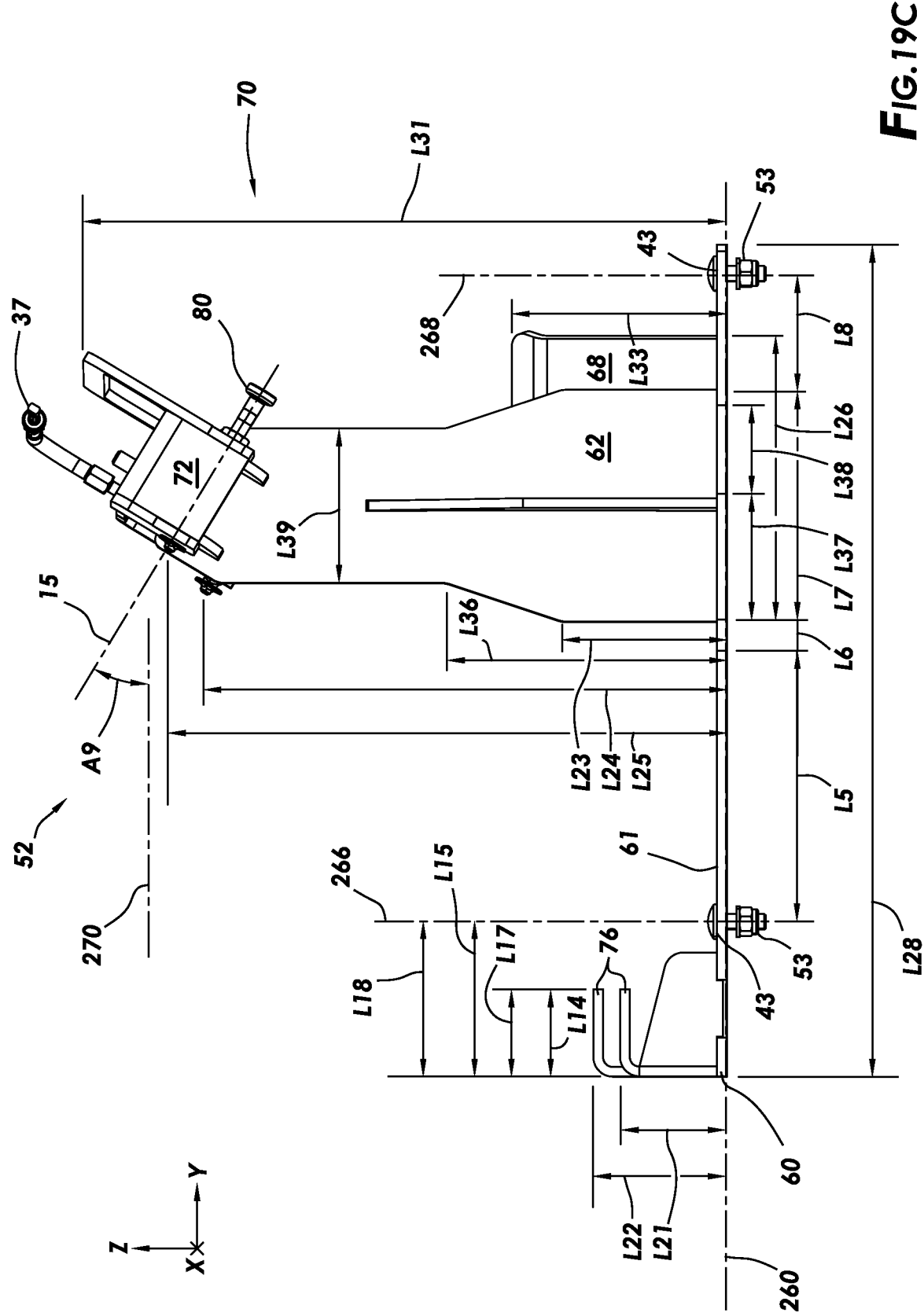
FIG. 19C is a representative side view of the mounting assembly of FIG. 19A with relative dimensions identified, according to one or more example embodiments.

FIG. 19C is a representative side view of the mounting assembly 52 for mounting a portable tool 240 to the cart 20 with relative dimensions identified. A center line 260 extends in a Y direction (see 3D coordinate key) and intersects the center of the attachment points 43 of the base plate 61. Two reference lines 266, 268 are perpendicular to the center line 260, and extend in a Z direction. The reference line 266 intersects the center of the front attachment point 43 near the front of the base plate 61. The reference line 268 intersects the center of the rear attachment point 43 near the rear of the base plate 61. Distances L5, L6, L7, L8, L14, L15, L17, and L18, and L28 are described above regarding FIG. 19B.

L21 is the distance in the Z-direction between the center line 260 (positioned along the bottom surface of the base plate 61) and the top of the right retainer 76. L22 is the distance in the Z-direction between the center line 260 and the top of the left retainer 76. L23 is the distance in the Z-direction between the center line 260 and the point on the support 62 that the width of the support 62 begins to decrease. L36 is the distance in the Z-direction between the center line 260 and the point on the support 62 where the width L39 of the support 62 begins. L24 is the distance in the Z-direction between the center line 260 and the front end of the attachment of the trigger actuator 74. L25 is the distance in the Z-direction between the center line 260 and the front end of the rod 69 that rotationally attaches the clamping assembly 70 to the mounting bracket 60. L31 is the distance in the Z-direction between the center line 260 and the top of the hand grip 73 (or top of the clamp arm 72). L31 is the overall height of the mounting assembly 52. L26 is the distance in the Y-direction between the front of the support 62 and the rear of the support 68 on the left side of the base plate 61. L37 is the distance in the Y-direction between the front of the support 62 and the point at which the width of the base plate 61 begins to decrease. L38 is the distance in the Y-direction of an inclined portion (width decreasing toward rear of base plate 61) of the base plate 61. L39 is the distance in the Y-direction that is a width of the support 62 above the distance L36. The reference line 270 is parallel to the center line 260 and is positioned above the center line 260 to provide a reference for the angle A9, which is the angular offset in an Y-Z plane between the center line 260 (or reference line 270) and the rotational axis 15 of the clamping assembly 70.

Figure 19D:
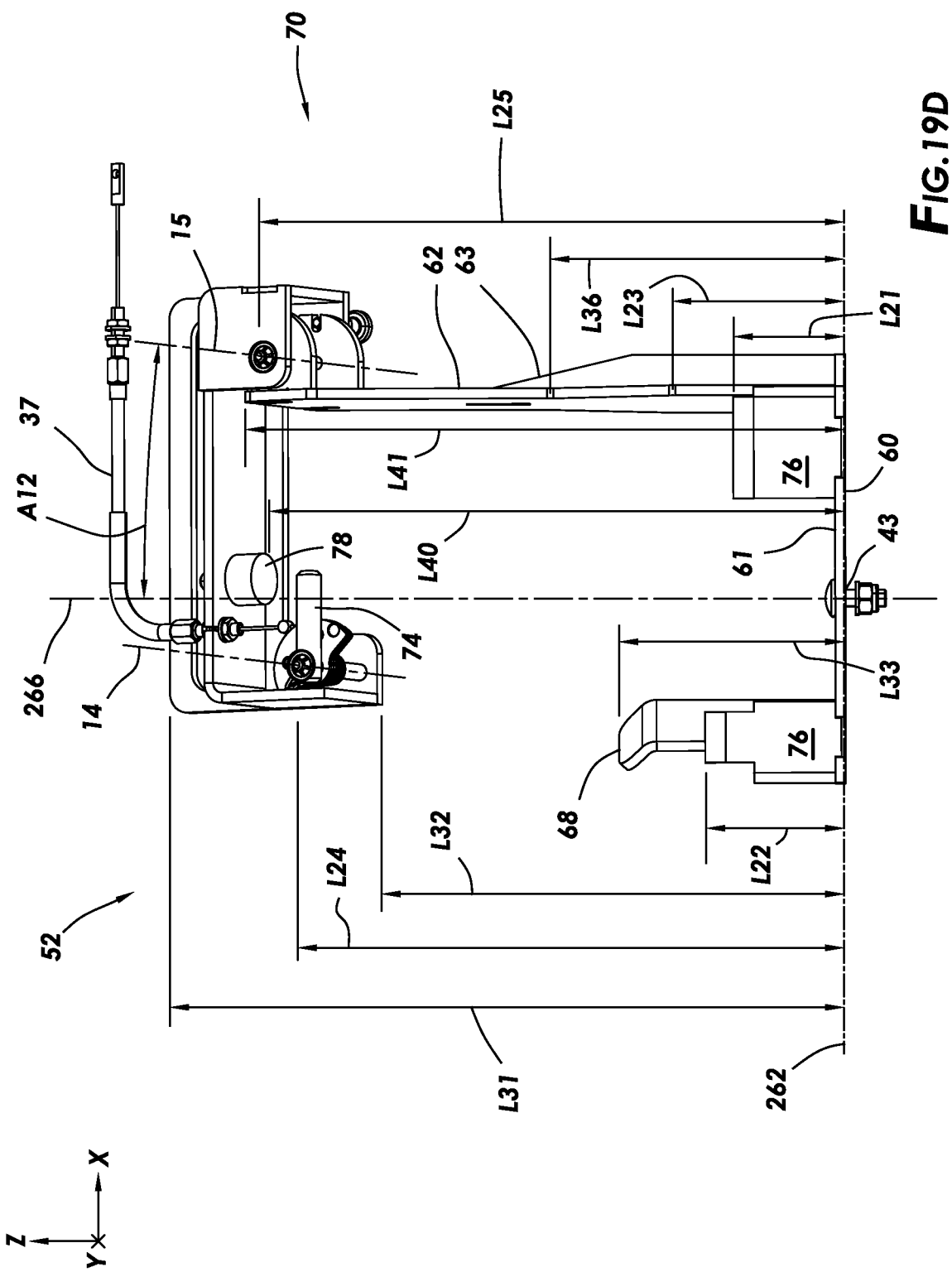
FIG. 19D is a representative front view of the mounting assembly of FIG. 19A with relative dimensions identified, according to one or more example embodiments.

FIG. 19D is a representative front view of the mounting assembly 52 for mounting a portable tool 240 to the cart 20 with relative dimensions identified. A reference line 262 extends in an X direction (see 3D coordinate key) and intersects the center of the front attachment point 43 of the base plate 61. Reference line 266 is perpendicular to the reference line 262, and extends in a Z direction. The reference line 266 intersects the center of the front attachment point 43 near the front of the base plate 61. Distances L21, L22, L23, L24, L25, L31, and L36 are described above regarding FIG. 19C.

L32 is the distance in the Z-direction between the reference line 262 (positioned along the bottom surface of the base plate 61) and the bottom edge of the clamping assembly 70. L40 is the distance in the Z-direction between the reference line 262 and the bottom of the bumper 78. L41 is the distance in the Z-direction between the reference line 262 and the top of the support 62. L41 is the overall height of the mounting bracket 60. The angle A12 is the angular offset in an X-Z plane between the reference line 266 and the rotational axis 15 of the clamping assembly 70.

Figure 19E:
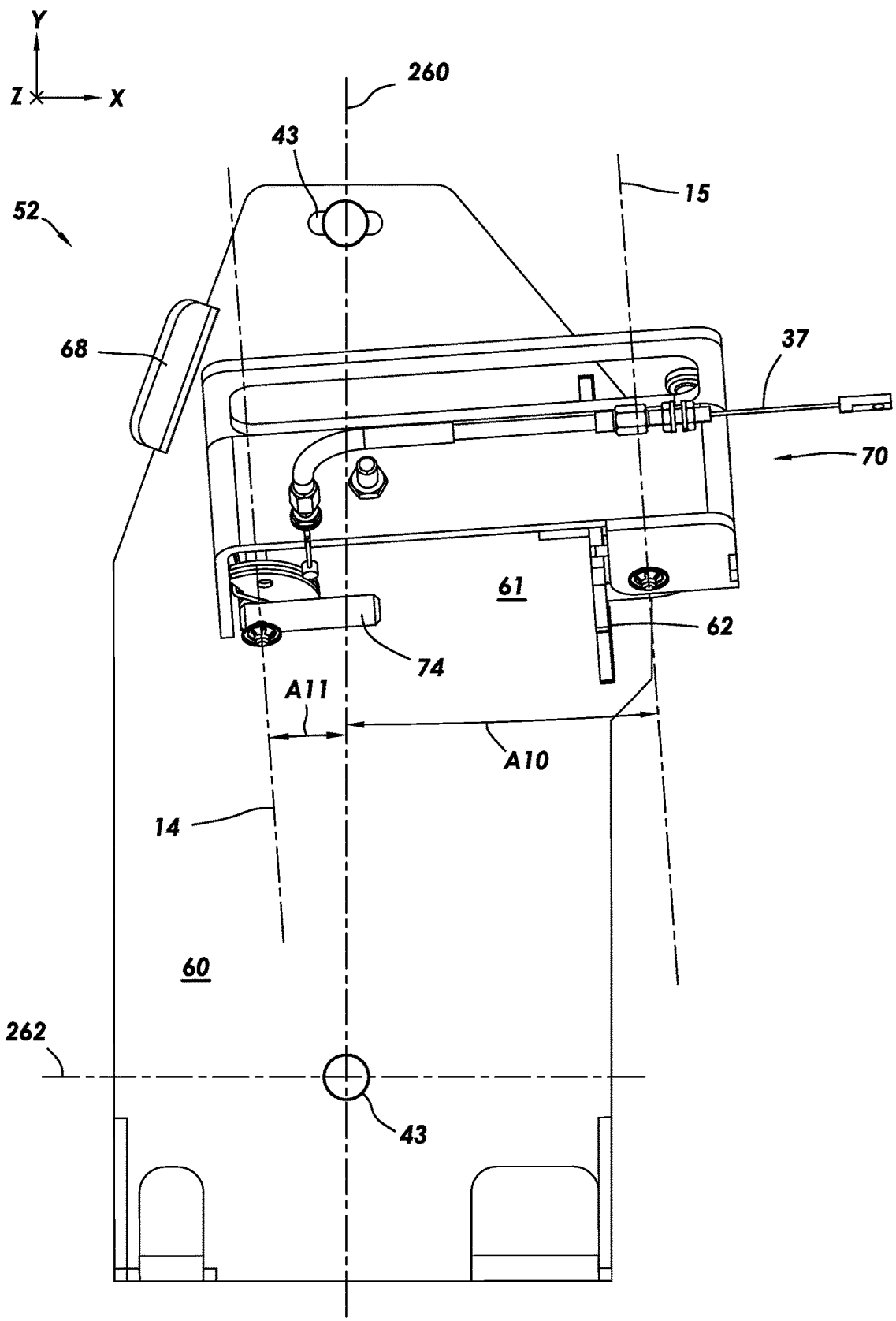
FIG. 19E is a representative top view of the mounting assembly of FIG. 19A, according to one or more example embodiments.

FIG. 19E is a representative top view of the mounting assembly 52 for mounting a portable tool 240 to the cart 20 with relative dimensions identified. A center line 260 extends in a Y direction (see 3D coordinate key) and intersects the center of the attachment points 43 of the base plate 61. A reference line 262 is perpendicular to the center line 260 and extends in an X direction. The reference line 262 intersects the center of the front attachment point 43 near the front of the base plate 61.

The angle A10 is an angular offset in the X-Y plane between the rotational axis 15 of the clamping assembly 70 and the center line 260. The angle A11 is an angular offset in the X-Y plane between the rotational axis 14 of the trigger actuator 74 and the center line 260. It is preferred that the axes 14, 15 are parallel and that the angle A10 is substantially equal to the angle A11. However, angle A10 can be different than the angle A11. It should also be understood that the angles A9, A10, A11, and A12 can be "zero." It is not required that these angles be a non-zero value.

The angle A9 can be 31 degrees, or 31 degrees+/−1 degree, +/−2 degrees, +/−3 degrees, +/−4 degrees, +/−5 degrees, +/−10 degrees, +/−15 degrees, +/−20 degrees, +/−25 degrees, +/−30 degrees, or +/−31 degrees offset from the surface 61 of the base plate 60 in the Y-Z plane.

The angle A10 can be 3 degrees, or 3 degrees+/−1 degree, +/−2 degrees, +/−3 degrees, +/−4 degrees, +/−5 degrees, +/−10 degrees, +/−13 degrees, +/−15 degrees, +/−20 degrees, +/−25 degrees, or +/−30 degrees offset from the center line 260 in the X-Y plane.

The angle A11 can be 3 degrees, or 3 degrees+/−1 degree, +/−2 degrees, +/−3 degrees, +/−4 degrees, +/−5 degrees, +/−10 degrees, +/−13 degrees, +/−15 degrees, +/−20 degrees, +/−25 degrees, or +/−30 degrees offset from the center line 260 in the X-Y plane.

The angle A12 can be 7 degrees, or 7 degrees+/−1 degree, +/−2 degrees, +/−3 degrees, +/−4 degrees, +/−5 degrees, +/−7 degrees, +/−10 degrees, +/−15 degrees, +/−20 degrees, +/−25 degrees, or +/−30 degrees offset from the reference line 266 in the X-Z plane.

L28 is an overall length in the Y-direction of a mounting assembly. L28 for the mounting assembly 52 can be 430 mm (16.93 inches), or L28 can be 430 mm (16.93)+/−1%, +/−2%, +/−3%, +/−4%, +/−5%, +/−6%, +/−7%, +/−8%, +/−9%, +/−10%, or +/−15%.

L30 is an overall width of the base plate 61 in the X-direction of a mounting assembly. L30 for the mounting assembly 52 can be 211 mm (8.31 inches), or L30 can be 211 mm (8.31 inches)+/−1%, +/−2%, +/−3%, +/−4%, +/−5%, +/−6%, +/−7%, +/−8%, +/−9%, +/−10%, or +/−15%.

L31 is an overall height in the Z-direction of a mounting assembly. L31 for the mounting assembly 52 can be 332 mm (13.07 inches), or L31 can be 332 mm (13.07 inches)+/−1%, +/−2%, +/−3%, +/−4%, +/−5%, +/−6%, +/−7%, +/−8%, +/−9%, +/−10%, or +/−15%.

L41 is an overall height in the Z-direction of a mounting bracket 60 of a mounting assembly. L41 for the mounting bracket 60 of the mounting assembly 52 can be 293 mm (11.54 inches), or L41 can be 293 mm (11.54 inches)+/−1%, +/−2%, +/−3%, +/−4%, +/−5%, +/−6%, +/−7%, +/−8%, +/−9%, +/−10%, or +/−15%.

L27 is an overall width in the X-direction of a clamping assembly 70 of a mounting assembly. L27 for the clamping assembly 70 of the mounting assembly 52 can be 204 mm (8 inches), or L41 can be 204 mm (8 inches)+/−1%, +/−2%, +/−3%, +/−4%, +/−5%, +/−6%, +/−7%, +/−8%, +/−9%, +/−10%, or +/−15%.

Figure 19G:
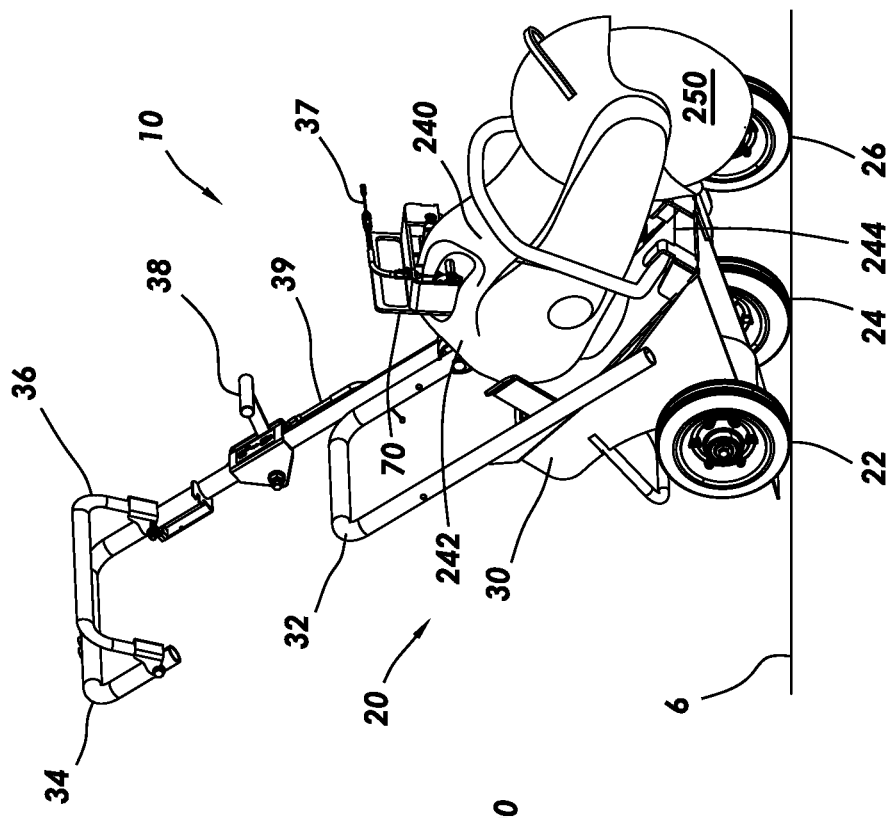
FIG. 19G is a representative perspective view of a cart system with another representative portable tool installed in the mounting assembly of FIG. 19A, according to one or more example embodiments.
Figure 19F:
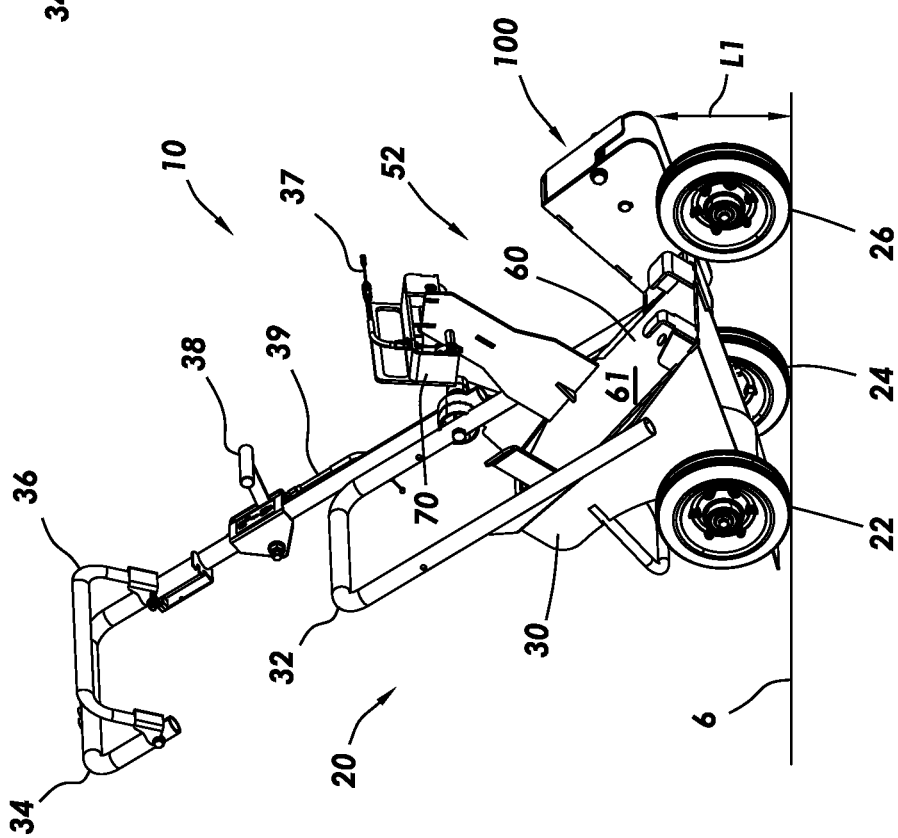
FIG. 19F is a representative perspective view of a cart system with the mounting assembly of FIG. 19A attached, according to one or more example embodiments.

FIG. 19F is a representative perspective view of a cart system 10 with the mounting assembly 52 installed on the cart 20. The height adjustment mechanism 100 is set at a distance of L1 from the surface 6. This can be a desired configuration of the cart to enable installation of the portable tool 240 in the mounting assembly 52, when the portable tool 240 is a portable saw (such as a high-speed concrete saw) and it can be installed without the surface 6 interfering with the installation.

FIG. 19G is a representative perspective view of a cart system 10 with a representative portable tool 240 installed in the mounting assembly 52 of the cart 20. The front portion 242 of the portable tool 240 is engaged with the retainers 76. The clamping assembly 70 is rotated into a locked position engaging the rear portion 244 of the portable tool 240.

FIG. 20 shows four tables that provide a comparison of examples dimensions given above for the mounting assemblies 50, 51, 52. TABLE 1 lists the overall length, width and height of each mounting assembly, the overall height of the mounting bracket 60 for each mounting assembly 50, 51, 52, and the overall width of the clamping assembly 70 for each mounting assembly 50, 51, 52 in millimeters. These dimensions can vary as described above with the disclosed ranges, however, these values can be used to provide a comparison between the mounting assemblies 50, 51, 52.

TABLE 2 shows the percentages calculated when comparing the dimensions of the mounting assembly 50 to those dimensions of the mounting assemblies 51, 52. As can be seen, the values for the mounting assembly 50 are all 100% since they are being compared to themselves.

TABLE 3 shows the percentages calculated when comparing the dimensions of the mounting assembly 51 to those dimensions of the mounting assemblies 50, 52. As can be seen, the values for the mounting assembly 51 are all 100% since they are being compared to themselves.

TABLE 4 shows the percentages calculated when comparing the dimensions of the mounting assembly 52 to those dimensions of the mounting assemblies 50, 51. As can be seen, the values for the mounting assembly 52 are all 100% since they are being compared to themselves.

It should be understood that additional calculations can be made to cover the range of values given for each of the elements given in these tables.

It should be understood that other portable tools from the same manufacturers mentioned in this disclosure as well as tools from other manufacturers, (e.g. Makita®, Hilti®, Dolmar®, ICS®, Hitachi®, and Tanaka®) can be supported by this concept by having a mounting assembly to adapt the additional portable tools to the cart 20.

Embodiments

Embodiment 1. A system comprising:
a cart; and
multiple mounting assemblies, with each one of the multiple mounting assemblies configured to be interchangeably attached to the cart, and with each one of the multiple mounting assemblies being configured to receive one of multiple portable tools and secure the one of the multiple portable tools to the cart.

Embodiment 2. The system of embodiment 1, wherein the one of the multiple portable tools is a different design than a second one of the multiple portable tools.

Embodiment 3. The system of embodiment 2, wherein the one of the multiple portable tools is from a different manufacturer than the second one of the multiple portable tools.

Embodiment 4. The system of embodiment 2, wherein the one of the multiple portable tools is a different shape than the second one of the multiple portable tools.

Embodiment 5. The system of embodiment 2, wherein the one of the multiple portable tools is a different size than the second one of the multiple portable tools.

Embodiment 6. The system of any one of embodiments 4 and 5, wherein the multiple mounting assemblies comprise a first mounting assembly that is configured to receive the one of the multiple portable tools and a second mounting assembly that is configured to receive the second one of the multiple portable tools.

Embodiment 7. The system of embodiment 6, wherein the first mounting assembly is at least 5% wider than the second mounting assembly.

Embodiment 8. The system of embodiment 6, wherein an overall length of the first mounting assembly is less than 95% of an overall length of the second mounting assembly.

Embodiment 9. The system of embodiment 6, wherein an overall height of the first mounting assembly is at least 5% higher than an overall height of the second mounting assembly.

Embodiment 10. The system of embodiment 6, wherein the first mounting assembly comprises a first mounting bracket and a first clamping assembly, and wherein the second mounting assembly comprises a second mounting bracket and a second clamping assembly.

Embodiment 11. The system of embodiment 10, wherein an overall height of the first mounting bracket is at least 5% higher than an overall height of the second mounting bracket.

Embodiment 12. The system of embodiment 10, wherein a width of the first clamping assembly is greater than 5% wider than the second clamping assembly.

Embodiment 13. The system of embodiment 6, wherein the first mounting assembly comprises a left first retainer and a right first retainer configured to engage a front portion of the one of the multiple portable tools, and wherein the second mounting assembly comprises a left second retainer and a right second retainer configured to engage a front portion of the second one of the multiple portable tools.

Embodiment 14. The system of embodiment 13, wherein the left first retainer is a different height than the right first retainer, and wherein the left second retainer is substantially the same height as the right second retainer.

Embodiment 15. The system of embodiment 1, further comprising a control cable assembly that is removably attachable to the one of the mounting assemblies when the one of the mounting assemblies is attached to the cart.

Embodiment 16. The system of embodiment 15, wherein the control cable assembly manipulates a trigger actuator on the one of the mounting assemblies which is configured to engage a trigger on the one of the multiple portable tools.

Embodiment 17. The system of embodiment 1, wherein each one of the mounting assemblies comprise:

a mounting bracket with one or more retainers configured to engage a front portion of the one of the multiple portable tools; and a clamping assembly rotationally attached to the mounting bracket, with the clamping assembly configured to engage a rear portion of the one of the multiple portable tools and secure the one of the multiple portable tools to the mounting bracket.

Embodiment 18. The system of embodiment 17, wherein the clamping assembly comprises a locking device that engages a retention feature on the mounting bracket when the clamping assembly is rotated to a locked position.

Embodiment 19. The system of embodiment 18, wherein disengagement of the locking device from the retention feature enables rotation of the clamping assembly to an unlocked position and allows removal of the one of the multiple portable tools from the mounting bracket.

Embodiment 20. The system of embodiment 18, wherein the locking device comprises a biasing device mechanically coupled to a pin, wherein the biasing device urges the pin to engage a surface of the mounting bracket and allows rotation of the clamping assembly when the clamping assembly is in an unlocked position, wherein the pin is urged past the surface into engagement with the retention feature when the clamping assembly is rotated into the locked position, and wherein the engagement of the pin with the retention feature prevents rotation of the clamping assembly to the unlocked position.

Embodiment 21. The system of embodiment 20, wherein the retention feature is a hole in the mounting bracket that receives the pin when the clamping assembly is in the locked position.

Embodiment 22. The system of embodiment 20, wherein the retention feature is a shoulder on a surface of the mounting bracket that engages the pin when the clamping assembly is in the locked position.

Embodiment 23. The system of embodiment 20, wherein the retention feature is a recess in the surface of the mounting bracket that receives the pin when the clamping assembly is in the locked position.

Embodiment 24. The system of embodiment 20, wherein compressing the biasing device disengages the pin from the retention feature and enables rotation of the clamping assembly to the unlocked position.

Embodiment 25. The system of embodiment 17, wherein the mounting bracket comprises a base plate, and wherein the clamping assembly rotates about a first axis that is angularly offset from a surface of the base plate.

Embodiment 26. The system of embodiment 25, wherein the angular offset is greater than 20 degrees.

Embodiment 27. The system of embodiment 25, wherein a trigger actuator is rotationally attached to the clamping assembly and rotates about a second axis.

Embodiment 28. The system of embodiment 27, wherein the second axis is parallel with the first axis.

Embodiment 29. The system of embodiment 27, wherein the second axis is angularly offset from the first axis.

Embodiment 30. The system of embodiment 27, wherein the mounting bracket is configured to receive the one of the multiple portable tools when the clamping assembly is rotated to a fully open position and the trigger actuator is rotated to a disengaged position.

Embodiment 31. The system of embodiment 27, wherein the clamping assembly is configured to apply a compression force to the rear portion, and to maintain the compression force when the clamping assembly is in a locked position.

Embodiment 32. The system of embodiment 31, wherein the clamping assembly is configured to apply the compression force to a safety switch on the rear portion and allow operation of the one of the multiple portable tools when the clamping assembly is in the locked position.

Embodiment 33. The system of embodiment 1, wherein the cart comprises:

a handle;

multiple wheels rotationally attached to the cart; and one or more attachment points that are configured to removably attach each one of the mounting assemblies to the cart with each one of the mounting assemblies comprising a mounting bracket.

Embodiment 34. The system of embodiment 33, wherein the attachment points are holes in each one of the mounting assemblies, and wherein a fastener is inserted through each of the holes of one of the mounting assemblies to attach the one of the mounting assemblies to the cart.

Embodiment 35. The system of embodiment 33, wherein the attachment points are slots, wherein flanges protrude from a back of the mounting bracket, and wherein a respective one of the flanges is received in each one of the slots when the mounting bracket is installed on the cart.

Embodiment 36. The system of embodiment 35, wherein a locking device is configured to prevent removal of the mounting bracket when the locking device engages at least one of the flanges.

Embodiment 37. The system of embodiment 33, wherein the attachment points are flanges, and wherein each flange extends into a slot in the mounting bracket when the mounting bracket is installed on the cart.

Embodiment 38. The system of embodiment 37, wherein a locking device is configured to prevent removal of the mounting bracket when the locking device engages a retention feature in the mounting bracket.

Embodiment 39. The system of embodiment 33, wherein the multiple wheels includes a front wheel rotationally attached to an adjustable arm, with the adjustable arm rotationally attached to a body of the cart, and wherein rotation of the adjustable arm adjusts a height of the cart.

Embodiment 40. The system of embodiment 1, wherein the multiple portable tools are portable saws.

Embodiment 41. A system comprising:
a first mounting assembly configured to be removably attached to the cart, with the first mounting assembly configured to receive a first portable tool and secure the first portable tool to the cart; and
a second mounting assembly configured to be removably attached to the cart, with the second mounting assembly configured to receive a second portable tool and secure the second portable tool to the cart, with the first mounting assembly being different compared to the second mounting assembly.

Embodiment 42. The system of embodiment 41, wherein the first mounting assembly is a different design than the second mounting assembly.

Embodiment 43. The system of embodiment 42, wherein the first portable tool is from a different manufacturer than the second portable tool.

Embodiment 44. The system of embodiment 42, wherein the first mounting assembly is a different shape than the second mounting assembly.

Embodiment 45. The system of embodiment 42, wherein the first mounting assembly is a different size than the second mounting assembly.

Embodiment 46. The system of any one of embodiments 44 and 45, wherein the first mounting assembly is at least 5% wider than the second mounting assembly.

Embodiment 47. The system of any one of embodiments 44 and 45, wherein an overall length of the first mounting assembly is less than 95% of an overall length of the second mounting assembly.

Embodiment 48. The system of any one of embodiments 44 and 45, wherein an overall height of the first mounting assembly is at least 5% higher than an overall height of the second mounting assembly.

Embodiment 49. The system of any one of embodiments 44 and 45, wherein the first mounting assembly comprises a first mounting bracket and a first clamping assembly, and wherein the second mounting assembly comprises a second mounting bracket and a second clamping assembly.

Embodiment 50. The system of embodiment 49, wherein an overall height of the first mounting bracket is at least 5% higher than an overall height of the second mounting bracket.

Embodiment 51. The system of embodiment 49, wherein a width of the first clamping assembly is greater than 5% wider than the second clamping assembly.

Embodiment 52. The system of embodiment 41, wherein the first mounting assembly comprises a first clamping assembly rotationally attached to a first mounting bracket, and wherein the first clamping assembly rotates about a first axis.

Embodiment 53. The system of embodiment 52, wherein the second mounting assembly comprises a second clamping assembly rotationally attached to a second mounting bracket, and wherein the clamping assembly rotates about a second axis.

Embodiment 54. The system of embodiment 53, wherein the first axis is offset from the second axis by an angular offset of greater than 3 degrees.

Embodiment 55. The system of embodiment 53, wherein the first mounting assembly further comprises a first trigger actuator rotationally attached to the first clamping assembly, and wherein the first trigger actuator rotates about a third axis.

Embodiment 56. The system of embodiment 55, wherein the second mounting assembly further comprises a second trigger actuator rotationally attached to the second clamping assembly, and wherein the second trigger actuator rotates about a fourth axis.

Embodiment 57. The system of embodiment 56, wherein the third axis is offset from the fourth axis by an angular offset of greater than 3 degrees. Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

The invention claimed is:
1. A system comprising:
a cart with a mounting surface having first and second attachment positions;
multiple mounting assemblies, with each one of the multiple mounting assemblies configured to be interchangeably attached to the mounting surface of the cart, and with each one of the multiple mounting assemblies being configured to receive one of multiple portable tools and secure the one of the multiple portable tools to the cart, wherein each one of the multiple mounting assemblies comprises first and second attachment points that align with the first and second attachment positions on the mounting surface when any one of the multiple mounting assemblies is attached to the mounting surface of the cart, wherein at least one of the multiple mounting assemblies comprise;

a mounting bracket with one or more retainers configured to engage a front portion of the one of the multiple portable tools; and a clamping assembly rotationally attached to the mounting bracket, with the clamping assembly configured to engage a rear portion of the one of the multiple portable tools and secure the one of the multiple portable tools to the mounting bracket.

2. The system of claim 1, wherein the one of the multiple portable tools is a different design than a second one of the multiple portable tools wherein the first and second attachment points comprise one of 1) a hole that receives a fastener, 2) a slot that receives a flange when the one of the multiple mounting assemblies is attached to the mounting surface, or 3) a flange that is inserted into a hole in the mounting surface when the one of the multiple mounting assemblies is attached to the mounting surface.

3. The system of claim 1, wherein the one of the multiple portable tools is from a different manufacturer than a second one of the multiple portable tools, or wherein the one of the multiple portable tools is a different shape than a second one of the multiple portable tools, or wherein the one of the multiple portable tools is a different size than a second one of the multiple portable tools.

4. The system of claim 1, wherein the clamping assembly comprises a locking device that engages a retention feature on the mounting bracket when the clamping assembly is rotated to a locked position.

5. The system of claim 4, wherein disengagement of the locking device from the retention feature enables rotation of the clamping assembly to an unlocked position and allows removal of the one of the multiple portable tools from the mounting bracket.

6. The system of claim 1, wherein the multiple mounting assemblies comprise a first mounting assembly that is configured to receive the one of the multiple portable tools and a second mounting assembly that is configured to receive a second one of the multiple portable tools.

7. The system of claim 6, wherein the first mounting assembly is at least 5% wider than the second mounting assembly, or wherein an overall length of the first mounting assembly is less than 95% of an overall length of the second mounting assembly, or wherein an overall height of the first mounting assembly is at least 5% higher than an overall height of the second mounting assembly.

8. The system of claim 1, further comprising a control cable assembly that is removably attachable to the one of the mounting assemblies when the one of the mounting assemblies is attached to the cart.

9. The system of claim 8, wherein the control cable assembly manipulates a trigger actuator on the one of the mounting assemblies which is configured to engage a trigger on the one of the multiple portable tools.

10. The system of claim 6, wherein the first mounting assembly comprises a first mounting bracket and a first clamping assembly, wherein the second mounting assembly comprises a second mounting bracket and a second clamping assembly, and wherein an overall height of the first mounting bracket is at least 5% higher than an overall height of the second mounting bracket, or a width of the first clamping assembly is greater than 5% wider than the second clamping assembly.

11. The system of claim 4, wherein the locking device comprises a biasing device mechanically coupled to a pin, wherein the biasing device urges the pin to engage a surface of the mounting bracket and allows rotation of the clamping assembly when the clamping assembly is in an unlocked position, wherein the pin is urged past the surface into engagement with the retention feature when the clamping assembly is rotated into the locked position, and wherein the engagement of the pin with the retention feature prevents rotation of the clamping assembly to the unlocked position.

12. The system of claim 1, wherein the clamping assembly comprises a locking device that engages a retention feature on the mounting bracket when the clamping assembly is rotated to a locked position, and wherein disengagement of the locking device from the retention feature enables rotation of the clamping assembly to an unlocked position and allows removal of the one of the multiple portable tools from the mounting bracket.

13. The system of claim 1, wherein the cart comprises:
a handle;
multiple wheels rotationally attached to the cart; and
one or more attachment points that are configured to removably attach each one of the mounting assemblies to the cart with each one of the mounting assemblies comprising a mounting bracket.

14. The system of claim 13, wherein the multiple wheels includes a front wheel rotationally attached to an adjustable arm, with the adjustable arm rotationally attached to a body of the cart, and wherein rotation of the adjustable arm adjusts a height of the cart.

15. A system comprising:
a first mounting assembly configured to be removably attached to a cart, with the first mounting assembly configured to receive a first portable tool and secure the first portable tool to the cart; and
a second mounting assembly configured to be removably attached to the cart, with the second mounting assembly configured to receive a second portable tool and secure the second portable tool to the cart, with the first mounting assembly being different compared to the second mounting assembly, wherein the first mounting assembly comprises a first clamping assembly rotationally attached to a first mounting bracket, and wherein the first clamping assembly rotates about a first axis, and wherein the second mounting assembly comprises a second clamping assembly rotationally attached to a second mounting bracket, and wherein the second clamping assembly rotates about a second axis.

16. The system of claim 15, wherein the first clamping assembly is positioned at a different distance from the cart than the second clamping assembly.

17. The system of claim 15, wherein the first mounting assembly comprises one or more first retainers that are configured to engage a front portion of the first portable tool.

18. The system of claim 15, wherein the first clamping assembly is configured to rotate into engagement with a rear portion of the first portable tool and prevent removal of the first portable tool from the first mounting assembly.

19. The system of claim 15, wherein the first clamping assembly comprises a first trigger actuator that is configured to actuate a trigger of the first portable tool, wherein the first trigger actuator rotates about a first trigger axis.

20. The system of claim 15, wherein the first clamping assembly comprises a locking device that engages a retention feature on a mounting bracket of the first mounting assembly when the first clamping assembly is rotated to a locked position, and wherein disengagement of the locking device from the retention feature enables rotation of the first clamping assembly to an unlocked position and allows removal of the first portable tool from the mounting bracket.

* * * * *